United States Patent
Breed et al.

(10) Patent No.: US 7,426,437 B2
(45) Date of Patent: *Sep. 16, 2008

(54) ACCIDENT AVOIDANCE SYSTEMS AND METHODS

(75) Inventors: David S. Breed, Miami Beach, FL (US); Wilbur E. DuVall, Reeds Spring, MO (US); Wendell C. Johnson, Kaneohe, HI (US)

(73) Assignee: Intelligent Technologies International, Inc., Denville, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 11/681,817

(22) Filed: Mar. 5, 2007

(65) Prior Publication Data

US 2007/0152804 A1 Jul. 5, 2007

Related U.S. Application Data

(63) Continuation-in-part of application No. 11/034,325, filed on Jan. 12, 2005, now Pat. No. 7,202,776, which is a continuation-in-part of application No. 10/822,445, filed on Apr. 12, 2004, now Pat. No. 7,085,637, (Continued)

(60) Provisional application No. 60/062,729, filed on Oct. 22, 1997, provisional application No. 60/123,882, filed on Mar. 11, 1999, provisional application No. 60/711,452, filed on Aug. 25, 2005.

(51) Int. Cl.
- *G08G 1/137* (2006.01)
- *G01C 21/26* (2006.01)
- *G06F 17/00* (2006.01)

(52) U.S. Cl. ............ 701/301; 701/213; 340/435; 340/995.1; 340/995.12; 342/357.06

(58) Field of Classification Search ............ None
See application file for complete search history.

(56) References Cited

U.S. PATENT DOCUMENTS 4,835,537 A 5/1989 Manion (Continued)

FOREIGN PATENT DOCUMENTS

| DE | 4434789 | 4/1996 |
| JP | 6337286 | 12/1994 |
| JP | 7200861 | 8/1995 |

OTHER PUBLICATIONS

Enge et al.; Differential operation of the Global Positioning System; IEEE Communications Magazine; Jul. 1988; vol. 26, iss. 7; pp. 48-60☐☐.*

(Continued)

*Primary Examiner*—Michael J. Zanelli
(74) *Attorney, Agent, or Firm*—Brian Roffe

(57) ABSTRACT

Accident avoidance system for a host vehicle includes a global positioning system residing on the host vehicle for determining the host vehicle's location as the host vehicle travels based on signals received from one or more satellites, a map database having digital maps corresponding to an area including the location of the host vehicle as determined by the global positioning system, a vehicle-to-vehicle communication system residing on the host vehicle operative for receiving signals including location information acquired by global positioning systems residing on other vehicles directly from the other vehicles indicating the locations of the other vehicles, and a navigation system including a display residing on the host vehicle for displaying images to an occupant of the host vehicle showing the digital maps and indications of the locations of the host vehicle and the other vehicles on the digital maps. The navigation system also updates the images shown on the navigation system display to reflect changes in the locations of the host vehicle and the other vehicles.

83 Claims, 20 Drawing Sheets

Related U.S. Application Data

(63) which is a continuation-in-part of application No. 10/118,858, filed on Apr. 9, 2002, now Pat. No. 6,720,920, which is a continuation-in-part of application No. 09/177,041, filed on Oct. 22, 1998, now Pat. No. 6,370,475, said application No. 10/118,858 is a continuation-in-part of application No. 09/679,317, filed on Oct. 4, 2000, now Pat. No. 6,405,132, which is a continuation-in-part of application No. 09/523,559, filed on Mar. 10, 2000, now abandoned, said application No. 10/118,858 is a continuation-in-part of application No. 09/909,466, filed on Jul. 19, 2001, now Pat. No. 6,526,352, said application No. 10/822,445 is a continuation-in-part of application No. 10/216,633, filed on Aug. 9, 2002, now Pat. No. 6,768,944, application No. 11/681,817, which is a continuation-in-part of application No. 11/461,619, filed on Aug. 1, 2006, and a continuation-in-part of application No. 10/822,445, and a continuation-in-part of application No. 11/028,386, filed on Jan. 3, 2005, now Pat. No. 7,110,880, application No. 11/681,817, which is a continuation-in-part of application No. 11/464,385, filed on Aug. 14, 2006, and a continuation-in-part of application No. 11/028,386.

(56) References Cited

U.S. PATENT DOCUMENTS

| | | | |
|---|---|---|---|
| 5,153,836 A | | 10/1992 | Fraughton et al. |
| 5,311,197 A | | 5/1994 | Sorden et al. |
| 5,351,194 A | | 9/1994 | Ross et al. |
| 5,367,306 A | | 11/1994 | Hollon et al. |
| 5,381,338 A | | 1/1995 | Wysocki et al. |
| 5,392,052 A | | 2/1995 | Eberwine |
| 5,450,329 A | | 9/1995 | Tanner |
| 5,570,095 A | | 10/1996 | Drouilhet, Jr. et al. |
| 5,652,705 A | * | 7/1997 | Spiess .................. 701/117 |
| 5,673,305 A | | 9/1997 | Ross |
| 5,675,489 A | * | 10/1997 | Pomerleau ............... 701/28 |
| 5,699,056 A | * | 12/1997 | Yoshida ................. 340/905 |
| 5,699,255 A | * | 12/1997 | Ellis et al. ............. 701/212 |
| 5,714,948 A | | 2/1998 | Farmakis et al. |
| 5,828,336 A | | 10/1998 | Yunck et al. |
| 5,841,367 A | | 11/1998 | Giovanni |
| 5,907,293 A | | 5/1999 | Tognazzini |
| 5,926,117 A | | 7/1999 | Gunji et al. |
| 5,926,126 A | | 7/1999 | Engelman |
| 5,983,161 A | | 11/1999 | Lemelson et al. |
| 6,014,608 A | | 1/2000 | Seo |
| 6,133,867 A | | 10/2000 | Eberwine et al. |
| 6,314,366 B1 | | 11/2001 | Farmakis et al. |
| 6,370,475 B1 | | 4/2002 | Breed et al. |
| 6,405,132 B1 | | 6/2002 | Breed et al. |

OTHER PUBLICATIONS

J.W. Sinko, "An Evolutionary Automated Highway System Concept Based on GPS", SRI International, Sep. 1996, pp. 5-7.
Bill Thompson, "Eagle-Eye Accuracy in Flight", Oct. 19, 2006, GPS World Avionics & Transportation, pp. 1-5.
"Taking the Search out of Search & Rescue", Artex, ELT to Nav Interface, pp. 1-2.
Aeorofix 406 ELT wiht Onboard GPS—2799.4, ACR, Touch and Go Pilot Supply, pp. 1-2.
"406 MHz GPS Enabled Emergency Beacon Evaluation", Equipped to Survive Foundation, pp. 1-11.
Tom Rogers, "ELT Basics", Sep. 6, 1998, AvWeb, pp. 1-3.
Rick Curtis, "Technology Update: Personal Locator Beacons (PLD) Come Online in Jul. 2003", OutdoorSafety.org, p. 1.
Rapidfix 406 EPIRB, "406 MHz EPIRB with GPS Interface, Manual Deployment", Life Support International, pp. 1-3.
"Mode Select Beacon (Mode S)", FAA William J. Hughes Technical Center, pp. 1-2.
Yves Sagnier, "Mode S . . . in a Few Words", 1997, CENA, pp. 1-7.
"Why GPS Beacons?: Cospas-Sarsat Beacons Explained", McMurdo, pp. 1-2.
"The Smallest and Lightest Personal Location Beacon in the World", McMurdo Fast Find Plus, pp. 1-3.
"Magnum B: Class B (Manually Activated) EPIRB", 2005, Life Support International, pp. 1-2.
Wes Stamper, "Understanding Mode S Technology", Dec. 2005, RF Design, pp. 1-4.
Technical Standard Order, "Extended Squitter Automatic Dependent Surveillance—Broadcast (ADS-B) and Traffic Information Service—Broadcast (TIS-B) Equipment Operating on the Radio Frequency of 1090 MHz", Sep. 20, 2004, Department of Transportation, pp. 1-49.
Emily Chang et al., "The Story of Mode S", Dec. 15, 2000, pp. 1-40.
"Emergency Beacons", NOAA Satellite and Information Service, Search and Rescue Satellite-Aided Tracking, pp. 1-5.

* cited by examiner

Prior Art
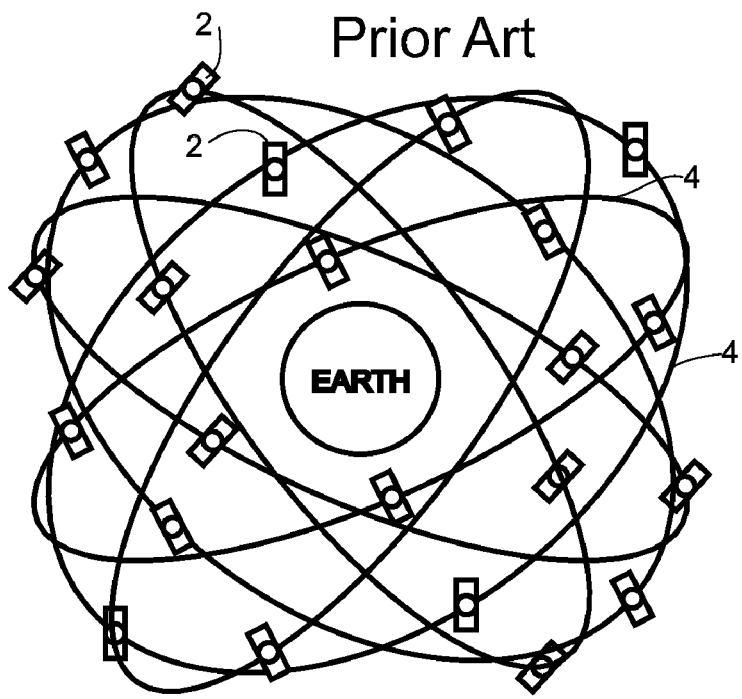
Fig. 1
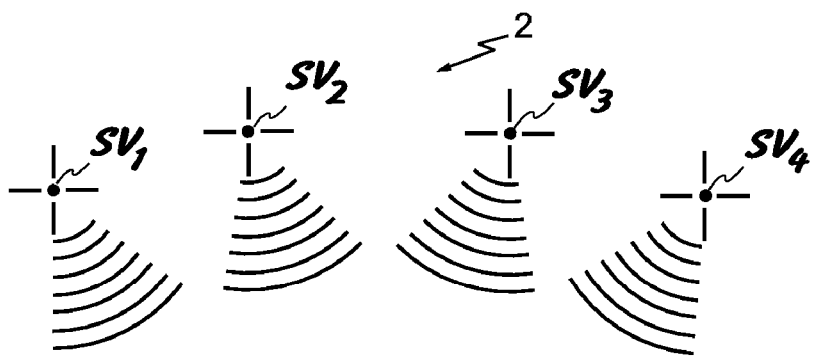
Fig. 2
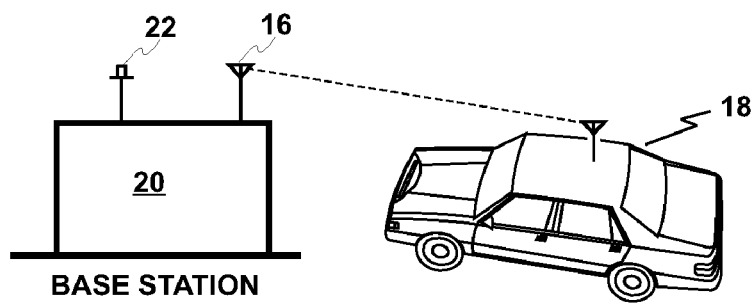
Prior Art

Data acquisition module

ACCIDENT AVOIDANCE SYSTEMS AND METHODS

This application is:
1. a continuation-in-part (CIP) of U.S. patent application Ser. No. 11/034,325 filed Jan. 12, 2005, now U.S. Pat. No. 7,202,776, which is a CIP of U.S. patent application Ser. No. 10/822,445 filed Apr. 12, 2004, now U.S. Pat. No. 7,085,637, which is:
   A) a CIP of U.S. patent application Ser. No. 10/118,858 filed Apr. 9, 2002, now U.S. Pat. No. 6,720,920, which is:
      1) a CIP of U.S. patent application Ser. No. 09/177,041 filed Oct. 22, 1998, now U.S. Pat. No. 6,370,475, which claims priority under 35 U.S.C. §119(e) of U.S. provisional patent application Ser. No. 60/062,729 filed Oct. 22, 1997, now expired;
      2) a CIP of U.S. patent application Ser. No. 09/679,317 filed Oct. 4, 2000, now U.S. Pat. No. 6,405,132, which is a CIP of U.S. patent application Ser. No. 09/523,559 filed Mar. 10, 2000, now abandoned, which claims priority under 35 U.S.C. §119(e) of U.S. provisional patent application Ser. No. 60/123,882 filed Mar. 11, 1999, now expired; and
      3) a CIP of U.S. patent application Ser. No. 09/909,466 filed Jul. 19, 2001, now U.S. Pat. No. 6,526,352; and
   B) a CIP of U.S. patent application Ser. No. 10/216,633 filed Aug. 9, 2002, now U.S. Pat. No. 6,768,944; and
2. a CIP of U.S. patent application Ser. No. 11/461,619 filed Aug. 1, 2006 which claims priority under 35 U.S.C. §119(e) of U.S. provisional patent application Ser. No. 60/711,452 filed Aug. 25, 2005, now expired, and is:
   A) a CIP of U.S. patent application Ser. No. 10/822,445 filed Apr. 12, 2004, now U.S. Pat. No. 7,085,637, the history of which is set forth above; and
   B) a CIP of U.S. patent application Ser. No. 11/028,386 filed Jan. 3, 2005, now U.S. Pat. No. 7,110,880; and
3. a CIP of U.S. patent application Ser. No. 11/464,385 filed Aug. 14, 2006 which claims priority under 35 U.S.C. §119(e) of U.S. provisional patent application Ser. No. 60/711,452 filed Aug. 25, 2005, now expired, and is a CIP of U.S. patent application Ser. No. 11/028,386 filed Jan. 3, 2005, now U.S. Pat. No. 7,110,880, the history of which is set forth above.

This application is related to U.S. patent application Ser. No. 11/562,730 filed Nov. 22, 2006 on the grounds that they contain common subject matter.

All of the above applications are incorporated by reference herein.

FIELD OF THE INVENTION

The present invention relates generally to accident avoidance or elimination systems for vehicles.

BACKGROUND OF THE INVENTION

A detailed discussion of background information is set forth in parent applications, U.S. patent application Ser. Nos. 09/679,317, 10/822,445 and 11/034,325, all of which are incorporated by reference herein. Some more pertinent background is set forth below. All of the patents, patent applications, technical papers and other references mentioned below and in the parent applications are incorporated herein by reference in their entirety. No admission is made that any or all of these references are prior art and indeed, it is contemplated that they may not be available as prior art when interpreting 35 U.S.C. § 102 in consideration of the claims of the present application.

"Pattern recognition" as used herein will generally mean any system which processes a signal that is generated by an object (e.g., representative of a pattern of returned or received impulses, waves or other physical property specific to and/or characteristic of and/or representative of that object) or is modified by interacting with an object, in order to determine to which one of a set of classes that the object belongs. Such a system might determine only that the object is or is not a member of one specified class, or it might attempt to assign the object to one of a larger set of specified classes, or find that it is not a member of any of the classes in the set. The signals processed are generally a series of electrical signals coming from transducers that are sensitive to acoustic (ultrasonic) or electromagnetic radiation (e.g., visible light, infrared radiation, capacitance or electric and/or magnetic fields), although other sources of information are frequently included. Pattern recognition systems generally involve the creation of a set of rules that permit the pattern to be recognized. These rules can be created by fuzzy logic systems, statistical correlations, or through sensor fusion methodologies as well as by trained pattern recognition systems such as neural networks, combination neural networks, cellular neural networks or support vector machines.

"Neural network" as used herein, unless stated otherwise, will generally mean a single neural network, a combination neural network, a cellular neural network, a support vector machine or any combinations thereof. For the purposes herein, a "neural network" is defined to include all such learning systems including cellular neural networks, support vector machines and other kernel-based learning systems and methods, cellular automata and all other pattern recognition methods and systems that learn. A "combination neural network" as used herein will generally apply to any combination of two or more neural networks as most broadly defined that are either connected together or that analyze all or a portion of the input data.

A "combination neural network" as used herein will generally apply to any combination of two or more neural networks that are either connected together or that analyze all or a portion of the input data. A combination neural network can be used to divide up tasks in solving a particular object sensing and identification problem. For example, one neural network can be used to identify an object occupying a space at the side of an automobile and a second neural network can be used to determine the position of the object or its location with respect to the vehicle, for example, in the blind spot. In another case, one neural network can be used merely to determine whether the data is similar to data upon which a main neural network has been trained or whether there is something significantly different about this data and therefore that the data should not be analyzed. Combination neural networks can sometimes be implemented as cellular neural networks. What has been described above is generally referred to as modular neural networks with and without feedback. Actually, the feedback does not have to be from the output to the input of the same neural network. The feedback from a downstream neural network could be input to an upstream neural network, for example. The neural networks can be combined in other ways, for example in a voting situation. Sometimes the data upon which the system is trained is sufficiently complex or imprecise that different views of the data will give different results. For example, a subset of transducers may be used to train one neural network and another subset to train a second neural network etc. The decision can then be based on a voting of the parallel neural networks, sometimes known as an ensemble neural network. In the past, neural networks have usually only been used in the form of a single neural network algorithm for identifying the occupancy state of the space near an automobile.

A trainable or a trained pattern recognition system as used herein generally means a pattern recognition system that is taught to recognize various patterns constituted within the signals by subjecting the system to a variety of examples. The most successful such system is the neural network used either singly or as a combination of neural networks. Thus, to generate the pattern recognition algorithm, test data is first obtained which constitutes a plurality of sets of returned waves, or wave patterns, or other information radiated or obtained from an object (or from the space in which the object will be situated in the passenger compartment, i.e., the space above the seat) and an indication of the identify of that object. A number of different objects are tested to obtain the unique patterns from each object. As such, the algorithm is generated, and stored in a computer processor, and which can later be applied to provide the identity of an object based on the wave pattern being received during use by a receiver connected to the processor and other information. For the purposes here, the identity of an object sometimes applies to not only the object itself but also to its location and/or orientation and velocity in the vicinity of the vehicle. For example, a vehicle that is stopped but pointing at the side of the host vehicle is different from the same vehicle that is approaching at such a velocity as to impact the host vehicle. Not all pattern recognition systems are trained systems and not all trained systems are neural networks. Other pattern recognition systems are based on fuzzy logic, sensor fusion, Kalman filters, correlation as well as linear and non-linear regression. Still other pattern recognition systems are hybrids of more than one system such as neural-fuzzy systems.

A pattern recognition algorithm will thus generally mean an algorithm applying or obtained using any type of pattern recognition system, e.g., a neural network, sensor fusion, fuzzy logic, etc.

To "identify" as used herein will generally mean to determine that the object belongs to a particular set or class. The class may be one containing, for example, all motorcycles, one containing all trees, or all trees in the path of the host vehicle depending on the purpose of the system.

To "ascertain the identity of" as used herein with reference to an object will generally mean to determine the type or nature of the object (obtain information as to what the object is), i.e., that the object is an car, a car on a collision course with the host vehicle, a truck, a tree, a pedestrian, a deer etc.

A "rear seat" of a vehicle as used herein will generally mean any seat behind the front seat on which a driver sits. Thus, in minivans or other large vehicles where there are more than two rows of seats, each row of seats behind the driver is considered a rear seat and thus there may be more than one "rear seat" in such vehicles. The space behind the front seat includes any number of such rear seats as well as any trunk spaces or other rear areas such as are present in station wagons.

In the description herein on anticipatory sensing, the term "approaching" when used in connection with the mention of an object or vehicle approaching another will usually mean the relative motion of the object toward the vehicle having the anticipatory sensor system. Thus, in a side impact with a tree, the tree will be considered as approaching the side of the vehicle and impacting the vehicle. In other words, the coordinate system used in general will be a coordinate system residing in the target vehicle. The "target" vehicle is the vehicle that is being impacted. This convention permits a general description to cover all of the cases such as where (i) a moving vehicle impacts into the side of a stationary vehicle, (ii) where both vehicles are moving when they impact, or (iii) where a vehicle is moving sideways into a stationary vehicle, tree or wall.

"Vehicle" as used herein includes any container that is movable either under its own power or using power from another vehicle. It includes, but is not limited to, automobiles, trucks, railroad cars, ships, airplanes, trailers, shipping containers, barges, etc. The word "container" will frequently be used interchangeably with vehicle however a container will generally mean that part of a vehicle that separate from and in some cases may exist separately and away from the source of motive power. Thus, a shipping container may exist in a shipping yard and a trailer may be parked in a parking lot without the tractor. The passenger compartment or a trunk of an automobile, on the other hand, are compartments of a container that generally only exists attaches to the vehicle chassis that also has an associated engine for moving the vehicle. Note a container can have one or a plurality of compartments.

"Transducer" or "transceiver" as used herein will generally mean the combination of a transmitter and a receiver. In come cases, the same device will serve both as the transmitter and receiver while in others two separate devices adjacent to each other will be used. In some cases, a transmitter is not used and in such cases transducer will mean only a receiver. Transducers include, for example, capacitive, inductive, ultrasonic, electromagnetic (antenna, CCD, CMOS arrays, laser, radar transmitter, terahertz transmitter and receiver, focal plane array, pin or avalanche diode, etc.), electric field, weight measuring or sensing devices. In some cases, a transducer will be a single pixel either acting alone, in a linear or an array of some other appropriate shape. In some cases, a transducer may comprise two parts such as the plates of a capacitor or the antennas of an electric field sensor. Sometimes, one antenna or plate will communicate with several other antennas or plates and thus for the purposes herein, a transducer will be broadly defined to refer, in most cases, to any one of the plates of a capacitor or antennas of a field sensor and in some other cases a pair of such plates or antennas will comprise a transducer as determined by the context in which the term is used.

A "wave sensor" or "wave transducer" is generally any device which senses either ultrasonic or electromagnetic waves. An electromagnetic wave sensor, for example, includes devices that sense any portion of the electromagnetic spectrum from ultraviolet down to a few hertz. The most commonly used kinds of electromagnetic wave sensors include CCD and CMOS arrays for sensing visible and/or infrared waves, millimeter wave and microwave radar, and capacitive or electric and/or magnetic field monitoring sensors that rely on the dielectric constant of the object occupying a space but also rely on the time variation of the field, expressed by waves as defined below, to determine a change in state.

A "CCD" will be defined to include all devices, including CMOS arrays, APS arrays, QWIP arrays or equivalent, artificial retinas and particularly HDRC arrays, which are capable of converting light frequencies, including infrared, visible and ultraviolet, into electrical signals. The particular CCD array used for many of the applications disclosed herein is implemented on a single chip that is less than two centimeters on a side. Data from the CCD array is digitized and sent serially to an electronic circuit (at times designated 120 herein) containing a microprocessor for analysis of the digitized data. In order to minimize the amount of data that needs to be stored, initial processing of the image data takes place as it is being received from the CCD array, as discussed in more detail above. In some cases, some image processing can take place on the chip such as described in a Kage et al. artificial retina article referenced in parent applications.

An "occupant protection apparatus" is any device, apparatus, system or component which is actuatable or deployable or includes a component which is actuatable or deployable for the purpose of attempting to reduce injury to the occupant in the event of a crash, rollover or other potential injurious event involving a vehicle Inertial measurement unit (IMU), inertial navigation system (INS) and inertial reference unit (IRU) will in general be used be used interchangeably to mean a device having a plurality of accelerometers and a plurality of gyroscopes generally within the same package. Usually such a device will contain 3 accelerometers and 3 gyroscopes. In some cases a distinction will be made whereby the INS relates to an IMU or an IRU plus additional sensors and software such as a GPS, speedometer, odometer or other sensors plus optimizing software which may be based on a Kalman filter.

A precise positioning system or PPS is a system based on some information, usually of a physical nature, in the infrastructure that determines the precise location of a vehicle independently of a GPS-based system or the IMU. Such a system is employed as a vehicle is traveling and passes a particular location. A PPS can make use of various technologies including radar, laser radar, terahertz radar, RFID tags located in the infrastructure, MIR transmitters and receivers. Such locations are identified on a map database resident within the vehicle. In one case, for example, the map database contains data from a terahertz radar continuous scan of the environment to the side of a vehicle from a device located on a vehicle and pointed 45 degrees up relative to the horizontal plane. The map database contains the exact location of the vehicle that corresponds to the scan. Another vehicle can then determine its location by comparing its scan data with that stored with the map database and when there is a match, the vehicle knows its location. Of course many other technologies can be used to accomplish a similar result.

Unless stated otherwise, laser radar, lidar and ladar will be considered equivalent herein. In all cases, they represent a projected laser beam, which can be in the visual part of the electromagnetic spectrum but generally will be the infrared part of the electromagnetic spectrum and usually in the near infrared wavelengths. The projected laser beam can emanate from the optics as a nearly parallel beam or as a beam that diverges at any desired angle from less than zero degrees to ten or more of degrees depending on the application. A particular implementation may use a laser beam that at one time diverges at an angle less than one degree and at another time may diverge at several degrees using adjustable optics. The laser beam can have a diameter as it leaves the vehicle ranging from less than a millimeter to several centimeters. The above represent typical or representative ranges of dimensions but this invention is not limited by these ranges.

OBJECTS AND SUMMARY OF THE INVENTION

It is an object of the present invention to provide new and improved methods and systems for preventing accidents between vehicles.

In order to achieve this object and others, an accident avoidance system for a host vehicle in accordance with the invention includes a global positioning system residing on the host vehicle for determining the host vehicle's location as the host vehicle travels based on signals received from one or more satellites, a map database comprising digital maps corresponding to an area comprising the location of the host vehicle as determined by the global positioning system, a vehicle-to-vehicle communication system residing on the host vehicle operative for receiving signals comprising location information acquired by global positioning systems residing on other vehicles directly from the other vehicles indicating the locations of the other vehicles, and a navigation system comprising a display residing on the host vehicle for displaying images to an occupant of the host vehicle showing the digital maps and indications of the locations of the host vehicle and the other vehicles on the digital maps, and for updating the images shown on the navigation system display to reflect changes in the locations of the host vehicle and the other vehicles.

The signals received by the vehicle-to-vehicle communication system may be indications of the velocities and directions of travel of the other vehicles. The global positioning system may include a differential correction signal receiver operable for receiving global positioning differential correction signals from a global positioning augmentation system. Accordingly, the global positioning system may use the global positioning differential correction signals in the determination of the location of the host vehicle.

In one embodiment, a processor determines that a potential collision is likely to occur between the host vehicle and one of the other vehicles and a warning system operative for alerting an operator of the host vehicle of the potential collision. The processor can reside on the host vehicle or apart from the host vehicle.

When the host vehicle has an assigned corridor of travel, a processor can determine that the host vehicle will potentially exit its assigned corridor of travel and alert an operator of the host vehicle of the potential exit from the assigned corridor of travel via a warning system. The warning system may generate an audible warning and/or cause the navigation system display to indicate an alarm.

The map database may include one or more digital maps indicating at least one edge and surface shape of a roadway on which the host vehicle is traveling, indicating an elevation of a roadway on which the host vehicle is traveling, indicating an edge of a roadway on which the host vehicle is traveling and/or indicating a character of land beyond the edge of the roadway.

When the host vehicle includes a radar system, and while the host vehicle is traveling, the radar system can acquire a location of an object in the area comprising the location of the host vehicle and the navigation system is operative for indicating the location of the object on a map shown on the navigation system display.

When the host vehicle includes a data acquisition system, and while the host vehicle is traveling, the data acquisition system may receive a digital map transmitted from a site remote from the host vehicle and the navigation system displays the received digital map on the navigation system display. Additionally or alternatively, the data acquisition system receives weather condition information pertaining to the area where the host vehicle is located transmitted from a site remote from the host vehicle and the navigation system indicates the weather condition information on the navigation system display.

The host vehicle may be an aircraft. In this case, the area comprising the location of the host vehicle includes a roadway comprising an aircraft runway. The other vehicles may be aircraft landing in the area comprising the location of the host vehicle. Moreover, the global positioning system may include a differential correction signal receiver operable for receiving global positioning differential correction signals from a global positioning augmentation system, and the global positioning system residing on the vehicle uses the global positioning differential correction signals in the determination of the location of the vehicle. The differential correction signal receiver may receive the global positioning differential correction signals from a local area augmentation system. The differential correction signal receiver may alternatively receive the global positioning differential correction signals from a wide area augmentation system.

The host vehicle may also be an automobile operating on a travel lane, and the area comprising the location of the host vehicle comprises the travel lane.

When the host vehicle comprises an aircraft operating on a roadway comprising an aircraft runway, and the area comprising the location of the host vehicle can comprise the aircraft runway.

The vehicle-to-vehicle communication system may be arranged to transmit location, velocity and/or direction of travel information of the host vehicle to the other vehicles.

A method for avoiding accidents involving a host vehicle and another vehicle in accordance with the invention includes providing a global positioning system onboard the host vehicle and using the global positioning system to determine the host vehicle's location as the host vehicle travels based on signals received from one or more satellites, providing a map database onboard the host vehicle comprising digital maps corresponding to an area comprising the location of the host vehicle as determined by the global positioning system, providing a vehicle-to-vehicle communication system onboard the host vehicle and using the vehicle-to-vehicle communication system to receive signals comprising location information acquired by global positioning systems residing on the other vehicle directly from the other vehicle indicating a location of the other vehicle, providing a navigation system comprising a display onboard the host vehicle and displaying images on the navigation system display comprising the digital maps and indications of the locations of the host vehicle and the other vehicle on the digital maps, and updating the images shown on the navigation system display to reflect changes in the locations of the host vehicle and the other vehicle.

In one embodiment, signals are received from the other vehicle indicating the velocity and direction of travel of the other vehicle.

In one embodiment, a determination is made as to whether a potential collision is likely to occur between the host vehicle and the other vehicle and a warning is activated to alert an operator of the host vehicle of the potential collision. The warning may be an audible warning and/or an alarm indicated on the display.

Determining the host vehicle's location may entail receiving and using global positioning differential correction signals from a global positioning augmentation system to determine the host vehicle's location.

A digital map may be displayed on the navigation system display indicating at least one edge and surface shape of a roadway on which the host vehicle is traveling. An elevation of a roadway on which the host vehicle is traveling may additionally or alternatively be displayed on the navigation system display. A digital map may additionally or alternatively be displayed on the navigation system display indicating an edge of a roadway on which the host vehicle is traveling and a character of land beyond the edge of the roadway.

In one embodiment, a radar system is provided onboard the host vehicle and used to acquire a location of an object in the area comprising the location of the host vehicle. The acquired location of the object is displayed on a digital map shown on the navigation system display.

While the host vehicle is traveling, a digital map transmitted from a site remote from the host vehicle can be received and the received digital map is displayed on the navigation system display.

Also while the host vehicle is traveling, weather condition information pertaining to the area comprising the location of the host vehicle transmitted from a site remote from the host vehicle can be received and the weather condition information indicated on the navigation system display.

Location, velocity, and direction of travel information can be generated by the host vehicle and transmitted from the host vehicle directly to the other vehicle(s).

An accident avoidance system for preventing accidents between first and second vehicles in accordance with the invention includes a first global positioning system residing on the first vehicle for determining the first vehicle's location as the first vehicle travels based on signals received from one or more satellites, a first map database comprising digital maps corresponding to an area comprising the location of the first vehicle as determined by the first global positioning system, a first vehicle-to-vehicle communication system residing on the first vehicle and operative for transmitting signals directly to the second vehicle indicating the location of the first vehicle as determined by the first global positioning system, and for receiving signals directly from the second vehicle indicating the location of the second vehicle, a first navigation system comprising a first navigation system display residing on the first vehicle for displaying images to an occupant of the first vehicle which comprise the digital maps and indications of the locations of the first and second vehicles on the digital maps, and for updating the images shown on the first navigation system display to reflect changes in the locations of the first and second vehicles, a second global positioning system residing on the second vehicle for determining the second vehicle's location as the second vehicle travels based on signals received from the one or more satellites, a second map database comprising digital maps corresponding to an area comprising the location of the second vehicle as determined by the second global positioning system, a second vehicle-to-vehicle communication system residing on the second vehicle and operative for transmitting signals directly to the first vehicle indicating the location of the second vehicle as determined by the second global positioning system, and for receiving signals directly from the first vehicle indicating the location of the first vehicle, and a second navigation system comprising a second navigation system display residing on the second vehicle for displaying images to an occupant of the second vehicle which comprise the digital maps and indications of the locations of the first and second vehicles on the digital maps, and for updating the images shown on the second navigation system display to reflect changes in the locations of the first and second vehicles.

The signals received by each vehicle-to-vehicle communication system may also comprise indications of the velocity and direction of travel of the other vehicle.

The global positioning system residing on each vehicle may also include a differential correction signal receiver operable for receiving global positioning differential correction signals from a global positioning augmentation system, and the global positioning system uses the global positioning differential correction signals in the determination of the location of the host vehicle.

The first vehicle may include a processor operative for determining that a potential collision is likely to occur between the first and second vehicles and a warning system operative for alerting an operator of the first vehicle of the potential collision. The first vehicle can also include a radar system, and while the first vehicle is traveling, the radar system is operable for acquiring a location of an object in the area comprising the location of the host vehicle and the first navigation system is operative for indicating the location of the object on a map shown on its navigation system display. The first vehicle can also include a data acquisition system, and while the first vehicle is traveling, the data acquisition system is operative for receiving a digital map transmitted from a site remote from the first vehicle and the first navigation system is operative for displaying the received digital map on its navigation system display. Additionally or alternatively, the data acquisition system is operative for receiving weather condition information pertaining to the area where the first vehicle is located transmitted from a site remote from the first vehicle, and the first navigation system is operative for indicating the weather condition information on its navigation system display.

The first or second vehicles may comprise an aircraft. In this case, the area comprising the location of the first vehicle includes a roadway comprising an aircraft runway. More specifically, the first vehicle may be an aircraft landing in the area comprising the location of the second vehicle. The first vehicle may be an aircraft operating on a roadway comprising an aircraft runway.

Other improvements will now be obvious to those skilled in the art. The above features are meant to be illustrative and not definitive.

Preferred embodiments of the inventions are shown in the drawings and described in the detailed description below. Unless specifically noted, it is applicants' intention that the words and phrases in the specification and claims be given the ordinary and accustomed meaning to those of ordinary skill in the applicable art(s). If applicants intend any other meaning, they will specifically state they are applying a special meaning to a word or phrase.

Likewise, applicants' use of the word "function" in the detailed description is not intended to indicate that they seek to invoke the special provisions of 35 U.S.C. § 112, ¶6 to define their inventions. To the contrary, if applicants wish to invoke the provision of 35 U.S.C. §112, ¶6, to define their inventions, they will specifically set forth in the claims the phrases "means for" or "step for" and a function, without also reciting in that phrase any structure, material or act in support of the function. Moreover, even if applicants invoke the provisions of 35 U.S.C. §112, ¶6, to define their inventions it is applicants' intention that their inventions not be limited to the specific structure, material or acts that are described in preferred embodiments. Rather, if applicants claim their inventions by specifically invoking the provisions of 35 U.S.C. §112, ¶6, it is nonetheless their intention to cover and include any and all structures, materials or acts that perform the claimed function, along with any and all known or later developed equivalent structures, materials or acts for performing the claimed function.

For example, the present inventions make use of GPS satellite location technology, including the use of MIR or RFID triads or radar and reflectors, to derive kinematic vehicle location and motion trajectory parameters for use in a vehicle collision avoidance system and method. The inventions described herein are not to be limited to the specific GPS devices or PPS devices disclosed in the preferred embodiments, but rather, are intended to be used with any and all such applicable satellite and infrastructure location devices, systems and methods, as long as such devices, systems and methods generate input signals that can be analyzed by a computer to accurately quantify vehicle location and kinematic motion parameters in real time. Thus, the GPS and PPS devices and methods shown and referenced generally throughout this disclosure, unless specifically noted, are intended to represent any and all devices appropriate to determine such location and kinematic motion parameters.

Likewise, for example, the present inventions generate surveillance image information for analysis by scanning using any applicable image or video scanning system or method. The inventions described herein are not to be limited to the specific scanning or imaging devices or to a particular electromagnetic frequency or frequency range or part of the electromagnetic spectrum disclosed in preferred embodiments, but rather, are intended to be used with any and all applicable electronic scanning devices, as long as the device can generate an output signal that can be analyzed by a computer to detect and categorize objects. Thus, the scanners or image acquisition devices are shown and referenced generally throughout this disclosure, and unless specifically noted, are intended to represent any and all devices appropriate to scan or image a given area. Accordingly, the words "scan" or "image" as used in this specification should be interpreted broadly and generically.

Further, there are disclosed several processors or controllers, that perform various control operations. The specific form of processor is not important to the invention. In its preferred form, applicants divide the computing and analysis operations into several cooperating computers or microprocessors. However, with appropriate programming well known to those of ordinary skill in the art, the inventions can be implemented using a single, high power computer. Thus, it is not applicants' intention to limit their invention to any particular form or location of processor or computer. For example, it is contemplated that in some cases, the processor may reside on a network connected to the vehicle such as one connected to the Internet.

Further examples exist throughout the disclosure, and it is not applicants' intention to exclude from the scope of their inventions the use of structures, materials, or acts that are not expressly identified in the specification, but nonetheless are capable of performing a claimed function.

The above and other objects are achieved in the present invention which provides motor vehicle collision avoidance, warning and control systems and methods using GPS satellite location systems augmented with Precise Positioning Systems to provide centimeter location accuracy, and to derive vehicle attitude and position coordinates and vehicle kinematic tracking information. GPS location and computing systems being integrated with vehicle video scanning, radar, laser radar, terahertz radar and onboard speedometer and/or accelerometers and gyroscopes to provide accurate vehicle location information together with information concerning hazards and/or objects that represent impending collision situations for each vehicle. Advanced image processing techniques are used to quantify video information signals and to derive vehicle warning and control signals based upon detected hazards.

Outputs from multiple sensors as described above are used in onboard vehicle neural network and neural-fuzzy system computing algorithms to derive optimum vehicle warning and control signals designed to avoid vehicle collisions with other vehicles or with other objects or hazards that may be present on given roadways. In a preferred embodiment, neural fuzzy control algorithms are used to develop coordinated braking, acceleration and steering control signals to control individual vehicles, or the individual wheels of such vehicles, in an optimal manner to avoid or minimize the effects of potential collisions. Video, radar, laser radar, terahertz radar and GPS position and trajectory information are made available to each individual vehicle describing the movement of that vehicle and other vehicles in the immediate vicinity of that vehicle.

In addition, hazards or other obstacles that may represent a potential danger to a given vehicle are also included in the neural fuzzy calculations. Objects, obstacles and/or other vehicles located anywhere to the front, rear or sides of a given vehicle are considered in the fuzzy logic control algorithms in the derivation of optimal control and warning signals.

The above and other objects and advantages of the present invention are achieved by preferred embodiments that are summarized and described in detail below.

BRIEF DESCRIPTION OF THE DRAWINGS

The various hardware and software elements used to carry out the invention described herein are illustrated in the form of system diagrams, block diagrams, flow charts, and depictions of neural network algorithms and structures. Preferred embodiments are illustrated in the following figures:

FIG. 1 illustrates the GPS satellite system with the 24 satellites revolving around the earth.

FIG. 2 illustrates four GPS satellites transmitting position information to a vehicle and to a base station which in turn transmits the differential correction signal to the vehicle.

DETAILED DISCUSSION OF PREFERRED EMBODIMENTS

1. Vehicle Collision Warning and Control

Figure 11:
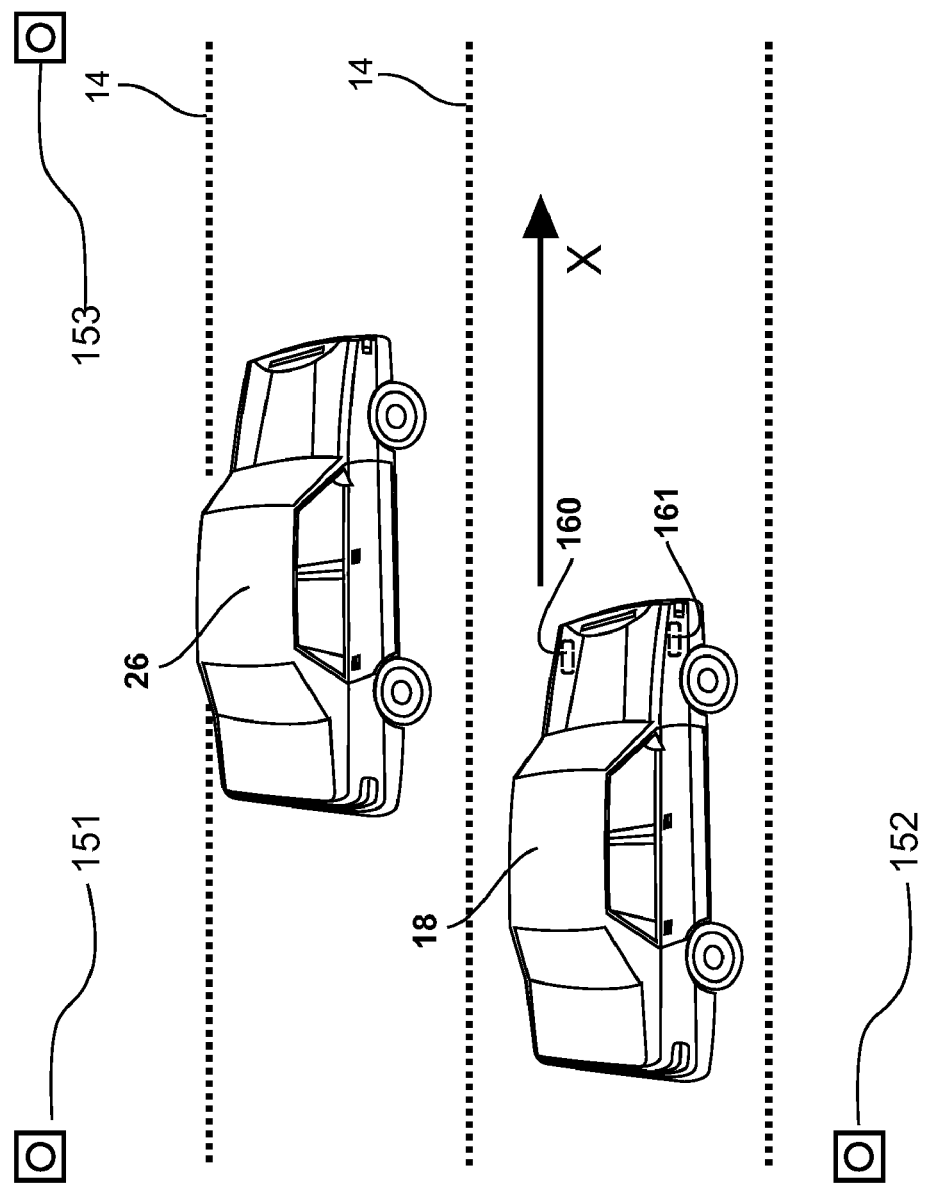
FIG. 11 illustrates the use of a Precise Positioning System employing three micropower impulse radar transmitters, two or three radar reflectors or three RFID tags in a configuration to allow a vehicle to accurately determine its position.

According to U.S. Pat. No. 5,506,584, the stated goals of the US DOT IVHS system are:

- improving the safety of surface transportation
- increasing the capacity and operational efficiency of the surface transportation system
- enhancing personal mobility and the convenience and comfort of the surface transportation system
- reducing the environmental and energy impacts of the surface transportation system The RtZF™ system in accordance with the present invention satisfies all of these goals at a small fraction of the cost of prior art systems. The safety benefits have been discussed above. The capacity increase is achieved by confining vehicles to corridors where they are then permitted to travel at higher speeds. This can be achieved immediately where carrier phase DGPS is available or with the implementation of the highway-located precise location systems as shown in FIG. 11. An improvement is to add the capability for the speed of the vehicles to be set by the highway or highway control system. This is a simple additional few bytes of information that can be transmitted along with the road edge location map, thus, at very little initial cost. To account for the tolerances in vehicle speed control systems, the scanning laser radar, or other technology system, which monitors for the presence of vehicles without RtZF™ is also usable as an adaptive cruise control system. Thus, if a faster moving vehicle approaches a slower moving vehicle, it will automatically slow down to keep a safe separation distance from the leading, slower moving vehicle. Although the system is not planned for platooning, that will be the automatic result in some cases. The maximum packing of vehicles is automatically obtained and thus the maximum vehicle flow rate is also achieved with a very simple system.

For the Intelligent Highway System (ITS) application, some provision is required to prevent unequipped vehicles from entering the restricted lanes. In most cases, a barrier will be required since if an errant vehicle did enter the controlled lane, a serious accident could result. Vehicles would be checked while traveling down the road or at a tollbooth, or similar station, that the RtZF™ system was in operation without faults and with the latest updated map for the region. Only those vehicles with the RtZF™ system in good working order would be permitted to enter. The speed on the restricted lanes would be set according to the weather conditions and fed to the vehicle information system automatically, as discussed above. Automatic tolling based on the time of day or percentage of highway lane capacity in use can also be easily implemented.

For ITS use, there needs to be a provision whereby a driver can signal an emergency, for example, by putting on the hazard lights. This would permit the vehicle to leave the roadway and enter the shoulder when the vehicle velocity is below a certain level. Once the driver provides such a signal, the roadway information system, or the network of vehicle-based control systems, would then reduce the speed of all vehicles in the vicinity until the emergency has passed. This roadway information system need not be actually associated with the particular roadway and also need not require any roadway infrastructure. It is a term used here to represent the collective system as operated by the network of nearby vehicles and the inter-vehicle communication system. Eventually, the occurrence of such emergency situations will be eliminated by vehicle-based failure prediction systems such as described in U.S. Pat. No. 5,809,437.

Emergency situations will develop on intelligent highways. It is difficult to access the frequency or the results of such emergencies. The industry has learned from airbags that if a system is developed which saves many lives but causes a few deaths, the deaths will not be tolerated. The ITS system, therefore, must operate with a very high reliability, that is approaching "zero fatalities"™. Since the brains of the system will reside in each vehicle, which is under the control of individual owners, there will be malfunctions and the system must be able to adapt without causing accidents. An alternative is for the brains to reside on the network providing that the network connection is reliable.

Spacing of the vehicles is the first line of defense. Secondly, each vehicle with a RtZF™ system has the ability to automatically communicate to all adjacent vehicles and thus immediately issue a warning when an emergency event is occurring. Finally, with the addition of a total vehicle diagnostic system, such as disclosed in U.S. Pat. No. 5,809,437 (Breed), "On Board Vehicle Diagnostic System", potential emergencies can be anticipated and thus eliminated with high reliability.

Although the application for ITS envisions a special highway lane and high speed travel, the potential exists in the invention to provide a lower measure of automatic guidance where the operator can turn control of the vehicle over to the RtZF™ system for as long as the infrastructure is available. In this case, the vehicle would operate in normal lanes but would retain its position in the lane and avoid collisions until a decision requiring operator assistance is required. At that time, the operator would be notified and if he or she did not assume control of the vehicle, an orderly stopping of the vehicle, e.g., on the side of the road, would occur.

For all cases where vehicle steering control is assumed by the RtZF™ system, an algorithm for controlling the steering should be developed using neural networks or neural fuzzy systems. This is especially true for the emergency cases discussed herein where it is well known that operators frequently take the wrong actions and at the least, they are slow to react. Algorithms developed by other non-pattern recognition techniques do not, in general, have the requisite generality or complexity and are also likely to make the wrong decisions (although the use of such systems is not precluded in the invention). When the throttle and breaking functions are also handled by the system, an algorithm based on neural networks or neural fuzzy systems is even more important.

For the ITS, the driver will enter his or her destination so that the vehicle knows ahead of time where to exit. Alternately, if the driver wishes to exit, he merely turns on his turn signal, which tells the system and other vehicles that he or she is about to exit the controlled lane.

Figure 9:
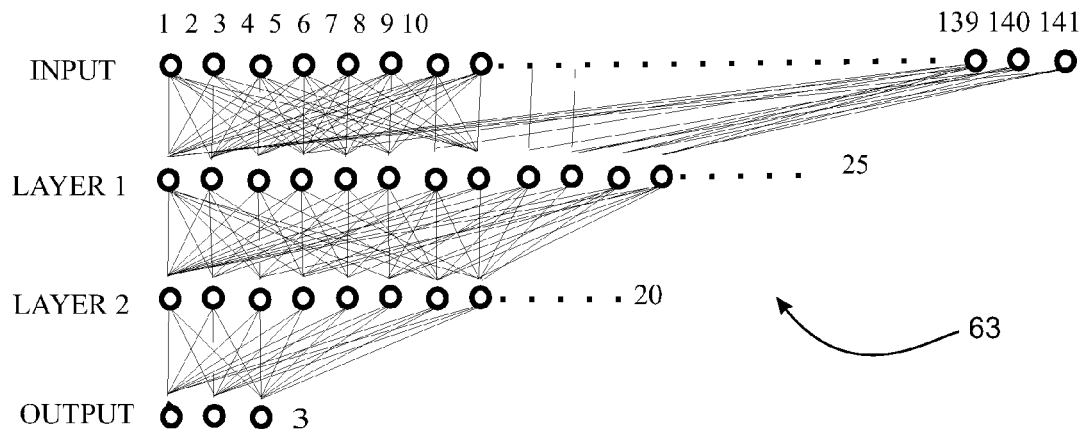
FIG. 9 is a schematic diagram illustrating a neural network of the type useful in the image analysis computer of FIG. 5.

Neural networks have been mentioned above and since they can play an important role in various aspects of the invention, a brief discussion is now presented here. FIG. 9 is a schematic diagram illustrating a neural network of the type useful in image analysis. Data representing features from the images from the CMOS cameras 60 are input to the neural network circuit 63, and the neural network circuit 63 is then trained on this data (see FIG. 6). More specifically, the neural network circuit 63 adds up the feature data from the CMOS cameras 60 with each data point multiplied by an associated weight according to the conventional neural network process to determine the correlation function.

In this embodiment, 141 data points are appropriately interconnected at 25 connecting points of layer 1, and each data point is mutually correlated through the neural network training and weight determination process. In some implementations, each of the connecting points of the layer 1 has an appropriate threshold value, and if the sum of measured data exceeds the threshold value, each of the connecting points will output a signal to the connecting points of layer 2. In other cases, an output value or signal will always be outputted to layer 2 without thresholding.

The connecting points of the layer 2 comprises 20 points, and the 25 connecting points of the layer 1 are appropriately interconnected as the connecting points of the layer 2. Similarly, each data value is mutually correlated through the training process and weight determination as described above and in neural network texts. Each of the 20 connecting points of the layer 2 can also have an appropriate threshold value, if thresholding is used, and if the sum of measured data exceeds the threshold value, each of the connecting points will output a signal to the connecting points of layer 3.

The connecting points of the layer 3 comprises 3 points in this example, and the connecting points of the layer 2 are interconnected at the connecting points of the layer 3 so that each data is mutually correlated as described above.

The value of each connecting point is determined by multiplying weight coefficients and summing up the results in sequence, and the aforementioned training process is to determine a weight coefficient Wj so that the value (ai) is a previously determined output.

$$ai = \Sigma Wj \cdot Xj (j=1 \text{ to } N) + W_0$$

wherein Wj is the weight coefficient,
Xj is the data
N is the number of samples and
$W_0$ is bias weight associated with each node.

Based on this result of the training, the neural network circuit 63 generates the weights and the bias weights for the coefficients of the correlation function or the algorithm.

At the time the neural network circuit 63 has learned from a suitable number of patterns of the training data, the result of the training is tested by the test data. In the case where the rate of correct answers of the object identification unit based on this test data is unsatisfactory, the neural network circuit 63 is further trained and the test is repeated. Typically, about 200,000 feature patterns are used to train the neural network 63 and determine all of the weights. A similar number is then used for the validation of the developed network. In this simple example chosen, only three outputs are illustrated. These can represent another vehicle, a truck and a pole or tree. This might be suitable for an early blind spot detector design. The number of outputs depends on the number of classes of objects that are desired. However, too many outputs can result in an overly complex neural network and then other techniques such as modular neural networks can be used to simplify the process. When a human looks at a tree, for example, he or she might think "what kind of tree is that?" but not "what kind of tiger is that". The human mind operates with modular or combination neural networks where the object to be identified is first determined to belong to a general class and then to a subclass etc. Object recognition neural networks can frequently make use of this principle with a significant simplification resulting.

In the above example, the image was first subjected to a feature extraction process and the feature data was input to the neural network. In other cases, especially as processing power continues to advance, the entire image is input to the neural network for processing. This generally requires a larger neural network. Alternate approaches use data representing the difference between two frames and the input data to the neural network. This is especially useful when a moving object of interest is in an image containing stationary scenery that is of no interest. This technique can be used even when everything is moving by using the relative velocity as a filter to remove unwanted pixel data. Any variations are possible and will now be obvious to those skilled in the art. Alternately, this image can be filtered based on range, which will also significantly reduce the number of pixels to be analyzed.

In another implementation, the scenes are differenced based on illumination. If infrared illumination is used, for example, the illumination can be turned on and off and images taken and then differenced. If the illumination is known only to illuminate an object of interest then such an object can be extracted from the background by this technique. A particularly useful method is to turn the illumination on and off for alternate scan lines in the image. Adjacent scan lines can then be differenced and the resulting image sent to the neural network system for identification.

The neural network can be implemented as an algorithm on a general-purpose microprocessor or on a dedicated parallel processing DSP, neural network ASIC or other dedicated parallel or serial processor. The processing speed is generally considerably faster when parallel processors are used and this can also permit the input of the entire image for analysis rather than using feature data. A combination of feature and pixel data can also be used.

Neural networks have certain known potential problem areas that various researchers have attempted to eliminate. For example, if data representing an object that is totally different from those objects present in the training data is input to the neural network, an unexpected result can occur which, in some cases, can cause a system failure. To solve this and other neural network problems, researchers have resorted to adding in some other computational intelligence principles such as fuzzy logic resulting in a neural-fuzzy system, for example. As the RtZF™ system evolves, such refinements will be implemented to improve the accuracy of the system. Thus, although pure neural networks are currently being applied to the problem, hybrid neural networks such as modular, combination, ensemble and fuzzy neural networks will undoubtedly evolve.

Figure 10:
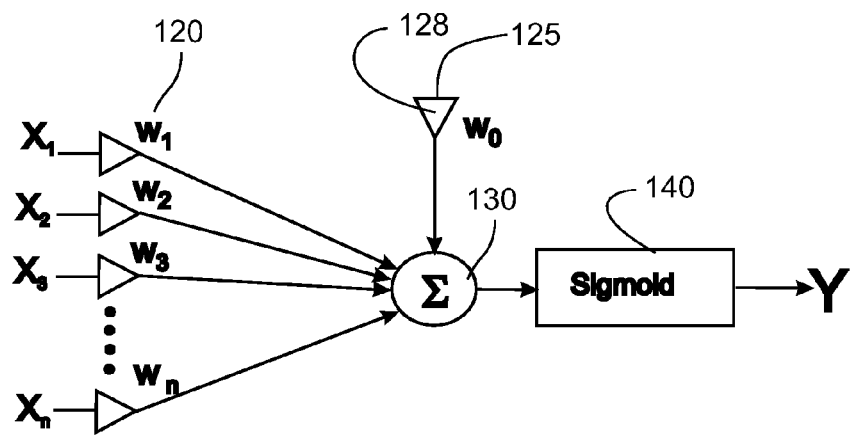
FIG. 10 is a schematic diagram illustrating the structure of a node processing element in the neural network of FIG. 9.

A typical neural network processing element known to those skilled in the art is shown in FIG. 10 where input vectors, (X1, X2, . . . , Xn) are connected via weighing elements 120 (W1, W2, . . . , Wn) to a summing node 130. The output of node 130 is passed through a nonlinear processing element 140, typically a sigmoid function, to produce an output signal, Y. Offset or bias inputs 125 can be added to the inputs through weighting circuit 128. The output signal from summing node 130 is passed through the nonlinear element 140 which has the effect of compressing or limiting the magnitude of the output Y.

Neural networks used in the accident avoidance system of this invention are trained to recognize roadway hazards including automobiles, trucks, animals and pedestrians. Training involves providing known inputs to the network resulting in desired output responses. The weights are automatically adjusted based on error signal measurements until the desired outputs are generated. Various learning algorithms may be applied with the back propagation algorithm with the Delta Bar rule as a particularly successful method.

2. Accurate Navigation 2.1 GPS

FIG. 1 shows the current GPS satellite system associated with the earth and including 24 satellites 2, each satellite revolving in a specific orbital path 4 around the earth. By means of such a GPS satellite system, the position of any object can be determined with varying degrees of precision as discussed in detail herein. A similar system will appear when the European Galileo system is launched perhaps doubling the number of satellites.

2.2 DGPS, WAAS, LAAS and Pseudolites

FIG. 2 shows an arrangement of four satellites 2 designated $SV_1$, $SV_2$, $SV_3$ and $SV_4$ of the GPS satellite system shown in FIG. 1 transmitting position information to receiver means of a base station 20, such as an antenna 22, which in turn transmits a differential correction signal via transmitter means associated with that base station, such as a second antenna 16, to a vehicle 18.

Additional details relating to FIGS. 1 and 2 can be found in U.S. Pat. No. 5,606,506 to Kyrtsos.

Figure 3:
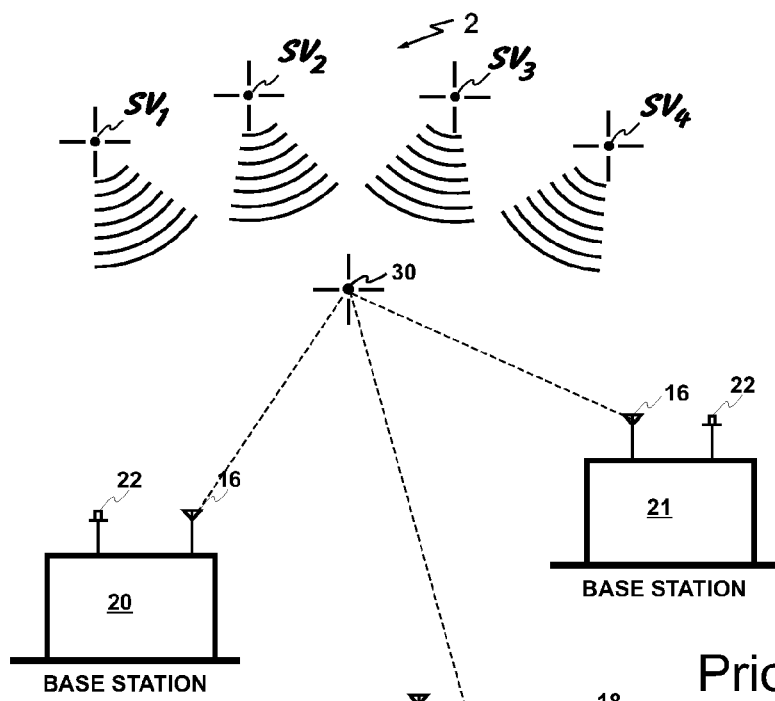
FIG. 3 illustrates a WADGPS system with four GPS satellites transmitting position information to a vehicle and to a base station which in turn transmits the differential correction signal to the vehicle.

FIG. 3 shows an arrangement of four satellites 2 designated $SV_1$, $SV_2$, $SV_3$ and $SV_4$ of the GPS satellite system as in FIG. 2 transmitting position information to receivers of base stations 20 and 21, such as an antenna 22, which in turn transmit a differential correction signal via transmitters associated with that base stations, such as a second antenna 16, to a geocentric or low earth orbiting (LEO) satellite 30 which in turn transmits the differential correction signals to vehicle 18.

In this case, one or more of the base stations 20,21 receives and performs a mathematical analysis on all of the signals received from a number of base stations that cover the area under consideration and forms a mathematical model of the errors in the GPS signals over the entire area. For the CONUS, for example, a group of 13 base stations are operated by OmniStar that are distributed around the country. By considering data from the entire group of such stations, the errors in the GPS signals for the entire area can be estimated resulting in a position accuracy of about 6-10 cm over the entire area. The corrections are then uploaded to the geocentric or low earth orbiting satellite 30 for retransmission to vehicles on the roadways. In this way, such vehicles are able to determine their absolute position to within about 6-10 centimeters. This is known as Wide Area Deferential GPS or WADGPS.

It is important to note that future GPS and Galileo satellite systems plan for the transmission of multiple frequencies for civilian use. Like a lens, the ionosphere diffracts different frequencies by different amounts and thus the time of arrival of a particular frequency will depend on the value of that frequency. This fact can be used to determine the amount that each frequency is diffracted and thus the delay or error introduced by the ionosphere. Thus with more than one frequency being emitted by a particular satellite, the equivalent of the DGPS corrections can be determined be each receiver and there in no longer a need for DGPS, WADGPS, WAAS, LAAS and similar systems.

The WAAS system is another example of WADGPS for use with airplanes. The U.S. Government estimates that the accuracy of the WAAS system is about 1 meter in three dimensions. Since the largest error is in the vertical direction, the horizontal error is much less.

2.3 Carrier Phase Measurements

If a receiver can receive signals by two paths from a satellite it can measure the phase difference between the two paths and, provided that there are not any extra cycles in one of the paths, the path difference can be determined to less than one centimeter. The fact that there may be an integer number of extra cycles in one path and not in the other is what is called the integer ambiguity problem and a great deal of attention has been paid in the literature to resolving this ambiguity. Using the Precise Positioning System (PPS) described in detail below where a vehicle becomes its own DGPS system, the carrier phase ambiguity problem also disappears since the number of additional cycles can be determined as the vehicle travels away from the PPS. In other words, there are no extra cycles when the vehicle is at the PPS and as it moves away, it will still know the state of the cycles at the PPS and can then calculate the increase or decrease in the cycles at the host vehicle as it moves relatively away from or closer to the transmitting satellite. There is no ambiguity when the vehicle is at the PPS station and that is maintained as long as the lock on a satellite is not lost for more than a few minutes providing that there is an accurate clock within the vehicle.

There are other sources of information that can be added to increase the accuracy of position determination. The use of GPS with four satellites provides the three dimensional location of the vehicle plus time. Of the dimensions, the vertical position is the least accurately known, yet, if the vehicle knows where it is on the roadway, the vertical dimension is not only the least important but it is also already accurately known from the roadmap information plus the inertial guidance system.

2.4 Inertial Navigation System

In the system of the inventions herein, the vehicle will generally have an inertial measurement unit, inertial reference unit or an inertial navigation system which for the purposes herein will be treated as identical. Such a device typically has three accelerometers and three gyroscopes that are held together in a single housing. Typically, these 6 devices are MEMS devices and inherently are very inexpensive. Some companies then proceed to carefully test each component to determine the repeatable effects that various environmental factors and aging has on the performance of each device, and then associates with each device a calibration or constitute equation that translates the readings of the device to actual values based on the environmental variable values and time. This process adds significantly to the cost and in fact may be the dominant cost. The problem is that age, for example, may affect a device differently based on how the aging takes place, at high or low temperatures, for example. Also shock or some other unexpected event can change the properties of a device. In the present invention, on the other hand, this complicated and expensive calibration process is not performed and thus a calibration equation is not frozen into the device. Since the IMU will be part of a vehicle system and that system will periodically, either from the GPS-DGPS type system or from the PPS, know its exact location, that fact will be used to derive a calibration equation for each device and since other information such as temperature etc. will also be known that parameter can also be part of the equation. The equation can thus be a changing part of the system that automatically adjusts to actual experience of the vehicle in the field. Thus, not only is the IMU more accurate than the prior art but it is considerably less expensive. One method for handling this change and recalculation of the calibration equations would be to use an adaptive neural network that has a forgetting function. Properly designed, this network can allow the calibration equations to adjust and slowly change over time always providing the most accurate values regardless of how the devices are changing in their sensitivity to temperature, for example.

The fact that the IMU resident devices are continuously calibrated using external measurements renders the IMU an extremely accurate device comparable with military grade IMUs costing thousands of dollars. The IMU is far more accurate, for example, than the crash sensor or chassis control accelerometers and gyroscopes that are currently being deployed on a vehicle. Thus, when mounting location considerations permit, the IMU can take over the functions currently performed by these other devices. This will not only increase the accuracy of these other functions but reduce the total cost by eliminating the need for redundant parts and permitting economies in the electronic circuits and processors to be realized. The airbag SDM can now be housed with the IMU, for example, and similarly for the chassis control electronics. If the IMU has the full complement of three gyros and three accelerometers, then this additional information can be used to substantially improve the crash sensing algorithms or the chassis control algorithms. The sensing and predicting or a rollover event, for example, and the subsequent control of the throttle, brakes and steering systems as well as the timely deployment of the side and curtain airbags. Thus, the use of the IMU for these functions, particularly for the rollover prediction, mitigation and restraint deployment functions, are a key teaching of this invention.

As discussed below, many sensors can be used to correct the errors in the IMU in addition to the GPS and PPS-based systems. A gravity meter can determine the direction of vertically down and can especially be used when the vehicle is not moving. A magnetic flux gate compass and/or declinometer values can be included in the map database and compared by the host vehicle as it passes mapped areas. Doppler radar or other velocity measurements from the exterior vehicle monitoring system can provide valuable velocity information. Vision systems can be used to correct for position if such data is stored on the map database. If, for example, a stored picture shows a signpost at a particular location that can be viewed by a resident vision system, then this can also be useful information for correcting errors in the IMU.

In many cases, especially before the system implementation becomes mature and the complete infrastructure is in place, there will be times when a particular vehicle system is not operational. This could be due to obstructions hiding a clear view of a sufficient number of GPS satellites, such as when a vehicle enters a tunnel. It could also be due to a lack of road boundary information, due to construction or the fact that the road has not been surveyed and the information recorded and made available to the vehicle, or a variety of other causes. It is contemplated, therefore, that each equipped vehicle will contain a warning light or other system that warns the driver or the vehicle control system when the system is not operational. If this occurs on one of the specially designated highway lanes, the vehicle speed will be reduced until the system again becomes operational.

When the system is non-operational for a short distance, the vehicle will still accurately know its position if there is, in addition, one or more laser gyroscopes, micromachined angular rate sensors or equivalent, and one or more accelerometers that together are referred to as an Inertial Navigation System (INS, IMU) or inertial measurement unit (IMU). Generally, such an INS will have three gyroscopes and three accelerometers and frequently there may be more than one IMU in a vehicle. Although current versions of the IMU use MEMS devices, progress is being made on fiber optic-based gyroscopes. Thus, the present invention is not limited to MEMS devices but will make use of the best cost effective devices that are available at a particular time.

As more sensors which are capable of providing information on the vehicle position, velocity and acceleration are added onto the vehicle, the system can become sufficiently complicated as to require a Kalman filter, neural network, or neural-fuzzy, system to permit the optimum usage of the available information. This becomes even more important when information from outside the vehicle other than the GPS related systems becomes more available. For example, a vehicle may be able to communicate with other vehicles that have similar systems and learn their estimated location. If the vehicle can independently measure the position of the other vehicle, for example through the use of the scanning laser radar system described below, the differential GPS readings as discussed above, and thereby determine the relative position of the two or more vehicles, a further improvement of the position can be determined for all such vehicles. Adding all such additional information into the system would probably require a computational method such as Kalman filters, neural networks or a combination thereof and perhaps a fuzzy logic system.

One way to imagine the system operation is to consider each car and roadway edge to behave as if it had a surrounding "force field" that would prevent it from crashing into another vehicle or an obstacle along the roadway. A vehicle operator would be prevented from causing his or her vehicle to leave its assigned corridor. This is accomplished with a control system that controls the steering, acceleration and perhaps the vehicle brakes based on its knowledge of the location of the vehicle, highway boundaries and other nearby vehicles. In a preferred implementation, the location of the vehicle is determined by first using the GPS L1 signal to determine its location within approximately 100 meters. Then, using DGPS and corrections which are broadcast, whether by FM or downloaded from geo-synchronous (GEO) or Low Earth Orbiting (LEO) satellites or obtained from another vehicle or road-based transmitters, to determine its location within less than about 10 centimeters. Finally, the use of a PPS, discussed below, periodically permits the vehicle to determine its exact location and thereby determine the GPS corrections, eliminate the carrier cycle ambiguity and correct the errors in the INS or IMU system. If this is still not sufficient, then the phase of the carrier frequency provides the required location information to less than a few centimeters. Dead reckoning, using vehicle speed, steering angle and tire rotation information and inertial guidance, can be used to fill in the gaps. Where satellites are out of view, pseudolites, or other systems, can be placed along the highway. A pulsed scanning infrared laser or terahertz radar system, or an equivalent system, can be used for obstacle detection. Communication to other vehicles is by short distance radio or by spread spectrum time domain pulse radar or terahertz.

3. Maps and Mapping 3.1 Maps

All information regarding the road, both temporary and permanent, should be part of the map database, including speed limits, presence of guard rails, width of each lane, width of the highway, width of the shoulder, character of the land beyond the roadway, existence of poles or trees and other roadside objects, exactly where the precise position location apparatus is located, etc. The speed limit associated with particular locations on the maps should be coded in such a way that the speed limit can depend upon the time of day and the weather conditions. In other words, the speed limit is a variable that will change from time to time depending on conditions. It is contemplated that there will be a display for various map information which will always be in view for the passenger and for the driver at least when the vehicle is operating under automatic control. Additional user information can thus also be displayed such as traffic conditions, weather conditions, advertisements, locations of restaurants and gas stations, etc.

A map showing the location of road and lane boundaries can be easily generated using a specially equipped survey vehicle that has the most accurate position measurement system available. In some cases, it might be necessary to set up one or more temporary local DGPS base stations in order to permit the survey vehicle to know its position within a few centimeters. The vehicle would drive down the roadway while operators, using specially designed equipment, sight the road edges and lanes. This would probably best be done with laser pointers and cameras. Transducers associated with the pointing apparatus record the angle of the apparatus and then by triangulation determine the distance of the road edge or lane marking from the survey vehicle. Since the vehicle's position would be accurately known, the boundaries and lane markings can be accurately determined. It is anticipated that the mapping activity would take place continuously such that all roads in a particular state would be periodically remapped in order to record any changes which were missed by other monitoring systems and to improve the reliability of the maps by minimizing the chance for human error. Any roadway changes that were discovered would trigger an investigation as to why they were not recorded earlier thus adding feedback to the mapping part of the process.

The above-described method depends on human skill and attention and thus is likely to result in many errors. A preferred approach is to carefully photograph the edge of the road and use the laser pointers to determine the location of the road lines relative to the pointers and to determine the slope of the roadway through triangulation. In this case, several laser pointers would be used emanating from above, below and to the sides of the camera. The reduction of the data is then done later using equipment that can automatically pick out the lane markings and the reflected spots from the laser pointers. One aid to the mapping process is to place chemicals in the line paint that could be identified by the computer software when the camera output is digitized. This may require the illumination of the area being photographed by an infrared or ultraviolet light, for example.

In some cases where the roadway is straight, the survey vehicle could travel at moderate speed while obtaining the boundary and lane location information. In other cases, where the road in turning rapidly, more readings would be required per mile and the survey vehicle would need to travel more slowly. In any case, the required road information can be acquired semi-automatically with the survey vehicle traveling at a moderate speed. Thus, the mapping of a particular road would not require significant time or resources. It is contemplated that a few such survey vehicles could map all of the interstate highways in the U.S. in less than one year.

The mapping effort could be supplemented and cross-checked though the use of accurate detailed digital photogrammetic systems which, for example, can determine the road altitude with an accuracy to <50 cm. Efforts are underway to map the earth with 1-meter accuracy. The generated maps could be used to check the accuracy and for missing infrastructure or other roadside installations of the road-determined maps.

Another improvement that can be added to the system based on the maps is to use a heads-up display for in-vehicle signage. As the vehicle travels down the road, the contents of roadside signs can be displayed on a heads up display, providing such a display is available in the vehicle, or on a specially installed LCD display. This is based on the inclusion in the map database of the contents of all highway signs. A further improvement would be to include signs having varying messages which would require that the message be transmitted by the sign to the vehicle and received and processed for in-vehicle display. This could be done either directly, by satellite, the Internet, cell phone etc.

As the roadway is being mapped, the availability of GPS satellite view and the presence of multipath reflections from fixed structures can also be determined. This information can then be used to determine the advisability of locating a local precise location system (PPS), or other infrastructure, at a particular spot on the roadway. Cars can also be used as probes for this process and for continuous improvement to check the validity of the maps and report any errors.

Multipath is the situation where more than one signal from a satellite comes to a receiver with one of the signals resulting from a reflection off of a building or the ground, for example. Since multipath is a function of geometry, the system can be designed to eliminate its effects based on highway surveying and appropriate antenna design. Multipath from other vehicles can also be eliminated since the location of the other vehicles will be known.

3.2 Mapping

An important part of some embodiments of the invention is the digital map that contains relevant information relating to the road on which the vehicle is traveling. The digital map usually includes the location of the edge of the road, the edge of the shoulder, the elevation and surface shape of the road, the character of the land beyond the road, trees, poles, guard rails, signs, lane markers, speed limits, etc. as discussed in more detail elsewhere herein. Additionally, it can contain the signature as discussed above. This data or information is acquired in a unique manner for use in the invention and the method for acquiring the information and its conversion to a map database that can be accessed by the vehicle system is part of this invention. The acquisition of the data for the maps will now be discussed. It must be appreciated though that the method for acquiring the data and forming the digital map can also be used in other inventions.

Local area differential GPS can be utilized to obtain maps with an accuracy of about 2.0 cm (one sigma). Temporary local differential stations are available from such companies as Trimble Navigation. These local differential GPS stations can be placed at an appropriate spacing for the road to be mapped, typically every 30 kilometers. Once a local differential GPS station is placed, it requires some time period such as an hour or more for the station to determine its precise location. Therefore, sufficient stations are required to cover the area that is to be mapped within, for example, four hours. This may require as many as 10 or more such differential stations for efficient mapping.

Figure 17:
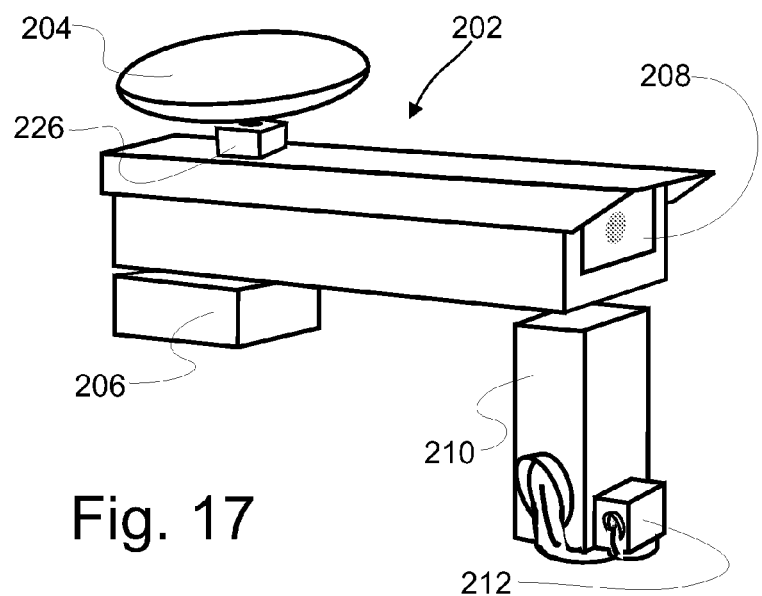
FIG. 17 is a schematic perspective view of a data acquisition module in accordance with the invention.

With reference to FIGS. 16A, 16B, 17 and 17A, a mapping vehicle 200 is used and obtains its location from GPS satellites and its corrections from the local differential stations. Such a system is capable of providing the 2 cm accuracy desired for the map database. Typically, at least two GPS receivers 226 are mounted on the mapping vehicle 200. Each GPS receiver 226 is contained within or arranged in connection with a respective data acquisition module 202, which data acquisition modules 202 also contain a GPS antenna 204, an accurate inertial measurement unit (IMU) 206, a forward-looking video camera 208, a downward and outward looking linear array camera 210 and a scanning laser radar 212. The relative position of these components in FIG. 17 is not intended to limit the invention.

Figure 17A:
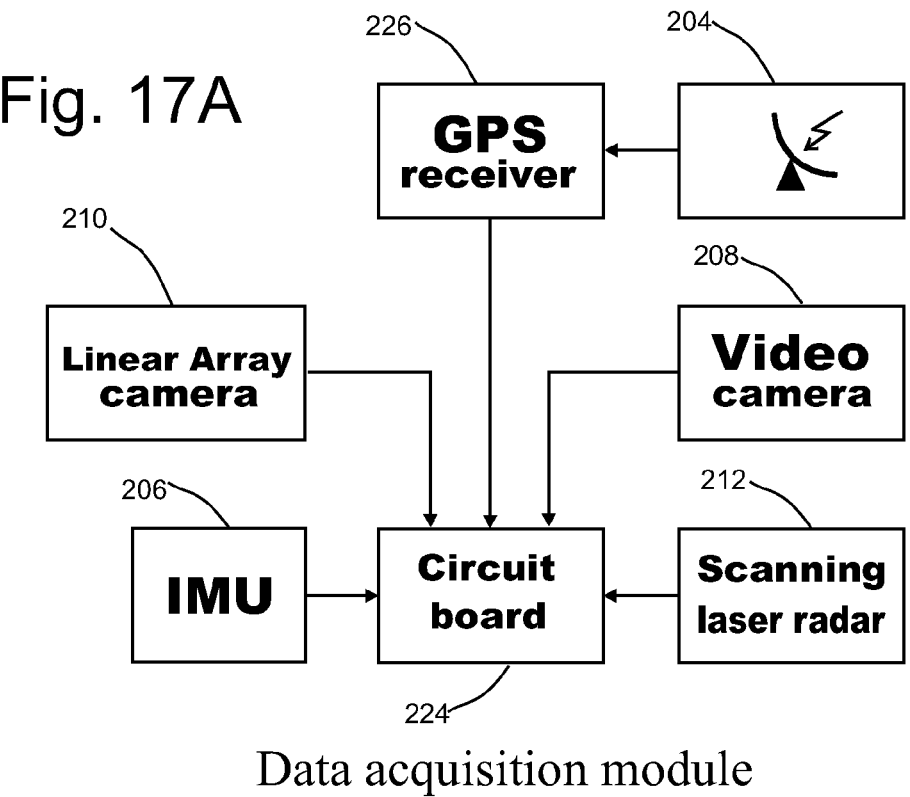
FIG. 17A is a schematic view of the data acquisition module in accordance with the invention.

A processor including a printed circuit board 224 is coupled to the GPS receivers 226, the IMUs 206, the video cameras 208, the linear cameras 210 and the scanning laser radars 212 (see FIG. 17A). The processor 224 receives information regarding the position of the vehicle from the GPS receivers 226, and optionally the IMUs 206, and the information about the road from both linear cameras 210 or from both laser radars 212, or from all of the linear cameras 210 and laser radars 212, and forms the road map database. Information about the road can also come from one or both of the video cameras 208 and be incorporated into the map database.

The map database can be of any desired structure or architecture. Preferred examples of the database structure are of the type discussed in U.S. Pat. No. 6,144,338 (Davies) and U.S. Pat. No. 6,247,019 (Davies).

The data acquisition modules 202 are essentially identical and each mounts to the vehicle roof on an extension assembly 214 which extends forward of the front bumper. Extension assembly 214 includes a mounting bracket 216 from the roof of the vehicle 200 forward to each data acquisition module 210, a mounting bracket 218 extending from the front bumper upward to each data acquisition module 202 and a cross mounting bracket 220 extending between the data acquisition modules 202 for support. Since all of the data acquisition equipment is co-located, its precise location is accurately determined by the IMU, the mounting location on the vehicle and the differential GPS system.

Figure 18:
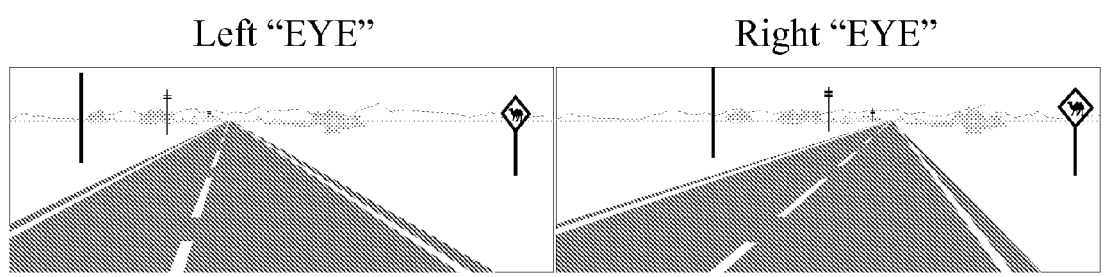
FIG. 18 shows the view of a road from the video cameras in both of the data acquisition modules.

The forward-looking video cameras 208 provide views of the road as shown in FIG. 18. These cameras 208 permit the database team to observe the general environment of the road and to highlight any anomalies. They also permit the reading of traffic signs and other informational displays all of which can be incorporated into the database. The cameras 208 can be ordinary color video cameras, high-speed video cameras, wide angle or telescopic cameras, black and white video cameras, infrared cameras, etc. or combinations thereof. In some cases, special filters are used to accentuate certain features. For example, it has been found that lane markers frequently are more readily observable at particular frequencies, such as infrared. In such cases, filters can be used in front of the camera lens or elsewhere in the optical path to block unwanted frequencies and pass desirable frequencies. Polarizing lenses have also been found to be useful in many cases. Normally, natural illumination is used in the mapping process, but for some particular cases, particularly in tunnels, artificial illumination can also be used in the form of a floodlight or spotlight that can be at any appropriate frequency of the ultraviolet, visual and infrared portions of the electromagnetic spectrum or across many frequencies. Laser scanners can also be used for some particular cases when it is desirable to illuminate some part of the scene with a bright spot. In some cases, a scanning laser rangemeter can be used in conjunction with the forward-looking cameras 204 to determine the distance to particular objects in the camera view.

The video camera system can be used by itself with appropriate software as is currently being done by Lamda Tech International Inc. of Waukesha, Wis., to obtain the location of salient features of a road. However, such a method to obtain accurate maps is highly labor intensive and therefore expensive. The cameras and associated equipment in the present invention are therefore primarily used to supplement the linear camera and laser radar data acquisition systems to be described now.

The mapping vehicle data acquisition modules will typically contain both a linear camera and a scanning laser radar, however, for some applications one or the other may be omitted.

The linear camera 210 is a device that typically contains a linear CCD, CMOS or other light sensitive array of, for example, four thousand pixels. An appropriate lens provides a field of view to this camera that typically extends from approximately the center of the vehicle out to the horizon. This camera records a one-dimensional picture covering the entire road starting with approximately the center of the lane and extending out to the horizon. This linear array camera 210 therefore covers slightly more than 90 degrees. Typically, this camera operates using natural illumination and produces effectively a continuous picture of the road since it obtains a linear picture, or column of pixels, for typically every one-inch of motion of the vehicle. Thus, a complete two-dimensional panoramic view of the road traveled by the mapping vehicle is obtained. Since there are two such linear camera units, a 180 degree view is obtained. This camera will typically record in full color thus permitting the map database team to have a complete view of the road looking perpendicular from the vehicle. The view is recorded in a substantially vertical plane. This camera will not be able to read text on traffic signs, thus the need for the forward-looking cameras 208. Automated software can be used with the images obtained from these cameras 208, 210 to locate the edge of the road, lane markers, the character of land around and including the road and all areas that an errant vehicle may encounter. The full color view allows the characterization of the land to be accomplished automatically with minimal human involvement.

The scanning laser radar 212 is typically designed to cover a 90 degree or less scan thus permitting a rotating mirror to acquire at least four such scans per revolution. The scanning laser radar 212 can be coordinated or synchronized with the linear camera 210 so that each covers the same field of view with the exception that the camera 210 typically will cover more than 90 degrees. Scanning laser radar 212 can be designed to cover more or less than 90 degrees as desired for a particular installation. The scanning laser radar 212 can operate in any appropriate frequency from above ultraviolet to the terahertz. Typically, it will operate in the eye-safe portion of the infrared spectrum for safety reasons. The scanning laser radar 212 can operate either as a pulse-modulated or a tone-modulated laser as is known in the art. If operating in the tone-modulated regime, the laser light will be typically modulated with three or more frequencies in order to eliminate distance ambiguities. Noise or code modulated radar can also be used.

For each scan, the laser radar 212 provides the distance from the scanner to the ground for up to several thousand points in a vertical plane extending from approximately the center of the lane out to near the horizon. This device therefore provides precise distances and elevations to all parts of the road and its environment. The precise location of signs that were observed with the forward-looking cameras 204, for example, can now be easily and automatically retrieved. The scanning laser radar therefore provides the highest level of mapping automation.

Scanning laser radars have been used extensively for mapping purposes from airplanes and in particular from helicopters where they have been used to map portions of railway lines in the US. Use of the scanning laser radar system for mapping roadways where the radar is mounted onto a vehicle that is driving the road is believed to be novel to the current assignee.

Ideally, all of the above-described systems are present on the mapping vehicle. Although there is considerable redundancy between the linear camera and the scanning laser radar, the laser radar operates at one optical frequency and therefore does not permit the automatic characterization of the roadway and its environment.

As with the forward-looking cameras, it is frequently desirable to use filters and polarizing lenses for both the scanning laser radar and the linear camera. In particular, reflections from the sun can degrade the laser radar system unless appropriate filters are used to block all frequencies except frequency chosen for the laser radar.

Laser radars are frequently also referred to as ladars and lidars. All such devices that permit ranging to be accomplished from a scanning system, including radar, are considered equivalent for the purposes of this invention.

3.3 Map Enhancements

Once the road edge and lane locations, and other roadway information, are transmitted to the operator, it requires very little additional bandwidth to include other information such as the location of all businesses that a traveler would be interested in such as gas stations, restaurants etc. which could be done on a subscription basis. This concept was partially disclosed in the '482 patent discussed above and partially implemented in existing map databases.

Communication of information to the operator could be done either visually or orally as described in U.S. Pat. No. 5,177,685 or 7,126,583. Finally, the addition of a route guidance system as described in other patents becomes even more feasible since the exact location of a destination can be determined. The system can be configured so that a vehicle operator could enter a phone number, for example, or an address and the vehicle would be automatically and safely driven to that location. Since the system knows the location of the edge of every roadway, very little, if any, operator intervention would be required. Even a cell phone number can be used if the cell phone has the SnapTrack GPS location system as soon to be provided by Qualcomm.

Very large may databases can now reside on a vehicle as the price of memory continues to drop. Soon it may be possible to store the map database of an entire country on the vehicle and to update it as changes are made. The area that is within, for example, 1000 miles from the vehicle can certainly be stored and as the vehicle travels from place to place the remainder of the database can be updated as needed though a connection to the Internet, for example.

4. Precise Positioning

Another important aid as part of some of the inventions disclosed herein is to provide markers along the side(s) of roadways which can be either visual, passive or active transponders, reflectors, or a variety of other technologies including objects that are indigenous to or near the roadway, which have the property that as a vehicle passes the marker it can determine the identity of the marker and from a database it can determine the exact location of the marker. The term "marker" is meant in the most general sense. The signature determined by a continuous scan of the environment, for example, would be a marker if it is relatively invariant over time such as, for example, buildings in a city. Basically, there is a lot of invariant information in the environment surrounding a vehicle as it travels down a road toward its destination. From time to time, a view of this invariant landscape or information may be obstructed but it is unlikely that all of it will be during the travel of a mile, for example. Thus, a vehicle should be able to match the signature sensed with the expected one in the map database and thereby obtain a precise location fix. This signature can be obtained through the use of radar or laser radar technologies as reported elsewhere herein. See in particular Section 5 below and for example, Wang Yanli, Chen Zhe, "Scene matching navigation based on multisensor image fusion" SPIE Vol. 5286 p. 788-793, 2003

For the case of specific markers placed on the infrastructure, if three or more of such markers are placed along a side of the roadway, a passing vehicle can determine its exact location by triangulation. Note that even with two such markers using radar with distance measuring capability, the precise position of a vehicle can be determined as discussed below in reference to the Precise Positioning System. In fact, if the vehicle is only able to observe a single radar reflector and take many readings as the reflector is passed, it can determine quite accurately its position based on the minimum distance reading that is obtained during the vehicle's motion past the reflector. Although it may be impractical to initially place such markers along all roadways, it would be reasonable to place them in particularly congested areas or places where it is known that a view of one or more of the GPS satellites is blocked. A variation of this concept will be discussed below.

Although initially it is preferred to use the GPS navigational satellites as the base technology, the invention is not limited thereby and contemplates using all methods by which the location of the vehicle can be accurately determined relative to the earth surface. The location of the roadway boundaries and the location of other vehicles relative to the earth surface are also to be determined and all relevant information used in a control system to substantially reduce and eventually eliminate vehicle accidents. Only time and continued system development will determine the mix of technologies that provide the most cost effective solution. All forms of information and methods of communication to and between vehicles are contemplated including direct communication with stationary and moving satellites, communication with fixed earth-based stations using infrared, optical, terahertz, radar, radio and other segments of the electromagnetic spectrum and inter-vehicle communication. Some additional examples follow:

A pseudo-GPS can be delivered from cell phone stations, in place of or in addition to satellites. In fact, the precise location of a cell phone tower need not initially be known. If it monitors the GPS satellites over a sufficiently long time period, the location can be determined as the calculated location statistically converges to the exact location. Thus, every cell phone tower could become an accurate DGPS base station for very little cost. DGPS corrections can be communicated to a vehicle via FM radio via a sub-carrier frequency for example. An infrared or radar transmitter along the highway can transmit road boundary location information. A CD-ROM or other portable mass storage can be used at the beginning of a controlled highway to provide road boundary information to the vehicle. Finally, it is contemplated that eventually a satellite will broadcast periodically, perhaps every five minutes, a table of dates covering the entire CONUS that provides the latest update date of each map segment. If a particular vehicle does not have the latest information for a particular region where it is operating, it will be able to use its cell phone or other communication system to retrieve such road maps perhaps through the Internet or from an adjacent vehicle. Emergency information would also be handled in a similar manner so that if a tree fell across the highway, for example, all nearby vehicles would be notified.

To implement map updating, a signal may be directed by the infrared or radar transmitter to the area covered by a segment of the map relating to the latest update information for that segment in a form receivable by a transmitter on vehicles passing through the area. A processor on the vehicle receives the signals, analyzes it and determines whether its map includes the latest updated map information for the segment in which the vehicle is presently located. If not, an update for the vehicle's map information is downloaded via the transmitter. This embodiment is particularly advantageous when the transmitter is arranged before a section of road and thus provides vehicles entering the road and in range of the transmitter with the map data they will subsequently need.

The transmitter which transmits information to the vehicle, whether map information or other information, may be movable and thus would be particularly useful for roads undergoing construction, subject to closure or blockage in view of construction or other factors, or for which map data is not yet available. In this case, the movable, temporary transmitter would be able to provide map data for the affected section of road to vehicles in range of the transmitter. As the transmitter is moved along the roadway, the information transmitted can be changed.

One of the possible problems with the RtZF™ system described herein is operation in areas of large cities such as lower Manhattan. In such locations, unless there are a plurality of local pseudolites or precise position location system installations or the environment signature system is invoked such as with adaptive associative memories as described above, the signals from the GPS satellites can be significantly blocked. Also, there is frequently a severe multipath problem in cities. A solution is to use the LORAN system as a backup for such locations. The accuracy of LORAN can be comparable to DGPS. Use of multiple roadway-located Precise Positioning Systems would be a better solution or a complementary solution. Additionally, some location improvement can result from application of the SnapTrack system as described in U.S. Pat. No. 5,874,914 and other patents to Krasner of SnapTrack.

The use of geo-synchronous satellites as a substitute for earth bound base stations in a DGPS system, with carrier phase enhancements for sub-meter accuracies, is also a likely improvement to the RtZF™ system that can have a significant effect in urban areas.

Another enhancement that would be possible with dedicated satellites and/or earth bound pseudolites results from the greater control over the information transmitted than is available from the present GPS system. Recognizing that this system could save in excess of 40,000 lives per year in the U.S. alone, the cost of deploying such special purpose stations can easily be justified. For example, say there exists a modulated wave that is 10000 kilometers long, another one which is 1000 km long etc. down to 1 cm. It would then be easy to determine the absolute distance from one point to the other. The integer ambiguity of RTK DGPS would be eliminated. Other types of modulation are of course possible to achieve the desired result of simply eliminating the carrier integer uncertainty that is discussed in many U.S. patents and other literature. This is not meant to be a recommendation but to illustrate that once the decision has been made to provide information to every vehicle that will permit it to always know its location within 10 cm, many technologies will be there to make it happen. The cost savings resulting from eliminating fatalities and serious injuries will easily cover the cost of such technologies many times over. The provision of additional frequencies can also enhance the system and render differential corrections unnecessary. Each frequency from a satellite is diffracted differently by the ionosphere. The properties of the ionosphere can thus be determined if multiple frequencies are transmitted. This will partially be achieved with the launch of the European Galileo GPS satellite system in combination with the U.S. GPS system.

It is expected, especially initially, that there will be many holes in the DGPS or GPS and their various implementations that will leave the vehicle without an accurate means of determining its location. The inertial navigation system described above will help in filling these holes but its accuracy is limited to a time period significantly less than an hour and a distance of less than 50 miles before it needs correcting. That may not be sufficient to cover the period between DGPS availability. It is therefore contemplated that the RtZF™ system will also make use of low cost systems located along the roadways that permit a vehicle to accurately determine its location.

Such a position-determination assistance system would include a plurality of transmitters placed on or alongside a road, with signals from the transmitters being directed to an area in the path of a traveling vehicle to enable the vehicle to determine its position using the transmitted signals and information about the position of the transmitters. Positional information about the transmitters either being previously provided to the vehicle's processor, e.g., from a map database, or along with the transmission. The transmitters may be a group of a linked MIR, IR or RF transmitters which direct signals to a common area through which vehicles pass. Alternatively, the transmitters may be a group of a plurality of RFID devices, in which case, one or more interrogators are arranged on the vehicle to cause the RFID devices to direct signals in response to an interrogation signal from the interrogator.

One example of such a system would be to use a group of three Micropower Impulse Radar (MIR) units such as developed by Lawrence Livermore Laboratory.

A MIR operates on very low power and periodically transmits a very short spread spectrum radar pulse. The estimated cost of a MIR is less than $10 even in small quantities. If three such MIR transmitters, 151, 152 and 153, as shown in FIG. 11, are placed along the highway and triggered simultaneously or with a known delay, and if a vehicle has an appropriate receiver system, the time of arrival of the pulses can be determined and thus the location of the vehicle relative to the transmitters determined. The exact location of the point where all three pulses arrive simultaneously would be the point that is equidistant from the three transmitters 151, 152, 153 and would be located on the map information. Only three devices are required since only two dimensions need to be determined and it is assumed that the vehicle in on the road and thus the vertical position is known, otherwise four MIRs would be required. Thus, it would not even be necessary to have the signals contain identification information since the vehicle would not be so far off in its position determination system to confuse different locations. By this method, the vehicle would know exactly where it was whenever it approached and passed such a triple-MIR installation. The MIR triad PPS or equivalent could also have a GPS receiver and thereby determine its exact location over time as described above for cell phone towers. After the location has been determined, the GPS receiver can be removed. In this case, the MIR triad PPS or equivalent could be placed at will and they could transmit their exact location to the passing vehicles. An alternate method would be to leave the GPS receiver with the PPS time of arrival of the GPS data from each satellite so that the passing vehicles that do not go sufficiently close to the PPS can still get an exact location fix. A similar system using RFID tags is discussed below.

Several such readings and position determinations can be made with one approach to the MIR installation, the vehicle need not wait until they all arrive simultaneously. Also the system can be designed so that the signals never arrive at the same time and still provide the same accuracy as long as there is a sufficiently accurate clock on board the vehicle. One way at looking at FIG. 11 is that transmitters 151 and 152 fix the lateral position of the vehicle while transmitters 151 and 153 fix the location of the vehicle longitudinally. The three transmitters 151,152,153 need not be along the edges on one lane but could span multiple lanes and they need not be at ground level but could be placed sufficiently in the air so that passing trucks would not block the path of the radiation from an automobile. Particularly in congested areas, it might be desirable to code the pulses and to provide more than three transmitters to further protect against signal blockage or multipath.

The power requirements for the MIR transmitters are sufficiently low that a simple photoelectric cell array can provide sufficient power for most if not all CONUS locations. With this exact location information, the vehicle can become its own DGPS station and can determine the corrections necessary for the GPS. It can also determine the integer ambiguity problem and thereby know the exact number of wave lengths between the vehicle and the satellites or between the vehicle and the MIR station. These calculations can be done on vehicle if there is a connection to a network, for example. This would be particularly efficient as the network, once it had made the calculations for one vehicle, would have a good idea of the result for another nearby vehicle and for other vehicles passing the same spot at a different time.

MIR is one of several technologies that can be used to provide precise location determination. Others include the use of an RFID tag that is designed in cooperation with its interrogator to provide a distance to the tag measurement. Such as RFID can be either an active device with an internal battery or solar charger or a passive device obtaining its power from an RF interrogation signal to charge a capacitor or a SAW-based tag operating without power. An alternate and preferred system uses radar or other reflectors where the time of flight can be measured, as disclosed in more detail elsewhere herein.

Once a vehicle passes a Precise Positioning Station (PPS) such as the MIR triad described above, the vehicle can communicate this information to surrounding vehicles. If the separation distance between two communicating vehicles can also be determined by the time-of-flight or equivalent method, then the vehicle that has just passed the triad can, in effect, become a satellite equivalent or moving pseudolite. That is, the vehicle sends (such as by reflection so as not to introduce a time delay) its GPS data from the satellite and the receiving vehicle then gets the same message from two sources and the time difference is the time of flight. Finally, if many vehicles are communicating their positions to many other vehicles along with an accuracy of position assessment, each vehicle can use this information along with the calculated separation distances to improve the accuracy of its position determination. In this manner, as the number of such vehicles increases, the accuracy of the entire system increases until an extremely accurate positioning system for all vehicles results. Such a system, since it combines many sources of position information, is tolerant of the failure of any one or even several such sources. Thus, the RtZF™ system becomes analogous to the Internet in that it can't be shut down and the goal of perfection is approached. Some of the problems associated with this concept will be discussed in more detail below.

Precise Positioning was described in detail above and relates to methods of locating a vehicle independently of GPS within sub meter accuracy. This can be done using an MIR triads; barcodes painted on the roadway; radar, laser radar or terahertz radar and infrastructure mounted reflectors; RFID markets; or through the use of matching a signature obtained from the environment with a stored signature using, for example, Adaptive Associative Memories (AAS) based on Cellular Neural Networks (CNN).

AAS is a type of neural network that is distinguished in that it can do precise identification from poor and sparse data in contrast to ordinary back propagation neural networks discussed elsewhere herein that generalize and always give an approximate answer. Applications for AAS include: (1) Occupant recognition (face, iris, voice print, fingerprints etc.), and (2) Vehicle location recognition for the RtZF™ Precise Positioning System, which is the focus here. In contrast to other PPS systems described above, AAS permits the precise location of a vehicle on a roadway within centimeters without the use of additions to the infrastructure. A radar, laser scanner, or terahertz radar continuously is projected from the vehicle toward the environment, such as the roadway to the side of the vehicle, and from the returned reflected waves it obtains a signature of the passing environment and compares it with a recorded signature using ASM. This signature, for example, can be the distance from the vehicle to the infrastructure which has been normalized for the purpose of signature matching with some method such as the average or some other datum. Thus it is the relative distance signature that can be compared with a stored signature thus removing the position of the vehicle on the roadway as a variable. When a match is found the distance to a precise object can be determined placing the vehicle precisely on the road in both the longitudinal and lateral dimensions. As discussed above, this can make the vehicle a DGPS station for correction of the GPS errors but it also can be used as the primary location system without GPS.

Other methods can be used to precisely locate a vehicle using the infrastructure and only one preferred method has been described herein. For example, the vertical motion signature of the vehicle can in some cases be used. This could involve determining this signature from the natural road or a pattern of disturbances similar to a rubble strip can be placed in the roadway and sensed by an accelerometer, microphone or other sensor. Even the signature of the magnetic or reflective properties of the roadway or the environment at the side of road can be candidates with the appropriate sensors. Basically, any system that provides a signature indication location that is derived from the infrastructure with appropriate sensors would qualify.

Another method, for example, is to match camera images where again an AAM can be used. Since the vehicle knows approximately where it is, the recorded signature used in the AAM will change as the vehicle moves and thus only a small amount of data need be used at a particular time. The AAM system is fast and relatively simple. Typically twenty data points will be used to determine the match, for example. What follows is a general description of AAM Associative (context-addressable) memory is frequently dedicated to data search and/or restoration from available fragments. Associative retrieval requires minimal information on sought objects, so such a machine might be used for most complicated tasks of data identification for partially destroyed or corrupted images. It can be applied to authenticity attribution, document falsification detection, message fragment identification in the Internet etc. as well as signature matching with the environment for PPS.

Neural associative memory works due to multi-stability of strong feedback systems. Common models like Hopfield networks and bi-directional associative memory provide memorization by means of computation network weights. It does not corrupt previously stored images. Unfortunately, these networks cannot be widely used because of their low capacity and inefficient physical memory usage. A number M of vectors memorized does not exceed 14% of the number of neurons in the network N. Since a network contains $N^2$ connections, it needs storage of at least $25M^2$ real weight values.

Cellular architecture can exhaustively solve the problem of physical memory usage. Cellular memories have band-like synaptic matrix. The volume (number of elements) grows linearly with respect to neuron number. This is why cellular neural networks (CNNs) can be useful for very large data processing problems. Pioneering models of associative memories via CNNs were proposed in some earlier works. However, more detailed studies showed some fundamental limitations. Indeed, it has now been shown that the number of images stored is restricted by a cell size. Hence, it does not depend on the number of neurons. A more efficient way of redundancy reduction has also been found due to connection selection after training. This results in the use of only a small part of physical memory without corruption of memorized data. The network after weight selection looks like the cellular one; so by combining cellular training algorithms and weight selection, a novel network paradigm has resulted. It is an adaptive neural paradigm with great memorizing capacity.

At present, some breakthrough associative memories have been implemented in a software package available from the current assignee. The results can be applied for processing of large databases, real-time information retrieval, PPS etc. Other applications for this technology include face, iris, fingerprint, voiceprint, character, signature, etc. recognition.

FIG. 11 shows the implementation of the invention using the Precise Positioning System (PPS) 151, 152, 153, in which a pair of vehicles 18, 26 are traveling on a roadway each in a defined corridor delineated by lines 14 and each is equipped with a system in accordance with the invention and in particular, each is equipped with PPS receivers. Four versions of the PPS system will now be described. This invention is not limited to these examples but they will serve to illustrate the principals involved.

Vehicle 18 contains two receivers 160,161 for the micropower impulse radar (MIR) implementation of the invention. MIR transmitter devices are placed at locations 151, 152 and 153 respectively. They are linked together with a control wire, not shown, or by a wireless connection such that each device transmits a short radar pulse at a precise timing relative to the others. These pulses can be sent simultaneously or at a precise known delay. Vehicle 18 knows from its map database the existence and location of the three MIR transmitters. The transmitters 151,152 and 153 can either transmit a coded pulse or non-coded pulse. In the case of the coded pulse, the vehicle PPS system will be able to verify that the three transmitters 151, 152, 153 are in fact the ones that appear on the map database. Since the vehicle will know reasonably accurately its location and it is unlikely that other PPS transmitters will be nearby or within range, the coded pulse may not be necessary. Two receivers 160 and 161 are illustrated on vehicle 18. For the MIR implementation, only a single receiver is necessary since the position of the vehicle will be uniquely determined by the time of arrival of the three MIR pulses. A second receiver can be used for redundancy and also to permit the vehicle to determine the angular position of the MIR transmitters as a further check on the system accuracy. This can be done since the relative time of arrival of a pulse from one of the transmitters 151, 152, 153 can be used to determine the distance to each transmitter and by geometry its angular position relative to the vehicle 18. If the pulses are coded, then the direction to the MIR transmitters 151, 152, 153 will also be determinable.

The micropower impulse radar units require battery power or another power mechanism to operate. Since they may be joined together with a wire in order to positively control the timing of the three pulses, a single battery can be used to power all three units. This battery can also be coupled with a solar panel to permit maintenance free operation of the system. Since the MIR transmitters use very small amounts of power, they can operate for many years on a single battery.

Although the MIR systems are relatively inexpensive, on the order of ten dollars each, the installation cost of the system will be significantly higher than the RFID and radar reflector solutions discussed next. The MIR system is also significantly more complex than the RFID system; however, its accuracy can be checked by each vehicle that uses the system. Tying the MIR system to a GPS receiver and using the accurate clock on the GPS satellites as the trigger for the sending of the radar pulses can add additional advantages and complexity. This will permit vehicles passing by to additionally accurately set their clocks to be in synchronization with the GPS clocks. Since the MIR system will know its precise location, all errors in the GPS signals can be automatically corrected and in that case, the MIR system becomes a differential GPS base station. For most implementations, this added complexity is not necessary since the vehicle themselves will be receiving GPS signals and they will also know precisely their location from the triad of MIR transmitters 151, 152, 153.

A considerably simpler alternate approach to the MIR system described above utilizes reflective RFID tags. These tags, when interrogated by an interrogator type of receiver 160, 161, reflect a modified RF signal with the modification being the identification of the tag. Such tags are described in many patents on RFID technology and can be produced for substantially less than one dollar each. The implementation of the RFID system would involve the accurate placement of these tags on known objects on or in connection with infrastructure. These objects could be spots on the highway, posts, signs, sides of buildings, poles, or structures that are dedicated specifically for this purpose. In fact, any structure that is rigid and unlikely to change position can be used for mounting RFID tags. In downtown Manhattan, building sides, street lights, stoplights, or other existing structures are ideal locations for such tags. A vehicle 18 approaching a triad of such RFID tags represented by 151, 152, 153 would transmit an interrogation pulse from interrogator 160 and/or 161. The pulse would reflect off of each tag within range and the reflected signal would be received by the same interrogator(s) 160, 161 or other devices on the vehicle. Once again, a single interrogator is sufficient. It is important to note that the range to RFID tags is severely limited unless a source of power is provided. It is very difficult to provide enough power from RF radiation from the interrogator for distances much greater than a few feet. For longer distances, a power source should be provided which can be a battery, connection to a power line, solar power, energy harvested from the environment via vibration, for example, unless the RFID is based on SAW technology. For SAW technology, reading ranges may extend to tens of meters. Greater distances can be achieved using reflectors or reflecting antennas.

Electronic circuitry, not shown, associated with the interrogator 160 and/or 161 would determine the precise distance from the vehicle to the RFID tag 151, 152, 153 based on the round trip time of flight. This will provide the precise distance to the three RFID tags 151, 152, 153. Once again, a second interrogator 161 can also be used, in which case, it could be a receiver only and would provide redundancy information to the main interrogator 160 and also provide a second measure of the distance to each RFID tag. Based on the displacement of the two receivers 160, 161, the angular location of each RFID tag relative into the vehicle can be determined providing further redundant information as to the position of the vehicle relative to the tags.

Radar corner reflectors can be placed on poles or other convenient places such that a radar beam pointed upwards at an angle, such as 30 to 45 degrees from the vehicle, will cause the beam to illuminate the reflector and thereby cause a reflection to return to the vehicle. Through well-known methods, the distance to the reflector can be accurately measured with pulse radar, modulated radar and phase measurements or noise radar and correlations measurements. In such a manner, the host vehicle can determine its position relative to one or more such reflectors and if the location of the reflector(s) is known and recorded on the map database, the vehicle can determine its position to within about 2 centimeters. The more reflectors that are illuminated, the better the accuracy of vehicle location determination. The reflectors can be simple corner reflectors or a group of reflectors can be provided giving a return code to the host vehicle.

Using the PPS system, a vehicle can precisely determine its location within two centimeters or better relative to the MIR, RFID tags or radar and reflectors and since the precise location of these devices has previously been recorded on the map database, the vehicle will be able to determine its precise location on the surface of the earth. With this information, the vehicle will thereafter be able to use the carrier wave phase to maintain its precise knowledge of its location, as discussed above, until the locks on the satellites are lost. Similarly, the vehicle 18 can broadcast this information to vehicle 26, for example, permitting a vehicle that has not passed through the PPS triad to also greatly improve the accuracy with which it knows its position. Each vehicle that has recently passed through a PPS triad now becomes a differential GPS station for as long as the satellite locks are maintained. Therefore, through inter-vehicle communications, all vehicles in the vicinity can also significantly improve their knowledge of their position accuracy resulting in a system which is extremely redundant and therefore highly reliable and consistent with the "Road to Zero Fatalities"™ process. Once this system is operational, it is expected that the U.S. government and other governments will launch additional GPS type satellites, each with more civilian readable frequencies, or other similar satellite systems, further strengthening the system and adding further redundancy eventually resulting in a highly interconnected system that approaches 100% reliability and, like the Internet, cannot be shut down.

As the system evolves, the problems associated with urban canyons, tunnels, and other obstructions to satellite view will be solved by the placement of large numbers of PPS stations, or other devices providing similar location information.

Another PPS system uses reflected energy from the environment to create a signature that can be matched with a recorded signature using a technology such as adaptive associative memories (AAM), or equivalent including correlation. Since the AAM was discussed above, the correlation system will be discussed here. As the mapping vehicle traverses the roadway, it can record the distance to various roadside objects as a continuous signal having peaks and valleys. In fact, several such signatures can economically be recorded such that regardless of where on the roadway a subsequent vehicle appears, it will record a similar signature. The signature can be enhanced if dual frequency terahertz is used since the reflectance from an object can vary significantly from one terahertz frequency to another depending on the composition of the object. Thus, for one frequency, a metal and a wood object may both be highly reflective while at another frequency, there can be a significant difference. Significantly more information is available when more than one frequency is used.

Using the correlation system, a vehicle will continuously be comparing its received signature at a particular location to the previously recorded signature and shifting the two relative to each other until the best match occurs. Since this will be done continuously and since we will know the velocity of the vehicle, it should never deviate significantly from the recorded position and thus the vehicle will always have a non-GPS method of determining its exact location. There are certain areas where the signature matching may be problematic such as going by a wheat field or the ocean. Fortunately, such wide open spaces are precisely where the GPS satellite system should work best and similarly, the places where the signature method works best is where the GPS has problems. Thus, the systems are complementary. In most places, both systems will work well providing a high degree of redundancy.

Many mathematical methods exist for determining the best shift of the two signatures (the previously recorded one and a new one) and therefore the various correlation methods will not be presented here.

Although the system has been illustrated for use with automobiles, the same system would apply for all vehicles including trucks, trains an even airplanes taxiing on runways. It also would be useful for use with cellular phones and other devices carried by humans. The combination of the PPS system and cellular phones permits the precise location of a cellular phone to be determined within centimeters by an emergency operator receiving a 911 call, for example. Such RFID tags can be inexpensively placed both inside and outside of buildings, for example.

The range of RFID tags is somewhat limited to approximately 10 meters for current technology. If there are obstructions preventing a clear view of the RFID tag by the interrogator, the distance becomes less. For some applications where it is desirable to use larger distances, battery power can be provided to the RFID tags. In this case, the interrogator would send a pulse to the tag that would turn on the tag and at a precise, subsequent time, the tag would transmit an identification message. In some cases, the interrogator itself can provide the power to drive the RFID circuitry, in which case the tag would again operate in the transponder mode as opposed to the reflective mode.

The RFID tags discussed herein can be either the electronic circuit or SAW designs.

From the above discussion, those skilled in the art will understand that other devices can be interrogated by a vehicle traveling down the road. Such devices might include various radar types or designs of reflectors, mirrors, other forms of transponders, or other forms of energy reflectors. All such devices are contemplated by this invention and the invention is not limited to be specific examples described. In particular, although various frequencies including radar, terahertz and infrared have been discussed, this invention is not limited to those portions of the electromagnetic spectrum. In particular the X-ray band of frequencies may have some particular advantages for some external and interior imaging applications.

Any communication device can be coupled with an interrogator that utilizes the MIR, radar or RFID PPS system described above. Many devices are now being developed that make use of the Bluetooth communication specification. All such Bluetooth-enabled devices can additionally be outfitted with a PPS system permitting the location of the Bluetooth device to be positively determined. This enabling technology will permit a base station to communicate with a Bluetooth-enabled device whose location is unknown and have the device transmit back its precise location on the surface of the earth. As long as the Bluetooth-enabled device is within the range of the base station, its location can be precisely determined. Thus, the location of mobile equipment in a factory, packages within the airplane cargo section, laptop computers, cell phones, PDAs, and eventually even personal glasses or car keys or any device upon which a Bluetooth-enabled device can be attached can be determined. Actually, this invention is not limited to Bluetooth devices but encompasses any device that can communicate with any other devices.

Once the location of an object can be determined, many other services can be provided. These include finding the device, or the ability to provide information to that device or to the person accompanying that device such as the location of the nearest bathroom, restaurant, or the ability to provide guided tours or other directions to people traveling to other cities, for example.

A particularly important enhancement to the above-described system uses precise positioning technology independent of GPS. The precise positioning system, also known as the calibration system, generally permits a vehicle to precisely locate itself independently of the IMU or DGPS systems.

One example of this technology involves the use of a radar and reflector system wherein radar transceivers are placed on the vehicle that send radar waves to reflectors that are mounted at the side of road. The location of reflectors either is already precisely known or is determined by the mapping system during data acquisition process. The radar transceivers transmit a pulse, code or frequency or noise modulated radar signal to the road-mounted reflectors, typically corner reflectors, which reflect a signal back to the radar transceiver. This permits the radar system to determine the precise distance from the transceiver to the reflector by either time-of-flight or phase methods. Note that although "radar" will be used below in the illustrations, terahertz can also be used and thus the word "radar" will be used to cover both parts of the electromagnetic spectrum.

In one possible implementation, each vehicle is equipped with two radar devices operating in the 24-77 GHz portion of the spectrum. Each radar unit will be positioned on the vehicle and aimed outward, slightly forward and up toward the sides of the roadway. Poles would be positioned along the roadway at appropriate intervals and would have multiple corner cube radar reflectors mounted thereon to thereto, possibly in a vertical alignment. The lowest reflector on the pole would be positioned so that the vehicle radar will illuminate the reflector when the vehicle is in the lane closest to the pole. The highest reflector on the pole would be positioned so that the vehicle radar will illuminate the reflector when the vehicle is in the lane most remote from the pole. The frequency of the positioning of the poles will be determined by such considerations as the availability of light poles or other structures currently in place, the probability of losing access to GPS satellites, the density of vehicle traffic, the accuracy of the IMU and other similar considerations. Initially, rough calculations have found that a spacing of about ¼ mile would likely be acceptable.

If the precise location of the reflectors has been previously determined and is provided on a road map database, then the vehicle can use this information to determine its precise location on the road. In a more typical case, the radar reflectors are installed and the mapping vehicle knows its location precisely from the differential GPS signals and the IMU, which for the mapping vehicle is typically of considerably higher accuracy than will be present in the vehicles that will later use the system. As a result, the mapping vehicle can also map a tunnel, for example, and establish the locations of radar reflectors that will later be used by non-mapping vehicles to determine their precise location when the GPS and differential GPS signals are not available. Similarly, such radar reflectors can be located for an appropriate distance outside of the tunnel to permit an accurate location determination to be made by a vehicle until it acquires the GPS and differential GPS signals. Such a system can also be used in urban canyons and at all locations where the GPS signals can be blocked or are otherwise not available. Since the cost of radar reflectors is very low, it is expected that eventually they will be widely distributed on roads in the U.S.

Use of radar and reflectors for precise positioning is only one of many systems being considered for this purpose. Others include markings on roadway, RFID tags, laser systems, laser radar and reflectors, magnetic tags embedded in the roadway, magnetic tape, etc. The radar and reflector technology has advantages over some systems in that it is not seriously degraded by bad weather conditions, is not affected if covered with snow, does not pose a serious maintenance problem, and other cost and durability features. Any movement in the positioning of the reflectors can be diagnosed from vehicle PPS-mounted systems.

The radar transceivers used are typically mounted on either side of vehicle and pointed upward at between 30 and 60 degrees. They are typically aimed so that they project across the top of the vehicle so that several feet of vertical height can be achieved prior to passing over adjacent lanes where the signal could be blocked by a truck, for example. Other mounting and aiming systems can be used.

The radar reflectors are typically mounted onto a pole, building, overpass, or other convenient structure. They can provide a return code by the placement of several such reflectors such that the reflected pulse contains information that identifies this reflector as a particular reflector on the map database. This can be accomplished in numerous ways including the use of a collection of radar reflectors in a spaced-apart geometric configuration on a radius from the vehicle. The presence or absence of a reflector can provide a returned binary code, for example.

Operation of the system is as follows. A vehicle traveling down a roadway in the vicinity of the reflector poles would transmit radar pulses at a frequency of perhaps once per microsecond. These radar pulses would be encoded, perhaps with noise or code modulation, so that each vehicle knows exactly what radar returns are from its transmissions. As the vehicle approaches a reflector pole, it will begin to receive reflections based on the speed of the vehicle. By observing a series of reflections, the vehicle software can select either the maximum amplitude reflection or the average or some other scheme to determine the proper reflection to consider. The radar pulse will also be modulated to permit a distance to the reflector calculation to be made based on the phase of the returned signal or through correlation. Thus, as a vehicle travels down the road and passes a pair of reflector poles, it will be able to determine its longitudinal position on the roadway based on the pointing angle of the radar devices and the selected maximum return as described above. It will also be able to determine its lateral position on the roadway based on the measured distance from the radar to the reflector.

Each reflector pole will have multiple reflectors determined by intersections of the radar beam from the vehicle traveling in the closest and furthest lanes. The spacing of reflectors on the pole would be determined by the pixel diameter of the radar beam. For example, a typical situation may require radar reflectors beginning at 4 m from the ground and ending at 12 m with a reflector every one-meter. For the initial demonstrations, it is expected that existing structures will be used. The corner cube radar reflectors are very inexpensive so therefore the infrastructure investment will be small as long as existing structures can be used. In the downtown areas of cities, buildings etc. can also be used as reflector locations.

To summarize this aspect of the invention, an inexpensive infrastructure installation concept is provided which will permit a vehicle to send a radar pulse and receive a reflection wherein the reflection is identifiable as the reflection from the vehicle's own radar and contains information to permit an accurate distance measurement. The vehicle can thus locate itself accurately longitudinally and laterally along the road. A variation of the PPS system using a signature from a continuously reflected laser or radar has been discussed above and will not be repeated here.

Figure 19:
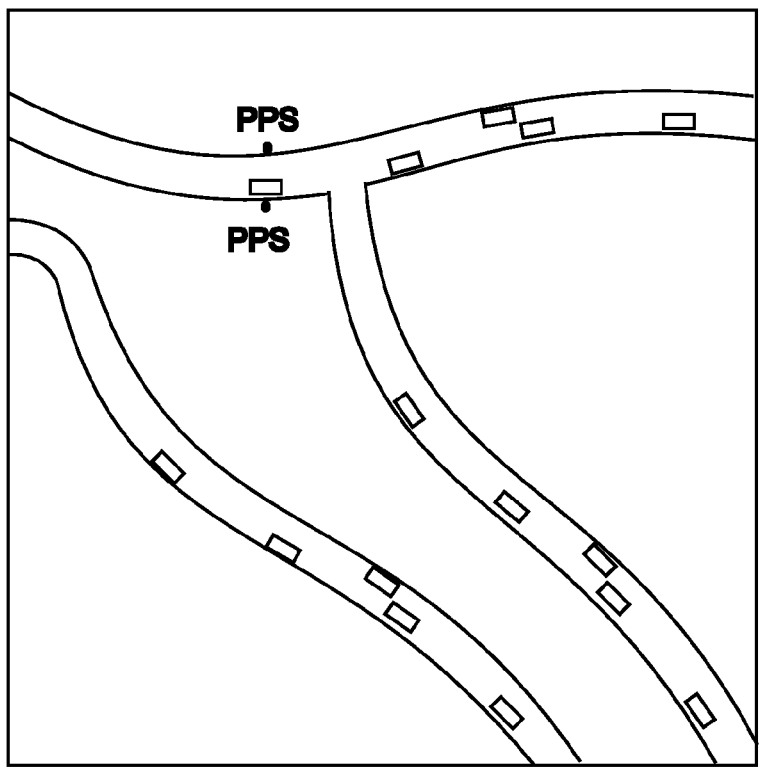
FIG. 19 shows a variety of roads and vehicles operating on those roads that are in communication with a vehicle that is passing through a Precise Positioning Station.
Figure 20:
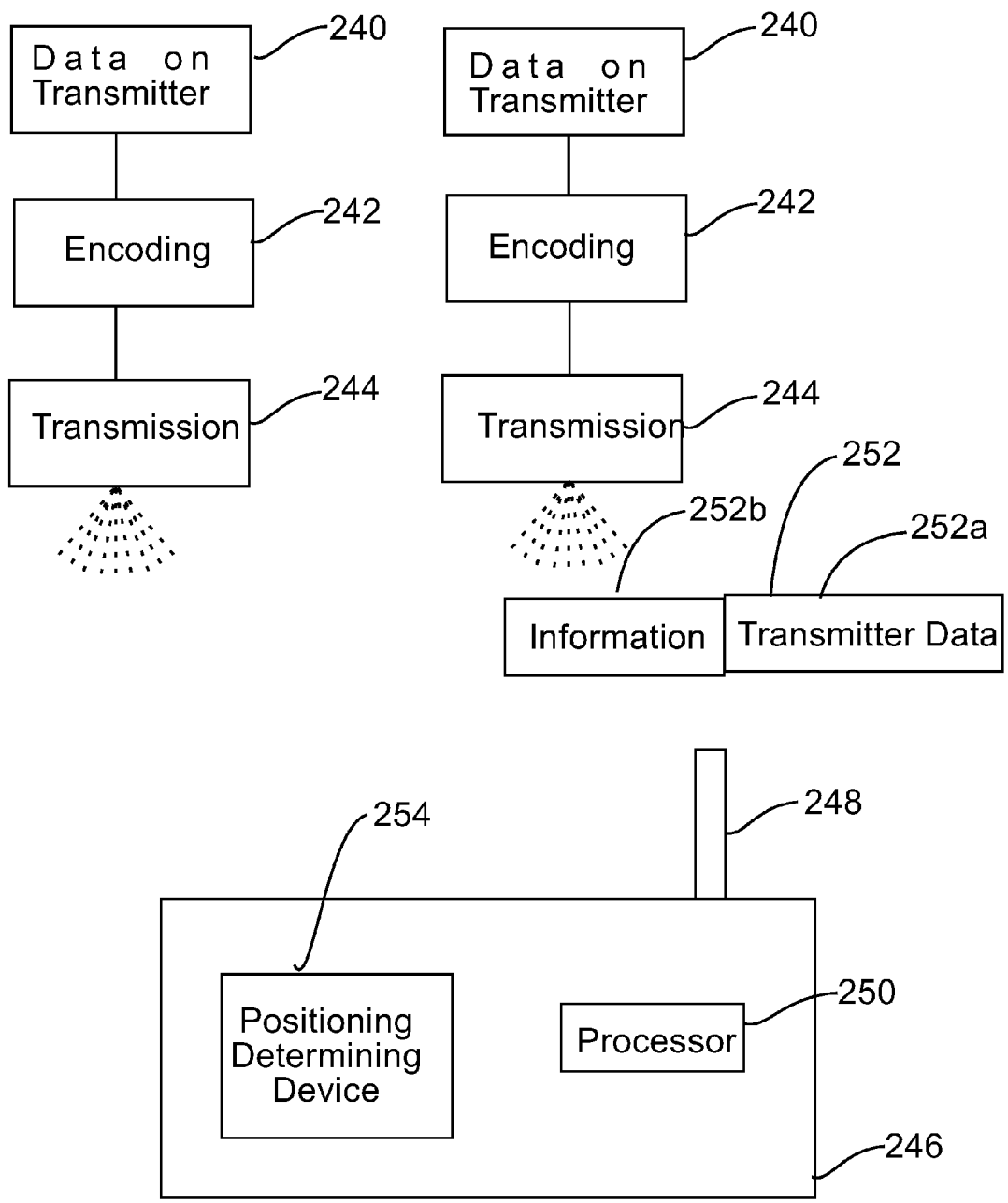
FIG. 20 is a schematic of the manner in which communications between a vehicle and a transmitter are conducted according to some embodiments of the invention.

FIG. 19 shows a variety of roads and vehicles operating on those roads that are in communication with a vehicle that is passing through a Precise Positioning Station (PPS). The communication system used is based on noise modulated spread spectrum technologies such as described in papers by Lukin et al. listed in the parent '445 application FIG. 20 shows a schematic of the operation of a communication and/or information transmission system and method in accordance with the invention. Transmitters are provided, for example at fixed locations and/or in vehicles or other moving objects, and data about each transmitter, such as its location and an identification marker, is generated at 240. The location of the transmitter is preferably its GPS coordinates as determined, for example, by a GPS-based position determining system (although other position determining systems can alternatively or additionally be used). The data may include, when the transmitter is a moving vehicle, the velocity, the direction of travel, the estimated travel path and the destination of the vehicle. The data is encoded at 242 using coding techniques such as those described above, e.g., phase modulation of distance or time between code transmissions, phase or amplitude modulation of the code sequences themselves, changes of the polarity of the entire code sequence or the individual code segments, or bandwidth modulation of the code sequence. The coded data is transmitted at 244 using, e.g., noise or pseudo-noise radar.

Instead of data about each transmitter being generated at 240, general data for transmission could also be generated such as road condition information or traffic information.

A vehicle 246 includes an antenna 248 coupled to a control module, control unit, processor or computer 250. The antenna 248 receives transmissions (waves) including transmissions 252 when in range of the transmitters. The processor 250 analyzes the transmissions 252. Such analysis may include a determination as to whether any transmissions are from transmitters within a pre-determined area relative to the vehicle, whether any transmissions are from transmitters situated within a pre-determined distance from the vehicle, whether any transmissions are from transmitters traveling in a direction toward the vehicle's current position, whether any transmissions are from transmitters traveling in a direction toward the vehicle's projected position based on its current position and velocity, the angle between the transmitter and the vehicle, and any combinations of such determinations. Other analyses could be whether any transmissions are from particular transmitters which might be dedicated to the transmission of road conditions data, traffic data, map data and the like. Once the processor 250 ascertains a particular transmission from a transmitter of interest (for operation of the vehicle, or for any other pre-determined purpose), it extracts the information coded in the transmission, but does not extract information coded in transmission from transmitters which are not of interest, e.g., those from transmitters situated at a location outside of the pre-determined area. It knows the code because the code is provided by the transmission, i.e., the initial part of the transmission 252*a* contains data on the location of the transmitter and the code is based on the location of the transmitter. As such, once the initial part of the transmission 252*a* is received and the location of the transmitter extracted, the code for the remainder of the transmission 252*b* can be obtained.

In this manner, the extraction of information from radio frequency wave transmission is limited based on a threshold determination (a filter of sorts) as to whether the transmission is of potential interest, e.g., to the operation of the vehicle based on its position. To enable this threshold determination from the analysis of the waves or filtering of information, the initial part of the transmission 252*a* can be provided with positional information about the transmitter and information necessitated by the information transferring arrangement (communication protocol data) and the remainder of the transmission 252*b* provided with additional information of potential interest for operation of the vehicle. The information contained in initial part of each transmission (or set of waves) is extracted to determine whether the information in the final part of the transmission is of interest. If not, the information in the final part of the transmission is not extracted. This reduces processing time and avoids the unnecessary extraction of mostly if not totally irrelevant information. An information filter is therefore provided.

Generating the transmission based on a code derived from the position of the transmitter, and thus the vehicle or infrastructure in which or to which it is fixed, provides significant advantages as discussed above. The code required for spread spectrum communication systems is thus determined according to the position of the transmitter, and can be accomplished in several different ways, some of which are disclosed elsewhere herein. An additional way for vehicle-mounted transmitters is to supply position information to a vehicle at an entrance to a highway or other entry and exit-limited roadway, in a wireless manner as described herein, and deriving the position information about the vehicle based on the initially provided information when the vehicle enters the highway and information about the speed of the vehicle or the distance the vehicle travels. The latter quantities are determined by systems on the vehicle itself. Thus, it becomes possible to extrapolate the current position of the vehicle based on the initially provided position information and the speed and/or traveling distance of the vehicle, using common physics equations relating to motion of an object as known to those skilled in the art. Even if the current position of the vehicle is not precise due to, for example, variations in the highway, the system is still operational and effective since all vehicles on the same highway are determining their position relative to the entrance. This embodiment may be considered a simpler system than described above wherein the position of the vehicle is determined using, for example, GPS-based systems. Basically, all vehicles on the same highway receive only a single wireless transmission when they enter the highway and update their position based on the distance traveled and/or speed of travel.

Further, the antenna 248 serves as a transmitter for transmitting signals generated by the processor 250. The processor 248 is constructed or programmed to generate transmissions or noise signals based on its location, determined by a position determining device 254 in any known manner including those disclosed herein, and encode information about the vehicle in the signals. The information may be an identification marker, the type of vehicle, its direction, its velocity, its proposed course, its occupancy, etc. The processor 248 can encode the information in the signals in a variety of methods as disclosed above in the same manner that the data about the transmitter is encoded. Thus, the processor 248 not only interprets the signals and extracts information, it also is designed to generate appropriate noise or otherwise coded signals which are then sent from the antenna 248.

Consider the case where the automobile becomes a pseudolite or a DGPS equivalent station since it has just determined its precise location from the PPS. Thus the vehicle can broadcast just like a pseudolite. As the vehicle leaves the PPS station, its knowledge of its absolute position will degrade with time depending on the accuracy of its clock and inertial guidance system and perhaps its view of the satellites or other pseudolites. In some cases, it might even be possible to eliminate the need for satellites if sufficient PPS positions exist.

Another point is that the more vehicles that are in the vicinity of a PPS, the higher the likelihood that one of the vehicles will know precisely where it is by being at or close to the PPS and thus the more accurately every vehicle in the vicinity would know its own location. Thus, the more vehicles on the road, the accuracy with which every vehicle knows its location increases. When only a single vehicle is on the road, then it really doesn't need to know its position nearly as accurately at least with regard to other vehicles. It may still need to know its accuracy to a comparable extent with regard to the road edges.

5. Radar and Laser Radar Detection and Identification of Objects External to the Vehicle

5.1 Sensing of Non-RtZF™ Equipped Objects

Vehicles with the RtZF™ system in accordance with the invention ideally should also be able to detect those vehicles that do not have the system as well as pedestrians, animals, bicyclists, and other hazards that may cross the path of the equipped vehicle.

Systems based on radar have suffered from the problem of being able to sufficiently resolve the images which are returned to be able to identify the other vehicles, bridges, etc. except when they are close to the host vehicle. One method used for adaptive cruise control systems is to ignore everything that is not moving. This, of course, leads to accidents if this were used with the instant invention. The problem stems from the resolution achievable with radar unless the antenna is made very large or the object is close. Since this is impractical for use with automobiles, only minimal collision avoidance can be obtained using radar.

Optical systems can provide the proper resolution but may require illumination with a bright light or laser. If the laser is in the optical range, there is a danger of causing eye damage to pedestrians or vehicle operators. At a minimum, it will be distracting and annoying to other vehicle operators. A laser operating in the infrared part of the electromagnetic spectrum avoids the eye danger problem, provided the frequency is sufficiently far from the visible, and, since it will not be seen, it will not be annoying. If the IR light is sufficiently intense to provide effective illumination for the host vehicle, it might be a source of blinding light for the system of another vehicle. Therefore a method of synchronization may be required. This could take the form of an Ethernet protocol, for example, where when one vehicle detects a transmission from another then it backs off and transmits at a random time later. The receiving electronics would then only be active when the return signal is expected.

Another problem arises when multiple vehicles are present that transmit infrared at the same time if there is a desire to obtain distance information from the scene. In this case, each vehicle needs to be able to recognize its transmission and not be fooled by transmissions from another vehicle. This can be accomplished, as discussed above, through the modulation scheme. Several such schemes would suffice with a pseudo-noise or code modulation as a preferred method for the present invention. This can also be accomplished if each vehicle accurately knows its position and controls its time of transmission according to an algorithm that time multiplexes transmissions based on the geographical location of the vehicle. Thus, if multiple vehicles are sensed in a given geographical area, they each can control their transmissions based on a common algorithm that uses the GPS coordinates of the vehicle to set the time slot for transmission so as to minimize interference between transmissions from different vehicles. Other multiplexing methods can also be used such as FDMA, CDMA or TDMA, any of which can be based on the geographical location of the vehicles.

Infrared and terahertz also have sufficient resolution so that pattern recognition technologies can be employed to recognize various objects, such as vehicles, in the reflected image as discussed above. infrared has another advantage from the object recognition perspective. All objects radiate and reflect infrared. The hot engine or tires of a moving vehicle in particular are recognizable signals. Thus, if the area around a vehicle is observed with both passive and active infrared, more information can be obtained than from radar, for example. Infrared is less attenuated by fog than optical frequencies, although it is not as good as radar. Infrared is also attenuated by snow but at the proper frequencies it has about five times the range of human sight. Terahertz under some situations has an effective range of as much as several hundred times that of human sight. Note, as with radar, Infrared and terahertz can be modulated with noise, pseudonoise, or other distinctive signal to permit the separation of various reflected signals from different transmitting vehicles.

An example of such an instrument is made by Sumitomo Electric and is sufficient for the purpose here. The Sumitomo product has been demonstrated to detect leaves of a tree at a distance of about 300 meters. The product operates at a 1.5 micron wavelength.

This brings up a philosophical discussion about the trade-offs between radar with greater range and infrared laser radar, or lidar, with more limited range but greater resolution. At what point should driving during bad weather conditions be prohibited? If the goal of Zero Fatalities™ is to be realized, then people should not be permitted to operate their vehicles during dangerous weather conditions. This may require closing roads and highways prior to the start of such conditions. Under such a policy, a system which accurately returns images of obstacles on the roadway that are two to five times the visual distance should be adequate. In such a case, radar would not be necessary.

5.2 Laser and Terahertz Radar Scanning System

Figure 25:
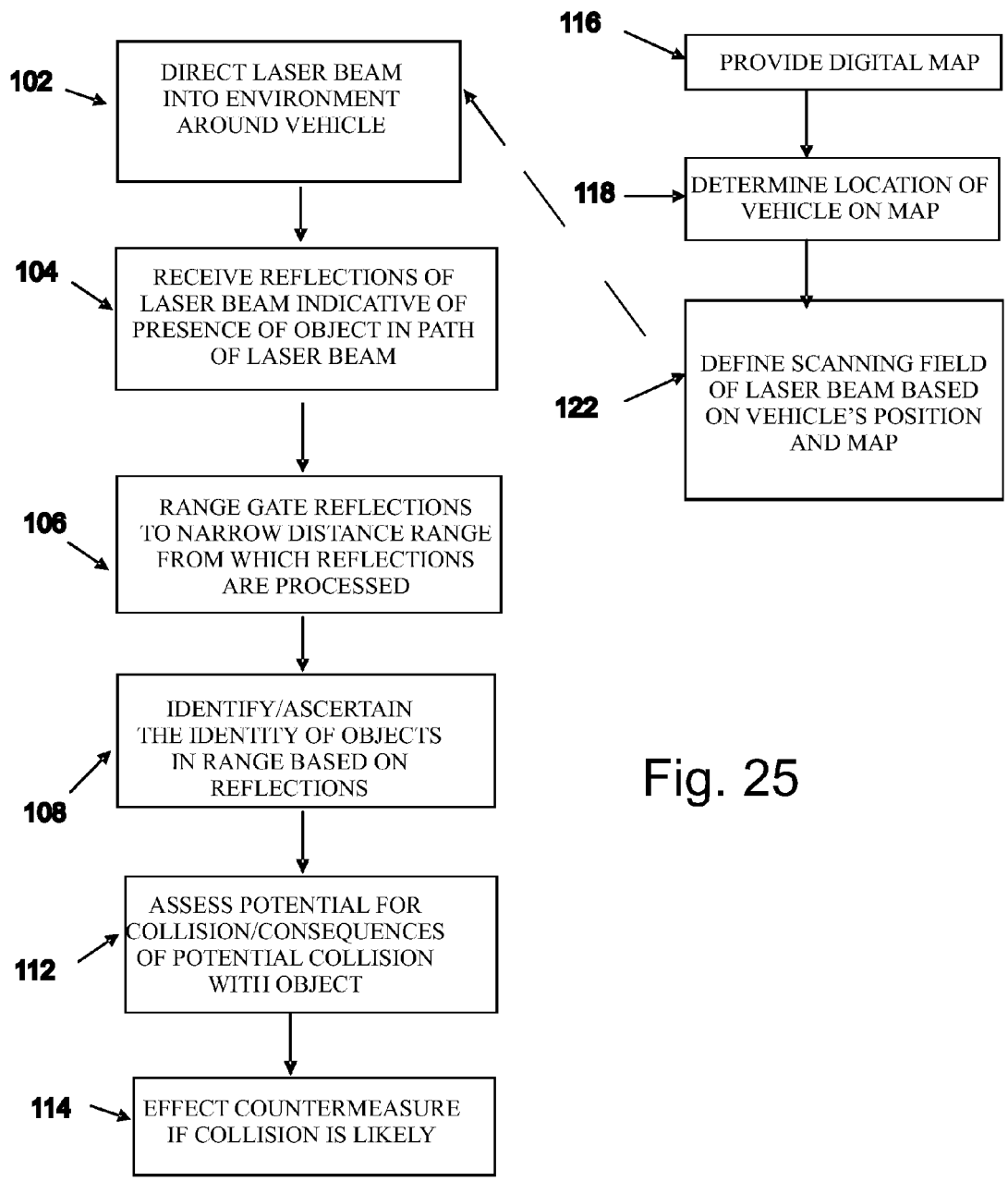
FIG. 25 is a schematic showing a method for avoiding collisions in accordance with the invention.

Referring to FIG. 25, a digital map 116 can be provided and when the vehicle's position is determined 118, e.g., by a GPS-based system, the digital map can be used to define the field 122 that the laser or terahertz radar scanner 102 will interrogate.

Note, when the term scanner is used herein, it is not meant to imply that the beam is so narrow as to require a back and forth motion (a scan) in order to completely illuminate an object of interest. To the contrary, inventions herein are not limited to a particular beam diameter other than that required for eye safety. Also a scanner may be limited to an angular motion that just covers a vehicle located 100 meters, for example, from the transmitting vehicle, which may involve no angular motion of the scanner at all, or to an angular motion that covers 90 or more degrees of the space surrounding the transmitting vehicle. Through the use of high-powered lasers and appropriate optics, an eye safe laser beam can be created that is 5 cm in diameter, for example, with a divergence angle less than one degree. Such an infrared spotlight requires very little angular motion to illuminate a vehicle at 100 meters, for example.

Generally herein, when laser radar, or lidar, is used it will also mean a system based on terahertz where appropriate. The laser radar or lidar scanner will return information as to distance to an object in the scanned field, e.g., laser beam reflections will be indicative of presence of object in path of laser beam 104 and from these reflections, information such as the distance between the vehicle and the object can be obtained. This will cover all objects that are on or adjacent to the highway. The laser pulse can be a pixel that is two centimeters or 1 meter in diameter at 50 meters, for example and that pixel diameter can be controlled by the appropriate optical system that can include adaptive optics and liquid lenses (such as described in "Liquid lens promises cheap gadget optics", NewScientist.com news service, Mar. 8, 2004).

The scanner should scan the entire road at such a speed that motion of the car can be considered insignificant. Alternately, a separate aiming system that operates at a much lower speed, but at a speed to permit compensation for the car angle changes, may be provided. Such an aiming system is also necessary due to the fact that the road curves up and down. Therefore two scanning methods, one a slow, but for large angle motion and the other fast but for small angles may be required. The large angular system requires a motor drive while the small angular system can be accomplished through the use of an acoustic wave system, such as Lithium Niobate ($LiNbO_3$), which is used to drive a crystal which has a large refractive index such as Tellurium dioxide. Other acoustic optical systems can also be used as scanners.

For these systems, frequently some means is needed to stabilize the image and to isolate it from vehicle vibrations. Several such stabilization systems have been used in the past and would be applicable here including a gyroscopic system that basically isolates the imaging system from such vibrations and keeps it properly pointed, a piezoelectric system that performs similarly, or the process can be accomplished in software where the image is collected regardless of the vibration but where the image covers a wider field of view then is necessary and software is used to select the region of interest.

Alternately, two systems can be used, a radar system for interrogating large areas and a laser radar for imaging smaller areas. Either or both systems can be range gated and noise or pseudonoise modulated.

The laser radar scanner can be set up in conjunction with a range gate 106 so that once it finds an object, the range can be narrowed so that only that object and other objects at the same range, 65 to 75 feet for example, are allowed to pass to the receiver. In this way, an image of a vehicle can be separated from the rest of the scene for identification by pattern recognition software 108. Once the image of the particular object has been captured, the range gate is broadened, to about 20 to 500 feet for example, and the process repeated for another object. In this manner, all objects in the field of interest to the vehicle can be separated and individually imaged and identified. Alternately, a scheme based on velocity can be used to separate a part of one object from the background or from other objects. The field of interest, of course, is the field where all objects with which the vehicle can potentially collide reside. Particular known and mapped features on the highway can be used as aids to the scanning system so that the pitch and perhaps roll angles of the vehicle can be taken into account.

Once the identity of the object is known, the potential for a collision between the vehicle and that object and/or consequences of a potential collision with that object are assessed, e.g., by a control module, control unit or processor 112. If collision is deemed likely, countermeasures are effected 114, e.g., activation of a driver alert system and/or activation of a vehicle control system to alter the travel of the vehicle (as discussed elsewhere herein).

Range gates can be achieved as high speed shutters by a number of devices such as liquid crystals, garnet films, Kerr and Pockel cells or as preferred herein as described in patents and patent applications of 3DV Systems Ltd., Yokneam, Israel including U.S. Pat. Nos. 6,327,073, 6,483,094, US2002/0185590, WO98/39790, WO97/01111, WO97/01112 and WO97/01113.

Prior to the time that all vehicles are equipped with the RtZF™ system described above, roadways will consist of a mix of vehicles. In this period, it will not be possible to totally eliminate accidents. It will be possible to minimize the probability of having an accident however, if a laser radar system similar to that described in Shaw (U.S. Pat. No. 5,529,138) with some significant modifications is used, or those described more recently in various patents and patent applications of Ford Global Technologies such as U.S. Pat. Nos. 6,690,017, 6,730,913, US2003/0034462, US2003/0155513 and US2003/0036881. It is correctly perceived by Shaw that the dimensions of a radar beam are too large to permit distinguishing various objects which may be on the roadway in the path of the instant vehicle. Laser radar provides the necessary resolution that is not provided by radar. Laser radar as used in the present invention however would acquire significantly more data than anticipated by Shaw. Sufficient data in fact would be attained to permit the acquisition of a three-dimensional image of all objects in the field of view. The X and Y dimensions of such objects would, of course, be determined knowing the angular orientation of the laser radar beam. The longitudinal or Z dimension can be obtained by such methods as time-of-flight of the laser beam to a particular point on the object and reflected back to the detector, by phase methods or by range gating. All such methods are described elsewhere herein and in patents listed above.

At least two methods are available for resolving the longitudinal dimension for each of the pixels in the image. In one method, a laser radar pulse having a pulse width of one to ten nanoseconds, for example, can be transmitted toward the area of interest and as soon as the reflection is received and the time-of-flight determined, a new pulse would be sent at a slightly different angular orientation. The laser, therefore, would be acting as a scanner covering the field of interest. A single detector could then be used, if the pixel is sufficiently small, since it would know which pixel was being illuminated. The distance to the reflection point could be determined by time-of-flight thus giving the longitudinal distance to all points in view on the object.

Alternately, the entire area of interest can be illuminated and an image focused on a CCD or CMOS array. By checking the time-of-flight to each pixel, one at a time, the distance to that point on the vehicle would be determined. A variation of this would be to use a garnet crystal as a pixel shutter and only a single detector. In this case, the garnet crystal would permit the illumination to pass through one pixel at a time through to a detector. A preferred method, however, for this invention is to use range gating as described elsewhere herein.

Other methods of associating a distance to a particular reflection point, of course, can now be performed by those skilled in the art including variations of the above ideas using a pixel mixing device (such as described in Schwarte, R. "A New Powerful Sensory Tool in Automotive Safety Systems Based on PMD-Technology", S-TEC GmbH Proceedings of the AMAA 2000) or variations in pixel illumination and shutter open time to determine distance through comparison of range gated received reflected light. In the laser scanning cases, the total power required from the laser is significantly less than in the area illumination design. However, the ability to correctly change the direction of the laser beam in a sufficiently short period of time complicates the scanning design. The system can work approximately as follows: The entire area in front of the instant vehicle, perhaps as much as a full 180 degree arc in the horizontal plane can be scanned for objects using either radar or laser radar. Once one or more objects had been located, the scanning range can be severely limited to basically cover that particular object and some surrounding space using laser radar. Based on the range to that object, a range gate can be used to eliminate all background and perhaps interference from other objects. In this manner, a very clear picture or image of the object of interest can be obtained as well as its location and, through the use of a neural network, combination neural network or optical correlation or other pattern recognition system, the identity of the object can be ascertained as to whether it is a sign, a truck, an animal, a person, an automobile or other object. The identification of the object will permit an estimate to be made of the object's mass and thus the severity of any potential collision.

Once a pending collision is identified, this information can be made available to the driver and if the driver ceases to heed the warning, control of the vehicle could be taken from him or her by the system. The actual usurpation of vehicle control, however, is unlikely initially since there are many situations on the highway where the potential for a collision cannot be accurately ascertained. Consequently, this system can be thought of as an interim solution until all vehicles have the RtZF™ system described above.

To use the laser radar in a scanning mode requires some mechanism for changing the direction of the emitted pulses of light. One acoustic-optic method of using an ultrasonic wave to change the diffraction angle of a Tellurium dioxide crystal is disclosed elsewhere herein. This can also be done in a variety of other ways such as through the use of a spinning multifaceted mirror, such as is common with laser scanners and printers. This mirror would control the horizontal scanning, for example, with the vertical scanning controlled though a stepping motor or the angles of the different facets of the mirror can be different to slightly alter the direction of the scan, or by other methods known in the art. Alternately, one or more piezoelectric materials can be used to cause the laser radar transmitter to rotate about a pivot point. A rotating laser system, such as described in Shaw is the least desirable of the available methods due to the difficulty in obtaining a good electrical connection between the laser and the vehicle while the laser is spinning at a very high angular velocity. Another promising technology is to use MEMS mirrors to deflect the laser beam in one or two dimensions.

Although the system described above is intended for collision avoidance or at least the notification of a potential collision, when the roadway is populated by vehicles having the RtZF™ system and vehicles which do not, its use is still desirable after all vehicles are properly equipped. It can be used to search for animals or other objects which may be on or crossing the highway, a box dropping off of a truck for example, a person crossing the road who is not paying attention to traffic. Motorcycles, bicycles, and other non-RtZF™ equipped vehicles can also be monitored.

One significant problem with all previous collision avoidance systems which use radar or laser radar systems to predict impacts with vehicles, is the inability to know whether the vehicle that is being interrogated is located on the highway or is off the road. In at least one system of the present invention, the location of the road at any distance ahead of the vehicle would be known precisely from the sub-meter accuracy maps, so that the scanning system can ignore, for example, all vehicles on lanes where there is a physical barrier separating the lanes from the lane on which the subject vehicle is traveling. This, of course, is a common situation on super highways. Similarly, a parked vehicle on the side of the road would not be confused with a stopped vehicle that is in the lane of travel of the subject vehicle when the road is curving. This permits the subject invention to be used for automatic cruise control. In contrast with radar systems, it does not require that vehicles in the path of the subject vehicle be moving, so that high speed impacts into stalled traffic can be avoided.

If a system with a broader beam to illuminate a larger area on the road in front of the subject vehicle is used, with the subsequent focusing of this image onto a CCD or CMOS array, this has an advantage of permitting a comparison of the passive infrared signal and the reflection of the laser radar active infrared. Metal objects, for example appear cold to passive infrared. This permits another parameter to be used to differentiate metallic objects from non-metallic objects such as foliage or animals such as deer. The breadth of the beam can be controlled and thereby a particular object can be accurately illuminated. With this system, the speed with which the beam steering is accomplished can be much slower. Both systems can be combined into the maximum amount of information to be available to the system.

Through the use of range gating, objects can be relatively isolated from the environment surrounding it other than for the section of highway which is at the same distance. For many cases, a properly trained neural network or other pattern recognition system can use this data and identify the objects. An alternate approach is to use the Fourier transform of the scene as input to the neural network or other pattern recognition system. The advantages of this latter approach are that the particular location of the vehicle in the image is not critical for identification. Note that the Fourier transform can be accomplished optically and optically compared with stored transforms using a garnet crystal or garnet films, for example, as disclosed in U.S. Pat. No. 5,473,466.

At such time, when the system can take control of the vehicle, it will be possible to have much higher speed travel. In such cases all vehicles on the controlled roadway will need to have the RtZF™ or similar system as described above. Fourier transforms of the objects of interest can be done optically though the use of a diffraction system. The Fourier transform of the scene can then be compared with the library of the Fourier transforms of all potential objects and, through a system used in military target recognition, multiple objects can be recognized and the system then focused onto one object at a time to determine the degree of threat that it poses.

Of particular importance is the use of a high powered laser radar such as a 30 to 100 watt laser diode in an expanded beam form to penetrate fog, rain and snow through the use of range gating. If a several centimeter diameter beam is projected from the vehicle in the form of pulses of from 1 to 10 nanoseconds long, for example, and the reflected radiation is blocked except that from the region of interest, an image can still be captured even though it cannot be seen by the human eye. This technique significantly expands the interrogation range of the system and, when coupled with the other imaging advantages of laser radar, offers a competitive system to radar and may in fact render the automotive use or radar unnecessary. One method is to use the techniques described in the patents to 3DV listed above. In one case, for example, if the vehicle wishes to interrogate an area 250 feet ahead, a 10 nanosecond square wave signal can be used to control the shutter which is used both for transmission and reception and where the off period can be 480 nanoseconds. This can be repeated until sufficient energy has been accumulated to provide for a good image. In this connection, a high dynamic range camera may be used such as that manufactured by IMS chips of Stuttgart, Germany as mentioned above. Such a camera is now available with a dynamic range of 160 db.

These advantages are also enhanced when the laser radar system described herein is used along with the other features of the RtZF™ system such as accurate maps and accurate location determination. The forward-looking laser radar system can thus concentrate its attention to the known position of the roadway ahead rather than on areas where there can be no hazardous obstacles or threatening vehicles.

5.3 Blind Spot Detection

The RtZF™ system of this invention also can eliminate the need for blind spot detectors such as discussed in U.S. Pat. No. 5,530,447 to Henderson. Alternately, if a subset of the complete RtZF™ system is implemented, as is expected in the initial period, the RtZF™ system can be made compatible with the blind spot detector described in the '447 patent.

One preferred implementation for blind spot monitoring as well as for monitoring other areas near the vehicle is the use of range-gated laser radar using a high power laser diode and appropriate optics to expand the laser beam to the point where the transmitted infrared energy per square millimeter is below eye safety limits. Such a system is described above

5.4 Anticipatory Sensing—Smart Airbags, Evolution of the System

A key to anticipating accidents is to be able to recognize and categorize objects that are about to impact a vehicle as well as their relative velocity. As set forth herein and in the current assignee's patents and patent applications, this can best be done using a pattern recognition system such as a neural network, combination neural network, optical correlation system, sensor fusion and related technologies. The data for such a neural network can be derived from a camera image but such an image can be overwhelmed by reflected light from the sun. In fact, lighting variations in general plague camera-based images resulting in false classifications or even no classification. Additionally, camera-based systems are defeated by poor visibility conditions and, additionally, have interference problems when multiple vehicles have the same system which may require a synchronization taking time away from the critical anticipatory sensing function.

To solve these problems, imaging systems based on millimeter wave radar, laser radar (lidar) and more recently terahertz radar can be used. All three systems generally work for anticipatory sensors since the objects are near the vehicle where even infrared scanning laser radar in a non-range gated mode has sufficient range in fog. Millimeter wave radar is expensive and to obtain precise images a narrow beam is required resulting in large scanning antennas. Laser radar systems are less expensive and since the beams are formed using optic technology they are smaller and easier to manipulate.

When computational power is limited, it is desirable to determine the minimum number of pixels that are required to identify an approaching object with sufficient accuracy to make the decision to take evasive action or to deploy a passive restraint such as an airbag. In one military study for anti-tank missiles, it was found that a total of 25 pixels are all that is required to identify a tank on a battlefield. For optical occupant detection within a vehicle, thousands of pixels are typically used. Experiments indicate that by limiting the number of horizontal scans to three to five, with on the order of 100 to 300 pixels per scan that sufficient information is available to find an object near to the vehicle and in most cases to identify the object. Once the object has been located then the scan can be confined to the position of the object and the number of pixels available for analysis substantially increases. There are obviously many algorithms that can be developed and applied to this problem and it is therefore left to those skilled in the art. At least one invention is based on the fact that a reasonable number of pixels can be obtained from the reflections of electromagnetic energy from an object to render each of the proposed systems practical for locating, identifying and determining the relative velocity of an object in the vicinity of a vehicle that poses a threat to impact the vehicle so that evasive action can be taken or a passive restraint deployed. See the discussion in section 5.5 below for a preferred implementation.

The RtZF™ system is also capable of enhancing other vehicle safety systems. In particular, by knowing the location and velocity of other vehicles, for those cases where an accident cannot be avoided, the RtZF™ system will in general be able to anticipate a crash and make an assessment of the crash severity using, for example, neural network technology. Even with a limited implementation of the RtZF™ system, a significant improvement in smart airbag technology results when used in conjunction with a collision avoidance system such as described in Shaw (U.S. Pat. Nos. 5,314,037 and 5,529,138) and a neural network anticipatory sensing algorithm such as disclosed in U.S. Pat. No. 6,343,810 to Breed. A further enhancement would be to code a vehicle-to-vehicle communication signal from RtZF™ system-equipped vehicles with information that includes the size and approximate weight of the vehicle. Then, if an accident is inevitable, the severity can also be accurately anticipated and the smart airbag tailored to the pending event. Information on the size and mass of a vehicle can also be implemented as an RFID tag and made part of the license plate.

Recent developments by Mobileye enable a method for obtaining the distance to an object and thus the relative velocity. Although this technique has many limitations, it may be useful in some implementations of one or more of the current inventions.

A further recent development is reported in U.S. patent application publication No. 20030154010, as well as other patents and patent publications assigned to Ford Global Technologies including U.S. Pat. Nos. 6,452,535, 6,480,144, 6,498,972, 6,650,983, 6,568,754, 6,628,227, 6,650,984, 6,728,617, 6,757,611, 6,775,605, 6,801,843, 6,819,991, 20030060980, 20030060956, 20030100982, 20030154011, 20040019420, 20040093141, 20040107033, 20040111200, and 20040117091. In the disclosures herein, emphasis has been placed on identifying a potentially threatening object and once identified, the properties of the object such as its size and mass can be determined. An inferior system can be developed as described in U.S. patent application publication No. 20030154010 where only the size is determined. In inventions described herein, the size is inherently determined during the process of imaging the object and identifying it. Also, the Ford patent publications mention the combined use of a radar or a lidar and a camera system. Combined use of radar and a camera is anticipated herein and disclosed in the current assignee's patents.

Another recent development by the U.S. Air Force uses a high powered infrared laser operating at wavelengths greater than 1.5 microns and a focal plane array as is reported in "Three-Dimensional Imaging" in AFRL Technology Horizons, April 2004. Such a system is probably too expensive at this time for automotive applications. This development illustrates the fact that it is not necessary to limit the lidar to the near infrared part of the spectrum and in fact, the further that the wavelength is away from the visible spectrum, the higher the power permitted to be transmitted. Also, nothing prevents the use of multiple frequencies as another method of providing isolation from transmissions from vehicles in the vicinity. As mentioned above for timing transmissions, the GPS system can also be used to control the frequency of transmission thus using frequency as a method to prevent interference. The use of polarizing filters to transmit polarized infrared is another method to provide isolation between different vehicles with the same or similar systems. The polarization angle can be a function of the GPS location of the vehicle.

It is an express intention of some of the inventions herein to provide a system that can be used both in daytime and at night. Other systems are intended solely for night vision such as those disclosed in U.S. Pat. Nos. 6,730,913, 6,690,017 and 6,725,139. Note that the use of the direction of travel as a method of determining when to transmit infrared radiation, as disclosed in these and other Ford Global patents and patent applications, can be useful but it fails to solve the problem of the transmissions from two vehicles traveling in the same vicinity and direction from receiving reflections from each others' transmissions. If the directional approach is used, then some other method is required such as coding the pulses, for example.

U.S. Pat. Nos. 6,730,913 and 6,774,367 are representative of a series of patents awarded to Ford Global Technologies as discussed above. These patents describe range gating as disclosed in the current assignee's earlier patents. An intent is to supplement the headlights with a night vision system for illuminating objects on the roadway in the path of the vehicle but are not seen by the driver and displaying these objects in a heads-up display. No attempt is made to locate the eyes of the driver and therefore the display cannot place the objects where they would normally be located in the driver's field of view as disclosed in the current assignee's patents. Experiments have shown that without this feature, a night vision system is of little value and may even distract the driver to where his or her ability to operate the motor vehicle is degraded. Other differences in the '913 and '367 system include an attempt to compensate for falloff in illumination due to distance, neglecting a similar and potentially more serious falloff due to scattering due to fog etc. In at least one of the inventions disclosed herein, no attempt is made to achieve this compensation in a systematic manner but rather the exposure is adjusted so that a sufficiently bright image is achieved to permit object identification regardless of the cause of the attenuation. Furthermore, in at least one embodiment, a high dynamic range camera is used which automatically compensates for much of the attenuation and thus permits the minimum exposure requirements for achieving an adequate image. In at least one of the inventions disclosed herein, the system is used both at night and in the daytime for locating and identifying objects and, in some cases, initiating an alarm or even taking control of the vehicle to avoid accidents. None of these objects are disclosed in the '913 or '367 patents and related patents. Additionally, US20030155513, also part of this series of Ford Global patents and applications, describes increasing the illumination intensity based on distance to the desired field of view. In at least one of the inventions disclosed herein, the illumination intensity is limited by eye safety considerations rather than distance to the object of interest. If insufficient illumination is not available on one pulse, additional pulses are provided until sufficient illumination to achieve an adequate exposure is achieved.

If the laser beam diverges, then the amount of radiation per square centimeter illuminating a surface will be a function of the distance of that surface from the transmitter. If that distance can be measured, then the transmitted power can be increased while keeping the radiation per square centimeter below the eye safe limits. Using this technique, the amount of radiated power can be greatly increased thus enhancing the range of the system in daylight and in bad weather. A lower power pulse would precede a high power pulse transmitted in a given direction and the distance measured to a reflective object would be measured and the transmitted power adjusted appropriately. If a human begins to intersect the path of transmission, the distance to the human would be measured before he or she could put his or her eye into the transmission path and the power can be reduced to remain within the safety standards.

It is also important to point out that the inventions disclosed herein that use lidar (laser radar or ladar) can be used in a scanning mode when the area to be covered is larger that the beam diameter or in a pointing mode when the beam diameter is sufficient to illuminate the target of interest, or a combination thereof.

It can be seen from the above discussion that the RtZF™ system will evolve to solve many safety, vehicle control and ITS problems. Even such technologies as steering and drive by wire will be enhanced by the RtZF™ system in accordance with invention since it will automatically adjust for failures in these systems and prevent accidents.

5.5 A Preferred Implementation

Figure 21A:
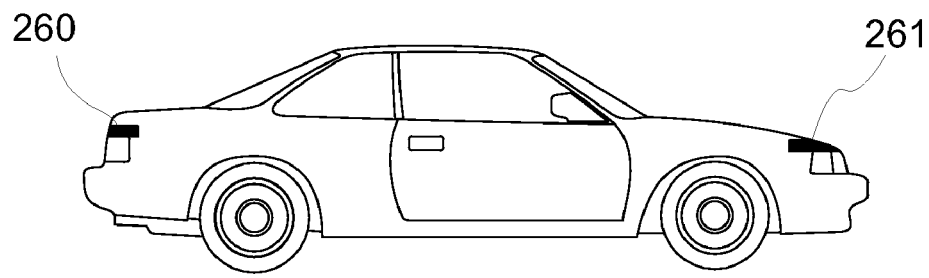
FIGS. 21A and 21B illustrate a preferred embodiment of a laser radar system mounted at the four corners of a vehicle above the headlights and tail lights.
Figure 21B:
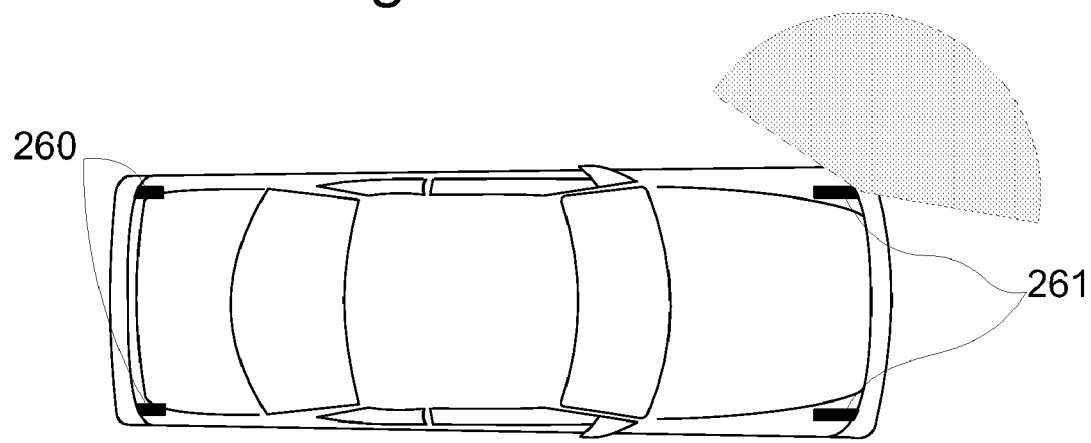
Figure 22A:
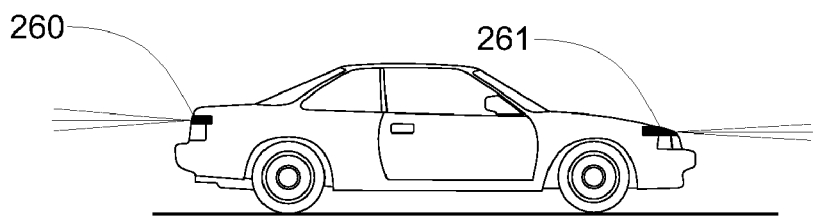
FIGS. 22A and 22B illustrate the system of FIGS. 21A and 21B for vehicles on a roadway.
Figure 22B:
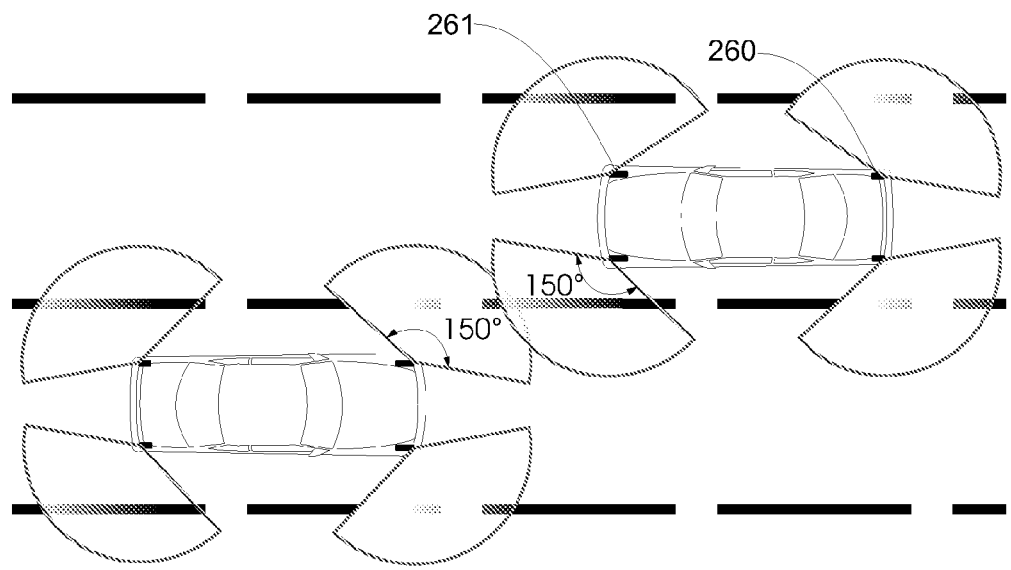

FIGS. 21A and 21B illustrate a preferred embodiment of a laser radar system having components mounted at the four corners of a vehicle above the headlights and tail lights. Laser radar units or assemblies 260 and 261 have a scan angle of approximately 150 degrees; however, for some applications a larger or smaller scanning angle can of course be used. The divergence angle for the beam for one application can be one degree or less when it is desired to illuminate an object at a considerable distance from the vehicle such as from less than fifty meters to 200 meters or more. In other cases, where objects are to be illuminated that are closer to the vehicle, a larger divergence angle can be used. Generally, it is desirable to have a field of illumination (FOI) approximately equal to the field of view (FOV) of the camera or other optical receiver. FIGS. 22A and 22B illustrate the system of FIGS. 21A and 21B for vehicles on a roadway. Note that the divergence angle in the horizontal plane and vertical plane are not necessarily equal.

Figure 23A:
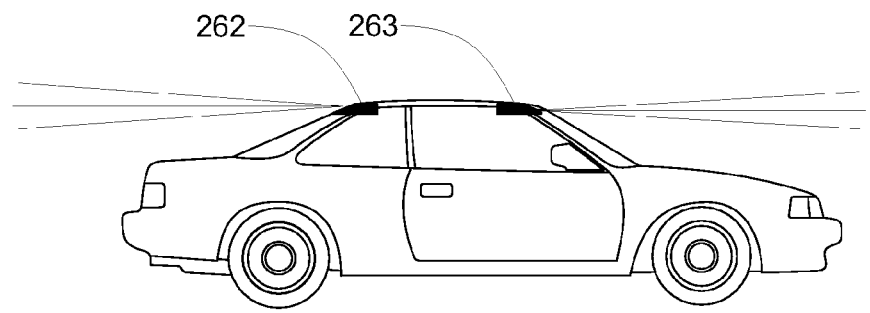
FIGS. 23A and 23B illustrate an alternative mounting location for laser radar units.
Figure 23B:
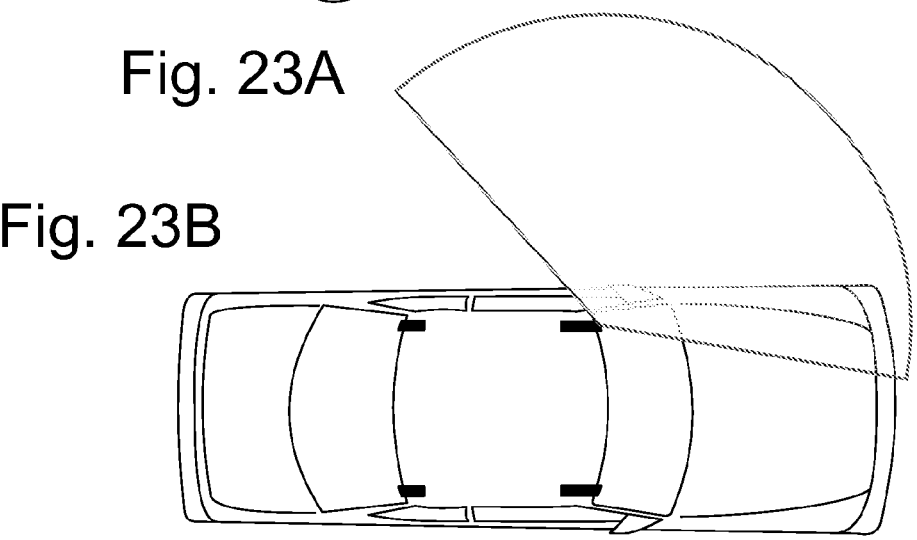

FIGS. 23A and 23B illustrate an alternative mounting location for laser radar units on or near the roof of a vehicle. They can be either inside or outside of the vehicle compartment. The particular design of the laser radar assemblies 262 and 263 are similar to those used in FIGS. 21A, 21B, 22A and 22B. Although not shown, other geometries are of course possible such as having the laser radar assemblies mounted on or near the roof for the rear assemblies and above the headlights for the frontal assemblies or vice versa. Also, although assemblies mounted on the corners of the vehicle are illustrated, in some cases it may be desirable to mount laser radar assemblies in the center of the front, back and sides of the vehicle or a combination or center and corner-mounted laser radar assemblies can be used.

Figure 24:
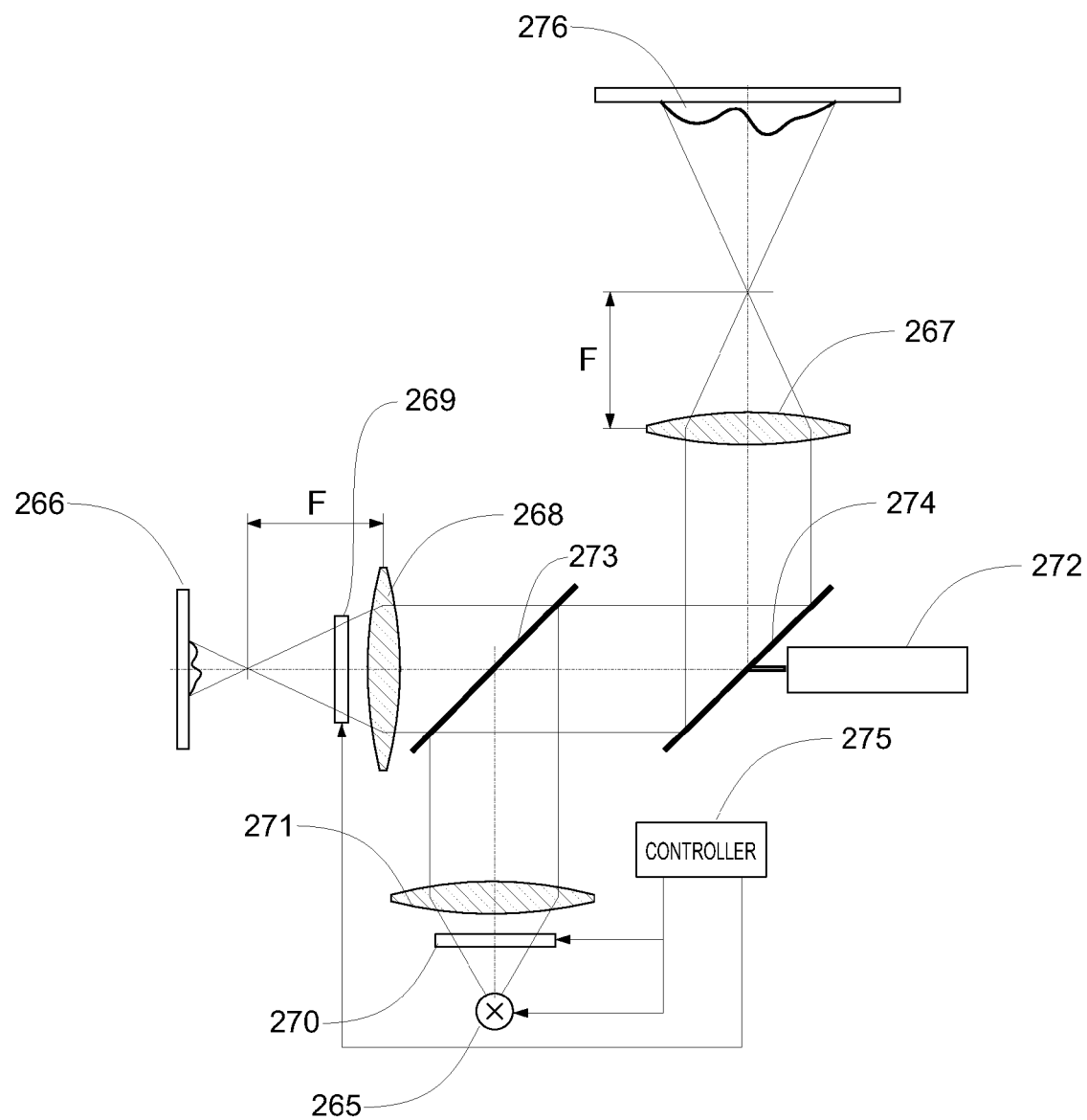
FIG. 24 is a schematic illustration of a typical laser radar device showing the scanning or pointing system with simplified optics.

FIG. 24 is a schematic illustration of a typical laser radar assembly showing the scanning or pointing system with simplified optics for illustration only. In an actual design, the optics will typically include multiple lenses. Also, the focal point will typically not be outside of the laser radar assembly. In this non-limiting example, a common optical system 267 is used to control a laser light 265 and an imager or camera 266. The laser source transmits, usually infrared, light through its optical sub-system 271 which collimates the radiation. The collimated radiation is then reflected off mirror 273 to mirror 274 which reflects the radiation to the desired direction through lens system 267. The direction of the beam is controlled by motor 272 which rotates both mirror 274 and optical system 267 to achieve the desired scanning or pointing angle. The radiation leaves the optical system 267 and illuminates the desired object or target 276. The radiation reflected from object 276 can pass back through lens 267, reflect off mirror 274 pass through semitransparent mirror 273 through optic subsystem 268 and onto optical sensitive surface 266. Many other configurations are possible. The transmission of the radiation is controlled by optical shutter 270 via controller 275. Similarly, the light that reaches the imager 266 is controlled by controller 275 and optical shutter 269. These optical shutters 269, 270 can be liquid crystal devices, Kerr or Pockel cells, garnet films, other spatial light monitors or, preferably, high speed optical shutters such as described in patents and patent applications of the 3DV Systems Ltd., of Yokneam, Israel, as set forth above or equivalent. Since much of the technology used in this invention related to the camera and shutter system is disclosed in the 3DV patents and patent applications, it will not be repeated here, by is incorporated by reference herein.

In some embodiments, it may be important to assure that the lens through which the laser radar radiation passes is clean. As a minimum, a diagnostic system is required to inform the RtZF™ or other system that the lens are soiled and therefore the laser radar system can not be relied upon. Additionally, in some applications, means are provided to clean one or more of the lens or to remove the soiled surface. In the latter case, a roll of thin film can be provided which, upon the detection of a spoiled lens, rolls up a portion of the film and thereby provides a new clean surface. When the roll is used up it can be replaced. Other systems provide one or more cleaning methods such as a small wiper or the laser radar unit can move the lens into a cleaning station. Many other methods are of course possible and the invention here is basically concerned with ascertaining that the lens is clean and if not informing the system of this fact and, in some cases, cleaning or removing the soiled surface.

Note that although laser radar and radar have been discussed separately, in some implementations, it is desirable to use both a radar system and a laser radar system. Such a case can be where the laser radar system is not capable to achieve sufficient range in adverse weather whereas the radar has the requisite range but insufficient resolution. The radar unit can provide a warning that a potentially dangerous situation exists and thus the vehicle speed should be reduced until the laser radar device and obtain an image with sufficient resolution to permit an assessment of the extent of the danger and determine whether appropriate actions should be undertaken.

5.6 Antennas

When the interrogation system makes use of radar such as systems in use at 24 GHz and 77 GHz, a key design issue is the antenna. The inventions herein contemplate the use of various types of antennas such as dipole and monopole designs, yagi, steerable designs such as solid state phased array and so called smart antennas. All combinations of antennas for radar surveillance around a vehicle are within the scope if the inventions disclosed herein. In particular, the Rotman lens offers significant advantages as disclosed in L. Hall, H. Hansen and D. Abbott "Rotman lens for mm-wavelengths", Smart Structures, Devices, and Systems, SPIE Vol. 4935 (2002). Other antenna designs can be applicable. In some cases, one radar source can be used with multiple antennas.

6. Smart Highways

A theme of inventions disclosed herein is that automobile accidents can be eliminated and congestion substantially mitigated through the implementation thereof. After sufficient implementations have occurred, the concept of a smart highway becomes feasible. When a significant number of vehicles have the capability of operating in a semi-autonomous manner, then dedicated highway lanes (like the HOV lanes now in use) can be established where use of the lanes is restricted to properly equipped vehicles. Vehicles operating in these lanes can travel in close-packed, high speed formations since each of them will know the location of the road, their location on the road and the location of every other vehicle in such a lane. Accidents in these lanes will not occur and the maximum utilization of the roadway infrastructure will have been obtained. Vehicle owners will be highly motivated to own equipped vehicles since their travel times will be significantly reduced and while traveling in such lanes, control of the vehicle can be accomplished by the system and they are then free to talk on the telephone, read or whatever.

7. Weather and Road Condition Monitoring

The monitoring of the weather conditions and the control of the vehicle consistent with those conditions has been discussed herein. The monitoring of the road conditions and in particular icing has also been discussed elsewhere herein and in other patents and patent applications of the current assignee. Briefly, a vehicle will be controlled so as to eliminate accidents under all weather and road conditions. This in some cases will mean that the vehicle velocity will be controlled and, in some cases, travel will be prohibited until conditions improve.

8. Communication with Other Vehicles—Collision Avoidance 8.1 Requirements

MIR might also be used for vehicle-to-vehicle communication except that it is line of sight. An advantage is that we can know when a particular vehicle will respond by range gating. Also, the short time of transmission permits many vehicles to communicate at the same time. A preferred system is to use spread spectrum carrier-less coded channels.

One problem which will require addressing as the system becomes mature is temporary blockage of a satellite by large trucks or other movable objects whose location cannot be foreseen by the system designers. Another concern is to prevent vehicle owners from placing items on the vehicle exterior that block the GPS and communication antennas.

The first problem can be resolved if the host vehicle can communicate with the blocking trucks and can also determine its relative location, perhaps through using the vehicle exterior monitoring system. Then the communication link will provide the location of the adjacent truck and the monitoring system will provide the relative location and thus the absolute location of the host vehicle can be determined.

The communication between vehicles for collision avoidance purposes cannot solely be based on line-of-sight technologies as this is not sufficient since vehicles which are out of sight can still cause accidents. On the other hand, vehicles that are a mile away from one another but still in sight, need not be part of the communication system for collision avoidance purposes. Messages sent by each vehicle, in accordance with an embodiment of the invention, can contain information indicating exactly where it is located and perhaps information as to what type of vehicle it is. The type of vehicle can include emergency vehicles, construction vehicles, trucks classified by size and weight, automobiles, and oversized vehicles. The subject vehicle can therefore eliminate all vehicles that are not potential threats, even if such vehicles are very close, but on the other side of the highway barrier.

The use of a wireless Ethernet protocol can satisfy the needs of the network, consisting of all threatening vehicles in the vicinity of the subject vehicle. Alternately, a network where the subject vehicle transmits a message to a particular vehicle and waits for a response could be used. From the response time, assuming that the clocks of both vehicles are or can be synchronized, the relative position of other vehicles can be ascertained which provides one more method of position determination. Thus, the more vehicles that are on the road with the equipped system, the greater accuracy of the overall system and the safer the system becomes.

To prevent accidents caused by a vehicle leaving the road surface and impacting a roadside obstacle requires only an accurate knowledge of the position of the vehicle and the road boundaries. To prevent collisions with other vehicles requires that the position of all nearby automobiles ideally should be updated continuously. However, just knowing the position of a threatening vehicle is insufficient. The velocity, size and/or orientation of the vehicle are also important in determining what defensive action or reaction may be required. Once all vehicles are equipped with the system of this invention, the communication of all relevant information will take place via a communication link, e.g., a radio link. In addition to signaling its absolute position, each vehicle will send a message identifying the approximate mass, velocity, orientation and/or other relevant information. This has the added benefit that emergency vehicles can make themselves known to all vehicles in their vicinity and all such vehicles can then take appropriate action to allow passage of the emergency vehicle. The same system can also be used to relay accident or other hazard information from vehicle-to-vehicle through an ad-hoc or mesh network.

8.2 A Preferred System

One preferred method of communication between vehicles uses that portion of the electromagnetic spectrum that permits only line of sight communication. In this manner, only those vehicles that are in view can communicate. In most cases, a collision can only occur between vehicles that can see each other. This system has the advantage that the "communications network" only contains nearby vehicles. This would require that when a truck, for example, blocks another stalled vehicle that the information from the stalled vehicle be transmitted via the truck to a following vehicle. An improvement in this system would use a rotating aperture that would only allow communication from a limited angle at a time further reducing the chance for multiple messages to interfere with each other. Each vehicle transmits at all angles but receives at only one angle at a time. This has the additional advantage of confirming at least the direction of the transmitting vehicle. An infrared rotating receiver can be looked at as similar to the human eye. That is, it is sensitive to radiation from a range of directions and then focuses in on the particular direction, one at a time, from which the radiation is coming. It does not have to scan continuously. In fact, the same transmitter which transmits 360 degrees could also receive from 360 degrees with the scanning accomplished using software.

An alternate preferred method is to use short distance radio communication so that a vehicle can receive position information from all nearby vehicles such as the DS/SS system. The location information received from each vehicle can then be used to eliminate it from further monitoring if it is found to be on a different roadway or not in a potential path of the subject vehicle.

Many communications schemes have been proposed for inter-vehicle and vehicle-to-road communication. At this time, a suggested approach utilizes DS/SS communications in the 2.4 GHz INS band. Experiments have shown that communications are 100 percent accurate at distances up to 200 meters. At a closing velocity of 200 KPH, at 0.5 g deceleration, it requires 30 meters for a vehicle to stop. Thus, communications accurate to 200 meters is sufficient to cover all vehicles that are threatening to a particular vehicle.

A related method would be to use a MIR system in a communications mode. Since the width of the pulses typically used by MIR is less than a nanosecond, many vehicles can transmit simultaneously without fear of interference. Other spread spectrum methods based on ultra wideband or noise radar are also applicable. In particular, as discussed below, a communication system based on correlation of pseudorandom or other codes is preferred.

With either system, other than the MIR system, the potential exists that more than one vehicle will attempt to send a communication at the same time and there will then be a 'data collision'. If all of the communicating vehicles are considered as being part of a local area network, the standard Ethernet protocol can be used to solve this problem. In that protocol, when a data collision occurs, each of the transmitting vehicles which was transmitting at the time of the data collision would be notified that a data collision had occurred and that they should retransmit their message at a random time later. When several vehicles are in the vicinity and there is the possibility of collisions of the data, each vehicle can retain the coordinates last received from the surrounding vehicles as well as their velocities and predict their new locations even though some data was lost.

If a line of sight system is used, an infrared, terahertz or MIR system would be good choices. In the infrared case, and if an infrared system were also used to interrogate the environment for non-equipped vehicles, pedestrians, animals etc., as discussed below, both systems could use some of the same hardware.

If point-to-point communication can be established between vehicles, such as described in U.S. Pat. No. 5,528,391 to Elrod, then the need for a collision detection system like Ethernet would not be required. If the receiver on a vehicle, for example, only has to listen to one sender from one other vehicle at a time, then the bandwidth can be considerably higher since there will not be any interruption.

When two vehicles are communicating their positions to each other, it is possible through the use of range gating or the sending of a "clear to send signal" and timing the response to determine the separation of the vehicles. This assumes that the properties of the path between the vehicles are known which would be the case if the vehicles are within view of each other. If, on the other hand, there is a row of trees, for example, between the two vehicles, a false distance measurement would be obtained if the radio waves pass through a tree. If the communication frequency is low enough that it can pass through a tree in the above example, it will be delayed. If it is a much higher frequency such that is blocked by the tree, then it still might reach the second vehicle through a multi-path. Thus, in both cases, an undetectable range error results. If a range of frequencies is sent, as in a spread spectrum pulse, and the first arriving pulse contains all of the sent frequencies, then it is likely that the two vehicles are in view of each other and the range calculation is accurate. If any of the frequencies are delayed, then the range calculation can be considered inaccurate and should be ignored. Once again, for range purposes, the results of many transmissions and receptions can be used to improve the separation distance accuracy calculation. Alternate methods for determining range can make use of radar reflections, RFID tags etc.

8.3 Enhancements

In an accident avoidance system of the present invention, the information indicative of a collision could come from a vehicle that is quite far away from the closest vehicles to the subject vehicle. This is a substantial improvement over the prior art collision avoidance systems, which can only react to a few vehicles in the immediate vicinity. The system described herein also permits better simultaneous tracking of several vehicles. For example, if there is a pileup of vehicles down the highway, then this information can be transmitted to control other vehicles that are still a significant distance from the accident. This case cannot be handled by prior art systems. Thus, the system described here has the potential to be used with the system of the U.S. Pat. No. 5,572,428 to Ishida, for example.

The network analogy can be extended if each vehicle receives and retransmits all received data as a single block of data. In this way, each vehicle is assured in getting all of the relevant information even if it gets it from many sources. Even with many vehicles, the amount of data being transmitted is small relative to the bandwidth of the infrared optical or radio technologies. In some cases, a receiver and re-transmitter can be part of the highway infrastructure. Such a case might be on a hairpin curve in the mountains where the oncoming traffic is not visible.

In some cases, it may be necessary for one vehicle to communicate with another to determine which evasive action each should take. This could occur in a multiple vehicle situation when one car has gone out of control due to a tire failure, for example. In such cases, one vehicle may have to tell the other vehicle what evasive actions it is planning. The other vehicle can then calculate whether it can avoid a collision based on the planned evasive action of the first vehicle and if not, it can inform the first vehicle that it must change its evasive plans. The other vehicle would also inform the first vehicle as to what evasive action it is planning. Several vehicles communicating in this manner can determine the best paths for all vehicles to take to minimize the danger to all vehicles.

If a vehicle is stuck in a corridor and wishes to change lanes in heavy traffic, the operator's intention can be signaled by the operator activating the turn signal. This could send a message to other vehicles to slow down and let the signaling vehicle change lanes. This would be particularly helpful in an alternate merge situation and have a significant congestion reduction effect.

8.4 Position-Based Code Communication

In conventional wireless communication such as between cell phones and a cell phone station or computers in a local area network, a limited number of clients are provided dedicated channels of communication with a central server. The number of channels is generally limited and the data transfer rate is maximized. The situation of communication between vehicles (cars, trucks, buses, boats, ships, airplanes) is different in that devices are all peers and the communication generally depends on their proximity. In general, there is no central server and each vehicle must be able to communicate with each other vehicle without going through a standard server.

Another distinguishing feature is that there may be a large number of vehicles that can potentially communicate with a particular vehicle. Thus, there needs to be a large number of potential channels of communication. One method of accomplishing this is based on the concept of noise radar as developed by Lukin et al. and described in the following:

1. K. A. Lukin. Noise Radar Technology for Short Range Applications, Proc of the. 5th Int. Conference and Exhibition on Radar Systems, (RADAR'99), May 17-21, Brest, France, 1999, 6 pages;
2. K. A. Lukin. Advanced Noise Radar Technology. Proc. of the PIERS Workshop on Advances in Radar Methods. Apr. 20-22, 1998, Hotel Dino, Baveno, Italy, JRC-Ispra 1998, pp. 137-140;
3. W. Keydel and K. Lukin. Summary of Discussion in working Group V: Unconventional New Techniques and Technologies for Future Radar, Proc. of the PIERS Workshop in Radar Methods. Apr. 20-22, 1998, Hotel Dino, Baveno, Italy, 1998, pp. 28-30;
4. Lukin K. A., Hilda A. Cerdeira and Colavita A. A. Chaotic instability of currents in reverse biased multilayered structure. Appl. Physics Letter, v. 77(17), 27 Oct. 1997, pp. 2484-2496;
5. K. A. Lukin. Noise Radar Technology for Civil Application. Proc. of the 1st EMSL User Workshop. 23-24 Apr. 1996, JRC-Ispra, Italy, 1997, pp. 105-112;
6. A. A. Mogyla. Adaptive signal filtration based on the two-parametric representation of random processes. Collective Volume of IRE NASU, Vol. 2, No. 2 pp. 137-141, 1997, (in Russian);
7. A. A. Mogyla, K. A. Lukin. Two-Parameter Representation of Non-Stationary Random Signals with a Finite Weighted Average Value of Energy. The Collective Volume of IRE NASU, No. 1, pp. 118-124, 1996, (in Russian);
8. K. A. Lukin. Noise Radar with Correlation Receiver as the Basis of Car Collision Avoidance System. 25th European Microwave Conference, Bologna; Conference Proceedings, UK, Nexus, 1995, pp. 506-507, 1995;
9. K. A. Lukin, V. A. Rakityansky. Dynamic chaos in microwave oscillators and its applications for Noise Radar development, Proc. 3rd Experimental Chaos Conference, Edinburg, Scotland, UK, 21-23 Aug. 1995;
10. V. A. Rakityansky, K. A. Lukin. Excitation of the chaotic oscillations in millimeter BWO, International Journal of Infrared and Millimeter Waves, vol. 16, No. 6, June, pp. 1037-1050, 1995;
11. K. A. Lukin. Ka-band Noise Radar. Proc. of the Millimeter and Submillimeter Waves, June 7-10 1994, Kharkov, Ukraine; Vol. 2, pp. 322-324, 1994;
12. K. A. Lukin, Y. A. Alexandrov, V. V. Kulik, A. A. Mogila, V. A. Rakityansky. Broadband millimeter noise radar, Proc. Int. Conf. on Modern Radars, Kiev, Ukraine, pp. 30-31, 1994 (in Russian);
13. K. A. Lukin. High-frequency chaotic oscillations from Chua's circuit. Journal of Circuits, Systems, and Computers, Vol. 3, No. 2, June 1993, pp. 627-643; In the book: Chua's Circuit Paradigma for Chaos, World Scientific, Singapore, 1993;
14. K. A. Lukin, V. A. Rakityansky. Application of BWO for excitation of the intensive chaotic oscillations of millimeter wave band. 23-rd European Microwave Conference. September 6-9, Madrid, Spain. Conf. Proceed. pp. 798-799, 1993;
15. K. A. Lukin, V. A. Rakityansky. Excitation of intensive chaotic oscillations of millimeter wave band. Proc. of ISSSE, Paris, Sep. 1-4, pp. 454-457, 1992;
16. V. V. Kulik, K. A. Lukin, V. A. Rakityansky. Non-Coherent Reflectometry Method for Measurement of Plasma Cut-Off Layer Position, Proc. of the Int. Conference on Millimeter Wave and Far-Infrared. Technology, Beijing, China, 17-21 Aug. 1992;
17. V. V. Kulik, K. A. Lukin, V. A. Rakityansky. Autodyne effect in BWO with chaotic dynamic. Collective Volume of IRE NASU, pp. 95-100, 1992, (in Russian);
18. V. V. Kulik, K. A. Lukin, V. A. Rakityansky. Application of noncoherent reflectometry method for fusion plasma dyagnostic. Collective Volume of IRE NASU, pp. 13-18, 1992, (in Russian);
19. B. P. Efimov, K. A. Lukin, V. A. Rakityansky. Chaotic interaction of modes in the electron-wave auto-oscillator with two feedback channels, Letters in Journal of Technical Physics, v. 15, No. 18, pp. 9-12, 1989, (in Russian);
20. B. P. Efimov, K. A. Lukin, V. A. Rakityansky. Transformation of chaotic oscillation power spectrum by reflections. Journal of Technical Physics, vol. 58, No. 12, pp. 2388-2400, 1988 (in Russian)).

The concept of noise radar is discussed in detail in the Lukin references listed above. A description of noise radar is included elsewhere herein and the discussion here will be limited to the use of pseudo random noise in a spread spectrum or Ultra-wideband spectrum environment for communication purposes.

Generally, a particular segment or band of the electromagnetic spectrum which is compatible with FCC regulations will be selected for vehicle-to-vehicle communication purposes. Such a band could include, for example 5.9 GHz to 5.91 GHz. The noise communication device will therefore transmit information in that band. Each vehicle will transmit a pseudorandom noise signal in a carrier-less fashion composed of frequencies within the chosen band. The particular code transmitted by a particular vehicle should be unique. Generally, the vehicle will transmit its code repetitively with a variable or fixed spacing between transmissions. The information which the vehicle wishes to transmit is encoded using the vehicle's code by any of a number of different techniques including phase modulation of distance or time between code transmissions, phase or amplitude modulation of the code sequences themselves, changes of the polarity of the entire code sequence or the individual code segments, or bandwidth modulation of the code sequence. Other coding technologies would also applicable and this invention is not limited to any particular coding method.

For example, a vehicle can have a 64 bit code which is a combination of a vehicle identification number and the GPS coordinates of the vehicle location. The vehicle would continuously transmit this 64 bit code using frequencies within the selected band. The 64 bit code could include both positive and negative bits in addition to 0 bits. When identifying the vehicle, the receiver could rectify the bits resulting in a 64 bit code of 0's and 1's. The information which the transmitting vehicle wishes to send could be represented by the choice of polarity of each of the code bits.

Once a particular vehicle begins communicating with another particular vehicle, the communication channel must remain intact until the entire message has been transmitted. Since there may be as many as 100 to 1000 vehicles simultaneously transmitting within radio range of the receiving vehicle, a transmitting vehicle must have a code which can be known to the receiving vehicle. One preferred technique is to make this identification code a function of the GPS coordinate location of transmitting vehicle. The code would need to be coarse enough so that information to be transmitted by the transmitting vehicle is accomplished before the transmitting vehicle changes its identification. If this information includes a position and velocity of the transmitting vehicle, then the receiving vehicle can determine the new transmitting code of the transmitting vehicle.

For example, the transmitting vehicle determines its location within one meter. It is unlikely that any other vehicle will be located within the same meter as the transmitting vehicle. Thus, the transmitting vehicle will have a unique code which it can send as a pseudorandom sequence in the noise communication system. A nearby vehicle can search all information received by its antenna for a sequence which represents each space within 30 meters of the receiving vehicle. If it detects such a sequence, it will know that there are one or more vehicles within 30 meters of the receiving vehicle. The search can now be refined to locate vehicles based on their direction since again the receiving vehicle can calculate the sequences that would be transmitted from a vehicle from any particular location within the 30 meter range. Once a particular vehicle has been identified, the receiving vehicle can begin to receive information from the transmitting vehicle through one or more of the coding schemes listed above. Since the information will preferably contain at least the velocity of transmitting vehicle, the receiving vehicle can predict any code sequence changes that take place and thus maintain communication with a particular vehicle even as the vehicle's code changes due to its changing position. The information being transmitted can also contain additional information about the vehicle and/or its occupants.

In this manner, a receiving vehicle can selectively receive information from any vehicle within its listenable range. Such range may be limited to 100 meters for a highly congested area or extend to 5000 meters in a rural environment. In this manner, each vehicle becomes a node on the temporary local area network and is only identified by its GPS location. Any vehicle can communicate with any other vehicle and when many vehicles are present, a priority scheme can be developed based on the urgency of the message, the proximity of vehicle, the possibility of a collision, or other desired prioritizing scheme.

The code transmitted by a particular vehicle will begin with a sequence that indicates, for example, the largest GPS segment that locates the vehicle which may be a segment 100 km square, for example. The next bits in the sequence would indicate which of next lower subsections which, for example, could be 10 km square. The next set of bits could further refine this to a 1 km square area and so on down to the particular square meter where the vehicle is located. Other units such as angles, degrees, minutes, seconds etc., could be more appropriate for locating a vehicle on the surface of spherical earth. By using this scheme, a receiving vehicle can search for all vehicles located within its 1 km or square segment and then when a vehicle is found, the search can be continuously refined until the exact location of the transmitting vehicle has been determined. This is done through correlation. The 100 or so vehicles transmitting with a range would all transmit low level signals which would appear as noise to the receiving vehicle. The receiving vehicle would need to know the code a particular vehicle was transmitting before it could identify whether that code was present in the noise. The code derived by the vehicle to be transmitted must be sufficiently unique that only one vehicle can have a particular code at a particular time. Since the messages from different vehicles are separated through correlation functions, all vehicles must have unique transmission codes which are not known beforehand by the receiving vehicle yet must be derivable by the receiving vehicle.

The communication need not be limited to communication between moving vehicles. This same technology permits communication between a vehicle and an infrastructure-based station.

There is no limit to the types of information that can be exchanged between vehicles or between vehicles and infrastructure-based stations. For example, if an event occurs such as an accident or avalanche, road erosion, fallen tree, or other event which temporarily changes the ability to travel safely on a section of a lane on a highway, an authorized agent can place the transmitting sign near the affected section of roadway which would transmit information using the noise communication technique to all oncoming vehicles within a 1 km range, for example. Prior to the placement of such a sign, a police vehicle could transmit a similar message to adjacent vehicles. Even an ordinary driver who first appears on the scene and identifies a potential hazard can send this message to vehicles within range of the hazard and can tag this message as a high priority message. An infrastructure-based receiving station can receive such a message and notify the emergency crews that attention is immediately required at a particular location on the highway. In this manner, all vehicles that could be affected by such an event as well as urgency response organizations can be immediately notified as soon as a hazard, such as an accident, occurs thereby greatly reducing the response time and minimizing the chance of vehicles engaging the hazardous location.

If a vehicle passes through a precise positioning location as described elsewhere herein, that vehicle (the vehicle's processor or computer) momentarily knows or can calculate the errors in the GPS signals and thus becomes a differential correction station. The error corrections can then be transmitted to nearby vehicles plus enhancing their knowledge of their position. If the PPS vehicle also has an onboard accurate clock, then the carrier phase of the satellite signals at the PPS location can be predicted and thus, as the vehicle leaves the PPS station, it can operate on carrier phase RTK differential GPS and thus know its position within centimeters or less. Similarly, if the phase of the carrier waves at PPS station is transmitted to adjacent vehicles, each vehicle also can operate on RTK carrier phase differential GPS. Thus, as many cars pass the PPS the accuracy with which each vehicle knows its position is continuously upgraded and at the time when the likelihood of collision between vehicles is a maximum, that is when many vehicles are traveling on a roadway, the accuracy with which each vehicle knows its location is also maximized. The RtZF™ system automatically improves as the danger of collision increases.

Other information which a vehicle can transmit relates to the GPS signals that it is receiving. In this manner, another form of differential GPS can occur called relative differential GPS. Without necessarily improving the accuracy with which a given vehicle precisely knows its position, by comparing GPS signals from one vehicle to another, the relative location of two vehicles can again be very accurately determined within centimeters. This of course is particularly important for collision avoidance.

Other information that can be readily transmitted either from vehicle to vehicle or from infrastructure-based stations to vehicles includes any recent map updates. Since a vehicle will generally always be listening, whenever a map update occurs this information can be received by a vehicle provided it is within range of a transmitter. This could occur overnight while the vehicle is in the garage, for example, or whenever the vehicle is not operating, e.g., parked. Each vehicle would have a characteristic time indicating the freshness of the information in its local map database. As the vehicle travels and communicates with other vehicles, this date can be readily exchanged and if a particular vehicle has a later map version than the other vehicle, it would signal the first vehicle requesting that the differences between the two map databases be transmitted from the first to the second vehicle. This transmission can also occur between an infrastructure-based station and a vehicle. Satellites, cell phone towers, etc. can also be used for map updating purposes.

If the operator of a particular vehicle wishes to send a text or voice message to another identified vehicle, this information can also be sent through the vehicle-to-vehicle communication system described herein. Similarly, interaction with the Internet via an infrastructure-based station can also be accomplished. In some cases, it may be desirable to access the Internet using communication channels with other vehicles. Perhaps, one vehicle has the satellite, Wi-Fi, Wimax or other link to the Internet while a second vehicle does not. The second vehicle could still communicate with the Internet through the first Internet-enabled vehicle.

Through the communication system based on noise or pseudonoise communication as described above is ubiquitous, the number of paths through which information can be transmitted to and from a vehicle is substantially increased which also greatly increases the reliability of the system since multiple failures can occur without affecting the overall system operation. Thus, once again the goal of zero fatalities is approached through this use of vehicle-to-vehicle communication.

By opening this new paradigm for communication between vehicles, and through the use of message relay from one vehicle to another, occupants of one vehicle can communicate with any other vehicle on a road. Similarly, through listening to infrastructure-based stations, the occupants can communicate with non-vehicle occupants. In many ways, this system supplements the cell phone system but is organized under totally different principles. In this case, the communication takes place without central stations or servers. Although servers and central stations can be attached to the system, the fundamental structure is one of independent nodes and temporary connections based on geographic proximity.

The system is self limiting in that the more vehicles communicating the higher the noise level and the more difficult it will be to separate more distant transmitters. When a vehicle is traveling in a rural environment, for example, where there are few sparsely located transmitters, the noise level will be low and communication with more distant vehicles facilitated. On the other hand, during rush hour, there will be many vehicles simultaneously communicating thus raising the noise level and limiting the ability of a receiver to receive distant transmissions. Thus, the system is automatically adjusting.

There are several collision avoidance-based radar systems being implemented on vehicles on the highways today. The prominent systems include ForeWarn™ by Delco division of the Delphi Corporation and the Eaton Vorad systems. These systems are acceptable as long as few vehicles on the roads have such system. As the number of radar-equipped vehicles increases, the reliability of each system decreases as radar transmissions are received that originate from other vehicles. This problem can be solved through the use of noise radar as described in the various technical papers by Lukin et al listed above.

Noise radar typically operates in a limited band of frequencies similarly to spread spectrum technologies. Whereas spread spectrum utilizes a form of carrier frequency modulation, noise radar does not. It is carrier-less. Typically, a noise-generating device is incorporated into the radar transmitter such that the signal transmitted appears as noise to any receiver. A portion of the noise signal is captured as it is transmitted and fed to a delay line for later use in establishing a correlation with a reflected pulse. In the manner described in the Lukin et al. papers, the distance and velocity of a reflecting object relative to the transmitter can be readily determined and yet be detectable by any other receiver. Thus, a noise radar collision avoidance system such as discussed in U.S. Pat. Nos. 6,121,915, 5,291,202, 5,719,579, and 5,075,863 becomes feasible. Lukin et al. first disclosed this technology in the above-referenced papers.

Although noise radar itself is not new, the utilization of noise radar for the precise positioning system described herein is not believed to have been previously disclosed by others. Similarly, the use of noise radar for detecting the presence of an occupant within a vehicle or of any object within a particular range of a vehicle is also not believed to have been previously disclosed by others. By setting the correlation interval, any penetration or motion of an object within that interval can be positively detected. Thus, if interval is sent at 2 meters, for example, the entire interior of a vehicle can be monitored with one simple device. If any object is moving within the vehicle, then this can readily detected. Similarly, the space being monitored can be limited to a portion of the interior of the vehicle such as the right passenger seat or the entire rear seat. In this manner, the presence of any moving object within that space can be determined and thus problems such as a hiding assailant or a child or animal left in a parked car can be addressed. A device placed in the trunk can monitor the motion of any object that has been trapped within the trunk thereby eliminating that well-known problem.

The radar system to be used for the precise positioning system can also be used for monitoring the space around a vehicle. In this case, a simple structure involving the placement of four antennas on the vehicle roof, for example, can be used to locate and determine the velocity of any object approaching or in the vicinity of the vehicle. Using neural networks and the reflection received from the four antennas, the location and velocity of an object can be determined and by observing the signature using pattern recognition techniques such as neural networks the object can be identified. Each antenna would send and receive noise radar waves from an angle of, for example, 180 degrees. One forward and one rear antenna could monitor the left side of the vehicle and one forward and one rear antenna could monitor the right side. Similarly, the two rear antennas could monitor the rear of the vehicle and the two forward antennas could monitor the forward part of the vehicle. In this manner, one simple system provides rear impact anticipatory sensing, automatic cruise control, forward impact anticipatory sensing, blind spot detection, and side impact anticipatory sensing. Since the duty cycle of the precise positioning system is small, most of the time would be available for monitoring the space surrounding the vehicle. Through the choice of the correlation interval and coding scheme (CDMA, noise, etc.), the distance monitored can also be controlled.

In addition to the position-based code, an ID related to the type of vehicle could also be part of the code so that an interested vehicle may only wish to interrogate vehicles of a certain class such as emergency vehicles. Also having information about the vehicle type communicated to the host vehicle can quickly give an indication of the mass of the oncoming vehicle which, for example, could aid an anticipatory sensor in projecting the severity of an impending crash.

Although it has been generally assumed that vehicle-to-vehicle communication will take place through a direct link or through an ad-hoc or mesh network, when Internet access becomes ubiquitous for vehicles, this communication could also take place via the Internet through a Wi-Fi or Wimax or equivalent link. Additionally, the use of an ad-hoc or mesh network for vehicle-to-vehicle communication especially to sending: relative location, velocity and vehicle mass information for collision avoidance purposes; GPS, DGPS, PPS related information for location determination and error correction purposes; traffic congestion or road condition information; weather or weather related information; and, vehicle type information particularly for emergency vehicle identification so that the host vehicle can take appropriate actions to allow freedom of passage for the emergency vehicle, are considered important parts of the present inventions. In fact, a mesh or ad-hoc network can greatly improve the working of an ubiquitous WI-FI, Wimax or equivalent Internet system thereby extending the range of the wireless Internet system.

This system also supports emergency vehicles sending warnings to vehicles that are in its path since it, and only it, will know its route from its present location to its destination. Such a system will permit significant advanced warning to vehicles on the route and also allow for the control of traffic lights based on its planned route long before it arrives at the light. In this regard, see "Private Inventor Files Patent Application For Telematics-Based Public and Emergency First Responders Safety Advisory System", ITS America News Release Feb. 13, 2004, for a discussion of a primitive but similar system.

An alternate approach to using the code-based on location system is to use a vehicle ID system in connection with an easily accessible central database that relates the vehicle ID to its location. Then communication can take place via a code-based in the vehicle ID, or some equivalent method.

9. Infrastructure-to-Vehicle Communication

Initial maps showing roadway lane and boundary location for the CONUS can be installed within the vehicle at the time of manufacture. The vehicle thereafter would check on a section-by-section basis whether it had the latest update information for the particular and surrounding locations where it is being operated. One method of verifying this information would be achieved if a satellite or Internet connection periodically broadcasts the latest date and time or version that each segment had been most recently updated. This matrix would amount to a small transmission requiring perhaps a few seconds of airtime. Any additional emergency information could also be broadcast in between the periodic transmissions to cover accidents, trees falling onto roads etc. If the periodic transmission were to occur every five minutes and if the motion of a vehicle were somewhat restricted until it had received a periodic transmission, the safety of the system can be assured. If the vehicle finds that it does not have the latest map information, vehicle-to-vehicle communication, vehicle-to-infrastructure communication, Internet communication (Wi-Fi, Wi-max or equivalent), or the cell phone in the vehicle can be used to log on to the Internet, for example, and the missing data downloaded. An alternate is for the GEOs, LEOs, or other satellites, to broadcast the map corrections directly.

When mention is made of the vehicle being operative to perform communications functions, it is understood that the vehicle includes a processor, maybe in the form of a computer, which is coupled to a communications unit including at least a receiver capable of receiving wireless or cellphone communications, and thus this communications unit is performing the communications function and the processor is performing the processing or analytical functions.

It is also possible that the map data could be off-loaded from a transmitter on the highway itself or at a gas station, for example, as discussed above. In that manner, the vehicles would only obtain that map information which is needed and the map information would always be up to the minute. As a minimum, temporary data communication stations can be placed before highway sections that are undergoing construction or where a recent blockage has occurred, as discussed above, and where the maps have not yet been updated. Such an emergency data transfer would be signaled to all approaching vehicles to reduce speed and travel with care. Such information could also contain maximum and minimum speed information which would limit the velocity of vehicles in the area. Other locations for transmitters include anywhere on a roadway on which the vehicles travel, any vehicle-accessible commercial or public location such as malls, at the vehicle operator's home or place of business, and even on a road sign. Moreover, if information about weather or road conditions in vicinity of the transmitter is obtained, a maximum speed limit for roads in the vicinity of the transmitter can be determined based on the information about the weather or road conditions and provided to the transmitter for transmission to the vehicles.

There is other information that would be particularly useful to a vehicle operator or control system, including in particular, the weather conditions, especially at the road surface. Such information could be obtained by road sensors and then transmitted to all vehicles in the area by a permanently installed system as disclosed above and in the current assignee's U.S. Pat. No. 6,662,642. Such road sensors would preferably be embedded in or alongside the road surface to obtain data about the road surface with the data being directed to transmitters for transmission to vehicles in range of the transmitter and traveling or expected to travel over the road surface in or alongside which the sensors are embedded. The transmission technique may be as described elsewhere herein for transmitting information to vehicles from infrastructure-based transmitters.

Alternately, there have been recent studies that show that icing conditions on road surfaces, for example, can be accurately predicted by local meteorological stations and broadcast to vehicles in the area. If such a system is not present, then the best place to measure road friction is at the road surface and not on the vehicle. The vehicle requires advance information of an icing condition in order to have time to adjust its speed or take other evasive action. The same road-based or local meteorological transmitter system could be used to warn the operators of traffic conditions, construction delays etc. and to set the local speed limit. In general, information provided to the transmitters for transmission to the vehicle operators can be weather information, road surface information, traffic information, speed limit information, information about construction, information about points of interest (possibly restricted based on position of the vehicle), information about the presence of animals in proximity to the road, information about signs relating to the road, accidents, congestion, speed limits, route guidance, location-based services, emergency or other information from police, fire or ambulance services, or information generated by probe vehicles. Probe vehicles are generally those vehicles which precede the host vehicle in time along the same highway or in the same area.

Once one vehicle in an area has discovered an icing condition, for example, this information can be immediately transmitted to all equipped vehicles through the vehicle-to-vehicle communication system discussed above. In a preferred implementation, icing and other such conditions would be sensed and the information transmitted automatically by the vehicle without driver involvement.

In view of the various types of information that can be transmitted to the vehicle from infrastructure-based transmitters, one embodiment of the invention provides for a user input device on the vehicle which enables an occupant of the vehicle to request information to be transmitted via the transmitter. The requested information is provided to the transmitter for retransmission to the vehicle. The source of information might be a website accessed by the user through the transmitter with the requested information being provided to the transmitter and then transmitted to the vehicle.

Another manner to provide for transmission of information to the vehicle is based on satisfaction of a condition requiring transmission of information to the vehicle. A condition might be detection of a particular weather pattern, such as snow, in which case, road icing information is transmitted to the vehicle whenever snow is detected.

A number of forms of infrastructure-to-vehicle communication have been discussed elsewhere herein. These include map and differential GPS updating methods involving infrastructure stations which may be located at gas stations, for example. Also communications with precise positioning stations for GPS independent location determination have been discussed. Communications via the Internet using either satellite and/or Internet services with electronic steerable antennas such as are available from KVH, Wi-Fi or Wimax which will undoubtedly become available ubiquitously throughout the CONUS, for example, as discussed below. All of the services that are now available on the Internet plus many new services will thus be available to vehicle operators and passengers. The updating of vehicle resident software will also become automatic via such links. The reporting of actual vehicle failures (diagnostics) and forecasted vehicle failures (prognostics), derived by a diagnostic system on the vehicle or a diagnostic system remote from the vehicle but which receives data from the vehicle and returns a diagnostic determination, will also able to be communicate via one of these links to the authorities, the smart highway monitoring system, vehicle dealers and manufacturers (see U.S. Pat. No. 7,082, 359). Thus, the diagnostic or prognostic determination is transmitted from the vehicle to a transmitter which in turn can direct the determination to a dealer, manufacturer, vehicle owner and/or service center.

This application along with the inventions herein provide a method of notifying interested parties of the failure or forecasted failure of a vehicle component using a vehicle-to-infrastructure communication system. Such interested parties can include, but are not limited to: a vehicle manufacturer so that early failures on a new vehicle model can be discovered so as to permit an early correction of the problem; a dealer so that it can schedule fixing of the problem so as to provide for the minimum inconvenience of their customer and even, in some cases, dispatching a service vehicle to the location of the troubled vehicle; NHTSA so that they can track problems (such as for the Firestone tire problem) before they become a national issue; the police, EMS, fire department and other emergency services so that they can prepare for a potential emergency etc. For example in "Release of Auto Safety Data Is Disputed", New York Times Dec. 13, 2002 it is written "After Firestone tire failures on Ford Explorers led to a national outcry over vehicle safety, Congress ordered a watchdog agency to create an early-warning system for automotive defects that could kill or injure people." The existence of the system disclosed herein would provide an automatic method for such a watchdog group to monitor all equipped vehicles on the nation's highways. As a preliminary solution, it is certainly within the state of the art today to require all vehicles to have an emergency locator beacon or equivalent that is impendent of the vehicle's electrical system and is activated on a crash, rollover or similar event.

Although the '129 patent application primarily discusses diagnostic information for the purpose of reporting present or forecasted vehicle failures, there is of course a wealth of additional data that is available on a vehicle related to the vehicle operation, its location, its history etc. where an interested party may desire that such data be transferred to a site remote from the vehicle. Interested parties could include the authorities, parents, marketing organizations, the vehicle manufacturer, the vehicle dealer, stores or companies that may be in the vicinity of the vehicle, etc. There can be significant privacy concerns here which have not yet been addressed. Nevertheless, with the proper safeguards the capability described herein is enabled partially by the teachings of this invention.

For critical functions where a software-induced system failure cannot be tolerated, even the processing may occur on the network achieving what pundits have been forecasting for years that "the network is the computer". Vehicle operators will also have all of the functions now provided by specialty products such as PDAs, the Blackberry, cell phones etc. available as part of the infrastructure-to-vehicle communication systems disclosed herein.

There are of course many methods of transferring data wirelessly in addition to the CDMA system described above. Methods using ultra wideband signals were first disclosed by ATI or ITI in previous patents and are reinforced here. Much depends of the will of the FCC as to what method will eventually prevail. Ultra wideband within the frequency limits set by the FCC is certainly a prime candidate and lends itself to the type of CDMA system where the code is derivable from the vehicle's location as determined, for example, by the GPS that this is certainly a preferred method for practicing the teachings disclosed herein.

Note that different people may operate a particular vehicle and when a connection to the Internet is achieved, the Internet may not know the identity of the operator or passenger, for the case where the passenger wishes to operate the Internet. One solution is for the operator or passenger to insert a smart card, plug in their PDA or cell phone or otherwise electronically identify themselves. An embodiment of the invention is therefore possible wherein the occupant of the vehicle is first identified and then information is transmitted to the vehicle via the transmitter based on the identification of the occupant. To this end, personal data for occupants may be stored at one or more sites accessible via the Internet, a determination is made after the occupant is identified as to where a particular person's personal data is stored (e.g., using a table), and then the personal data is transmitted from the determined storage location to the vehicle via the transmitter upon identification of the occupant.

Transponders are contemplated by the inventions disclosed herein including SAW, RFID or other technologies, reflective or back scattering antennas, polarization rotating antennas, etc. that can be embedded within the roadway or placed on objects beside the roadway, in vehicle license plates, for example. An interrogator within the vehicle transmits power to the transponder and receives a return signal. Alternately, as disclosed above, the responding device can have its own source of power so that the vehicle-located interrogator need only receive a signal in response to an initiated request. The source of power can be a battery, connection to an electric power source such as an AC circuit, solar collector, or in some cases, the energy can be harvested from the environment where vibrations, for example, are present. The range of a license-mounted transponder, for example, can be greatly increased if such a vibration-based energy harvesting system is incorporated.

Some of the systems disclosed herein make use of an energy beam that interrogates a reflector or retransmitting device. Such a device can be a sign as well as any pole with a mounted reflector, for example. In some cases, it will be possible for the infrastructure device to modify its message so that when interrogated it can provide information in addition to its location. A speed limit sign, for example, can return a variable code indicating the latest speed limit that then could have been set remotely by some responsible authority. Alternately, construction zones frequently will permit one speed when workers are absent and another when workers are present. The actual permitted speed can be transmitted to the vehicle when it is interrogated or as the vehicle passes. Thus, a sign or reflector could also be an active sign and this sign could be an active matrix organic display and solar collector that does not need a connection to a power line and yet provides both a visual message and transmits that message to the vehicle for in-vehicle signage. Each of these systems has the advantage that since minimal power is required to operate the infrastructure-based sign, it would not require connection to a power line. It would only transmit when asked to do so either by a transmission from the vehicle or by sensing that a vehicle is present.

A key marketing point for OnStar® is their one button system. This idea can be generalized in that a vehicle operator can summon help or otherwise send a desired message to a remoter site by pushing a single button. The message sent can just be a distress message or it can perform a particular function selected by the vehicle depending on the emergency or from a menu selected by the operator. Thus, the OnStar™ one button concept is retained but the message can be different for different situations.

9.1 General

In order to eliminate fatalities on roads and mitigate congestion, it is critical that vehicles communicate with each other. The type of communication can take at least two forms, that which is time critical such when two vehicles are about to collide and that which can have some delay such as information that the road is icy 2 miles ahead. Time critical communication is discussed above. This section will concentrate on the not time-critical communication which can also include information from a vehicle that passed through an area an hour prior to the subject vehicle or information derived from a server that may not be near the vehicle. Thus, this second type of communications can involve an entity that is not a vehicle such as a network server. In many cases, such a server will be required such as when a vehicle transmits a picture of an accident that needs to be interpreted before it can be added as a temporary update to a map of the area.

Figure 26:
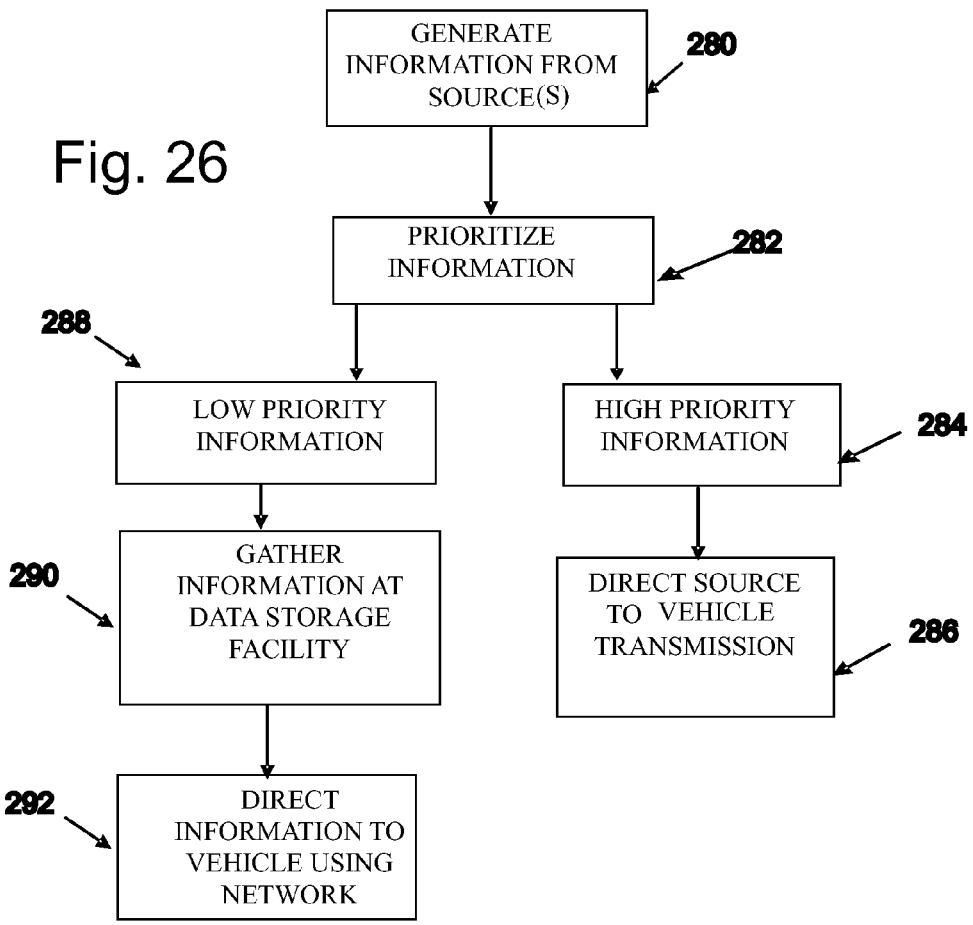
FIG. 26 is a schematic of a multi-form communication system in accordance with the invention.

Referring to FIG. 26 to explain this multi-form of communications, a method for transmitting information to a host vehicle traveling on a road using two different types or ways of communications in accordance with the invention includes generating information from one or more sources thereof to be wirelessly transmitted to an information receiving system resident on the host vehicle during travel of the vehicle 280. The sources may be other vehicles on the road(s) on which the vehicle is traveling or about to or expected to travel, or infrastructure facilities, e.g., stations or transmitters. Thus, the information may be about one or more roads on which the host vehicle will travel in the future from other vehicles which traveled the road prior to the host vehicle.

The information is then prioritized to distinguish between high priority, time-critical information of immediate relevance to operation of the vehicle and low priority, non-time-critical information of non-immediate relevance to the operation of the host vehicle 282. This prioritization may be performed by the information receiving system resident on the vehicle, e.g., based on an initial transmission from each source, or at a data storage facility separate and apart from the host vehicle at which the information is being gathered. The prioritization may be performed based on the current position of the host vehicle, the location of the source and/or identity of the source. Some sources can always be considered high priority sources, e.g., vehicles within a pre-determined range and in an expected path of travel of the host vehicle.

In particular when prioritization is performed by the information receiving system resident on the vehicle, it can be performed using the method described above with reference to FIG. 20 to prioritize the received information in the form of waves or signals, i.e., filter transmissions from transmitters. That is, any transmission from a particular transmitter deemed to be a transmission of interest (based on decoding of the initial part of the transmission 252*a*) may be considered high priority information whereas any transmission from a transmitter not deemed to contain information of interest (based on decoding of the initial part of the transmission 252*a*), is considered low priority information.

High priority information 284, such as information from vehicles in close proximity to the host vehicle and information potentially useful or necessary for collision avoidance, is preferably transmitted directly from the source 286. This ensures that the host vehicle will immediately have information necessary for it to continue safe operation of the vehicle, e.g., by avoiding collisions with other proximate vehicles or infrastructure.

Low priority information 288, or any other information not deemed high priority, is gathered at the data storage facility 290 and directed therefrom to the host vehicle using the ubiquitous network described below, e.g., the Internet 292.

9.2 Ubiquitous Broadband Network

External monitoring, as discussed in U.S. patent application Ser. No. 11/183,598 filed Jul. 18, 2005, so far has been concerned with a host or resident vehicle monitoring the space in its environment. Usually, there are vehicles that precede the host vehicle and experience the same environment prior to the host vehicle. Information from such vehicles, which can be called "probe" vehicles, can be communicated to the host vehicle to aid that vehicle in its safe travel. This is the subject of communication between vehicles discussed above. Generally, communication between vehicles is composed of that which should be transmitted in the most expedient fashion to aid in collision avoidance as discussed above and that where some delay can be tolerated. For the first type, a broadcast protocol, ad-hoc or mesh local network is preferred where each vehicle transmits a message to surrounding vehicles directly and with or without employing networking protocols, error correction, handshaking depending on the urgency of the message etc. When many vehicles are trying to communicate, the host vehicle needs to have a method for determining which vehicle to listen to which can be done, for example, by a CDMA type system where the code is a function of the transmitting vehicle's location such as its GPS coordinates. The receiving vehicle with a resident map can determine the codes where potentially threatening vehicles are resident and listen only to those codes, as discussed above.

For the second type of communication, the Internet or similar ubiquitous system is possible. Each probe vehicle would communicate information, such as the existence of a new construction zone, a patch of ice, fog or other visibility conditions, an accident or any other relevant information, to a central source which would monitor all such transmissions and issue a temporary map update to all vehicles in the vicinity over the Internet, or equivalent. If the probe vehicle came upon an accident, then such a vehicle can also transmit one or more pictures of the accident to a central control station (which monitors and controls the central source). The picture(s) could be transmitted automatically without any action on the part of the driver who may not even be aware that it is occurring. The central control station could then determine the nature, seriousness, extent etc. of the accident (either with manual input or through software trained to perform these functions) and issue a meaningful update to a map of the area and later remove the update when the accident is cleared. Removal of the update can be performed manually or through subsequent analysis of the accident location. This will permit timely display of the accident on a map display to equipped vehicles. Each passing vehicle, for example, could be instructed by the central control station to photograph and send the picture to the central control station so that it would know when the accident has been cleared.

This idea can be extended to cover other hazards. If some probe vehicles are equipped with appropriate sensors such as radiation, chemical and/or biological sensors, an early warning of a terrorist attack can be transmitted to the central control station all without any action on the part of the vehicle operator. A probe vehicle can be any equipped vehicle. Additionally, routine probe vehicle reports can be sent over the network. While on the subject of chemical sensors, a SAW or other chemical sensor can be put into the heating and air-conditioning system and monitor the presence of alcohol fumes in the car and transmit data to the authorities if a positive reading is achieved. Similarly, chemical sensors can be placed in all cargo containers, trucks and other vehicles to warn the authorities when such vehicles containing explosives or other hazardous chemicals are present or being transported. Furthermore such a system can monitor and report on air pollution and carbon monoxide and other fumes inside or emanating from any vehicle. Monitoring and tracking of trucks, cargo containers and other vehicles in general to prevent theft and/or for homeland security applications are greatly facilitated. Similarly, systems to warn of hijacking or carjacking can be greatly facilitated by a ubiquitous Internet or equivalent. Stolen car tracking and recovery efforts would also be facilitated as would the notification of a vehicle break-in.

In general, any information that can be sensed by a vehicle traveling on a roadway, including the maintenance state of the roadway itself, can be automatically monitored and relevant information can be transmitted automatically over the Internet, or equivalent, to a central control station, or centralized data source monitored and controlled thereby, along with appropriate pictures if available. This can include road condition monitoring such as for potholes etc., transmitting warnings of slippery roads, bad whether, changed speed limits and construction zones including the sending of photographs or video of any place where the road and/or traffic appears to be improperly functioning such as resulting from an accident, impact with a deer, mudslide, rock slide, etc. Other examples include highway spills, boxes fallen from vehicles, the reporting of vehicle and other fires, the reporting of any anomaly can be done by pictures or a recorded voice. Furthermore, visibility conditions, which can be used for setting speed limits and also for setting the maximum speed that a vehicle is permitted to travel, can be reported if the vehicle has such measuring equipment. All such reporting except that requiring a voice input can be done automatically or initiated by a vehicle occupant.

This assumes the existence of a ubiquitous Internet, or equivalent. This is believed to be the least expensive way of providing such a capability to the approximately 4 million miles of roads in the continental US. Proposals are now being considered to put transceivers every 100 meters along the major highways in the US at an installation cost of billions of dollars. Such transceivers would only cover the major highways even though the majority of fatal accidents occur on other roadways. The maintenance cost of such a system would also be prohibitive and its reliability questionable. For far less money, the continental US can be covered with IEEE 802.11-based systems or equivalent. Such transceivers can each cover up to a radius of 30-50 miles thus requiring only approximately 500 to 1000 such stations to cover the entire continental US. More units would be required in densely populated areas. The cost of such units can be as low as a few thousand dollars each but even if they cost a million dollars each, it would be a small cost compared with the alternative roadside transceivers.

Initially, it is contemplated that some areas of the country will not have such 802.11 or equivalent stations. For those areas, map updates and all other information described herein and especially in this section can be transmitted by a variety of methods including a station on satellite radio or some other satellite transmitting system, through the cell phone network or any other existing or special communication system including normal radio and TV stations. If the selected system does not support two way communications, then the messages created by the probe vehicle can be stored and transmitted when access to the Internet is available. A probe vehicle can be a specially equipped vehicle or all or any vehicles with the appropriate equipment.

Eventually, all cars will be connected with a combination of a broadcast and/or local network (e.g. mesh or ad-hoc) system for collision avoidance and ubiquitous Internet connections for map-based road hazards that are discovered by the vehicle. As a vehicle travels down a road and discovers an accident for example, a photograph of that accident will be stored and uploaded to the Internet for interpretation by a human operator who will then download a message based on the map location of the accident to warn other vehicles that are in the vicinity until the accident is cleared up which can be determined by another probe vehicle.

When all cars have the system, there will be much less need for surround-vehicle-monitoring except for searching for bicycles, motorcycles, pedestrians, animals, land slides, rocks, fallen trees, debris etc. All other vehicles will be properly equipped and the RtZF™ can be on special lanes that permit autonomous vehicles or at least properly equipped vehicles.

There should not be any obstacles on the highway and when one is discovered, it should be photographed and uploaded to the central station via the Internet for proper handling in terms of warnings and removal of the hazard. Until the time comes when this network is everywhere, alternate systems can partially fill in the gaps such as XM radio and other satellite-based systems. This could be used only for downloading map changes. For uploading information, the vehicles would wait, maintaining data to be sent to a database until they have a direct Internet connection.

To achieve ubiquitous Internet coverage, IEEE 802.11 or Wi-Fi stations (or WiMAX or WiMobile or equivalent) would be placed around the nation. If, for example, each station (also referred to as transmitters herein) had a radial range of 30-50 miles or more than approximately 500 to 1000 such stations could be strategically placed to provide nationwide coverage. It is anticipated that the range of such stations will be substantially increased but that the number of required stations will also increase as usage of the ubiquitous Internet, or equivalent, network also increases. In that case, private industry can be earning revenues through non-safety use access charges. An estimate of the cost of a typical station is between $10,000 and $100,000 most of which would be for the land and installation. The total cost thus would be around a maximum of $100 million which is a small fraction of the multi-billion dollar estimate by the Federal Highway Department to implement their proposed DSCR system with transceivers every 100 meters along the Federal Highway System, a system that would leave most of the nation unprotected and in general be of marginal value. There are many towers in place now for use by radio and TV stations and cellular telephones. It is expected that such towers can also be used for this ubiquitous network thus reducing the installation costs.

Such a proposed system could also broadcast a timing signal, which could be a repeat of a satellite timing signal or one derived from several GPS satellites, as well as the differential corrections to support Differential GPS (DGPS). A vehicle equipped with a processor capable of position determination would thus receive such signals from the stations, e.g., DGPS correction updates, and together with GPS information received from satellites, determine its position. It could even broadcast a GPS-type signal and thus eliminate dependence of the RtZF™ system on GPS. This might require an atomic clock which could be too expensive for this system. In other words, anyone might be able to obtain centimeter level position accuracy without GPS. This concept may require a mapping of multipath delays in some urban areas.

Such a ubiquitous Internet system could also provide continuous traffic monitoring and updates, route guidance supporting information as well as weather information, automatic collision notification, diagnostic and prognostic telematics communications to the manufacturer, dealer or repair facility etc., and in fact, all telematics transmissions would be easily achieved with such an Internet system. Biometrics information transfer is facilitated when such sensors are on the vehicle. This can be used for access to secure locations and to verify the identity of a vehicle operator. The general sending of alarms and warnings to and from the vehicle for any reason including amber alert messages is also greatly facilitated.

Looking further, ubiquitous Internet could eliminate all communication systems that are currently used in the US including radio, TV, Cellular phones, XM radio and all satellite communications that originate and end up in the continental US, telephone, OnStar® and all telematics, DSRC. Everyone could have one phone number and one phone that would work everywhere. Thus it could lead to the elimination of cellular phones as they are known today, the elimination of the wired telephone system, of television and radio stations, of cable television and Internet services, and maybe the elimination of all earth to satellite-to-Earth communications.

Other applications include remote sensing applications for home and boat security and homeland security applications, for example. Any point on the continental US would be able to communicate with the Internet. If this communication happens only occasionally, then the power can be minimal and can be boosted by some form of energy harvesting and thus such a sensor could operate from years to infinity on rechargeable batteries without a power connection. For example, all monitoring and tracking operations that require satellite communication such as disclosed in U.S. patent application Ser. No. 10/940,881 could be handled without satellite communication for the continental United States.

A significant use for such a ubiquitous network is to permit rapid and frequent upgrades to the vehicle resident map. This is particularly important for The Road to Zero Fatalities™-based systems (RtZF™). Map upgrades can include the existence of an accident, ice, poor visibility, new temporary speed limit, traffic congestion, construction, mud slide, and countless other situations that can affect the smooth passage of a vehicle on a roadway. These map upgrades can be temporary or permanent. Also for RtZF™ and other such systems relying on DGPS for their location information, the DGPS corrections can be frequently transmitted from a central station using the ubiquitous network. Similarly, should any vehicle discover that this information is faulty, or that the map is faulty for that matter, an immediate message can be sent to the appropriate central station for action to correct the error.

An entire series of telematics services can also make use of a ubiquitous network including all of the features currently using the OnStar® system. These would include concierge service, route guidance, remote door unlock, automatic crash notification, stolen vehicle tracking, and other location-based services. Other location-based services include the location of nearest facilities such as hospitals, police stations, restaurants, gas stations, vehicle dealers, service and repair facilities, the location of the nearest police officer or patrol car, the location of the nearest parking facility that has a parking space available and the location of a parking space once the driver is in the facility. The notification of a towing service, such as AAA, when that service is required can be enabled. Such information can be transmitted via the infrastructure-based transmitters.

Additional services that could be enabled by the ubiquitous network include automatic engine starting to pre-warm or pre-cool a vehicle, e-mail, voicemail, television, radio, movie and music downloads, synchronizing of the vehicle computer with a home or office or hotel/motel in room computer, text messages between vehicles or other locations for display and/or audio transmission, emergency in-vehicle signage including a terrorist attack, tornado, cyclone, hurricane, tsunami, or similar warnings, security gate and/or door opening or unlocking, automatic entrance to secured areas where both vehicle and biometric identification is required, rapid passage through borders by authorized personnel, garage door opening, turning on/off of house inside lights or outside (walk, driveway, house, etc.) lights, the ability to transmit vocal messages into a vehicle such as from a police officer or other authority figure, speed control and vehicle disabling by authorities which among other things would prevent high-speed chases as the police will have the ability to limit the speed of a vehicle or shut it down.

Other enabled services include transmission of in-car pictures especially after an accident or when the police want to know who was driving, signaling of an emergency situation such that the vehicle is given emergency vehicle priority such as one when a woman is in labor and might deliver or a person is suffering a heart attack, simultaneously the nearest hospital can be notified to expect the emergency. Additional services include control of traffic lights and an indication of the status of the traffic light, and the same for railroad crossings and the prevention of vehicles running stoplights or stop signs.

Additional enablements include emergency vehicle alert to cause people to move to the right or otherwise out of the path, automatic tolling and variable tolling, vocal communication including voice over IP calls, transmission of driver health status information (heartbeat, blood pressure, etc.), use of voice recognition or voice print for identification, transmission of various vehicle information including the vehicle identification number and transmission of the location of the vehicle to businesses and friends when authorized permitting parents to know where their children are or the authorities to know where parolees are.

Tourists can find this service particularly useful when they need only point a ranging laser at a point of interest and the GPS coordinates can then be passed to the appropriate service that can provide information about the point of interest. This can also be useful for professionals allowing them to instantly download building plans, utilities locations, sewers, etc. Additionally, any information that is available on network resident maps that is not available in the vehicle resident map can be transferred to the vehicle for informational purposes or for display or any other purpose. A key usage will be for updates to the vehicle's digital maps and perhaps the map software. Similarly, any vehicle resident software updates can take place seamlessly. Finally, if the authorized vehicle operator has in his or her possession a properly enabled cell phone or PDA or other such device, many of the features listed above become available to the user. The device can have proper security safeguards such as a biometric ID feature to prevent unauthorized use. One function would be for the user to find where he or she parked the car.

There are many innovative business opportunities that are also enabled and a few will now be discussed. A key opportunity which can enable the creation of the ubiquitous network would be a charging system whereby the users of the network can be charged a nominal fee based on bytes transferred, for example, to pay for the installation and maintenance of the equipment. Thus a business model exists where one or more companies agree to install a nationwide ubiquitous Internet service in exchange for such fees. This could be done piecemeal but after a while people will gravitate to the new, almost free, service and usage will explode. The network can of course be used to pay for tolls, fast food and countless other services including gasoline. An unlimited number or other uses will become obvious in light of the above disclosure. For example, a user can be notified by a bank or other bill paying service to obtain authorization to pay a particular bill. There will be a host of additional opportunities to land-based fixed or non-vehicle-based Internet users that are enabled by the ubiquitous network and additionally by the connection of vehicles to that network.

Many of the above services are now being enabled over other telematics networks and many more of these services can now be implemented using those networks until the ubiquitous network is fully implemented. Thus, implementation of these as yet unimplemented services using other than the ubiquitous network is contemplated herein.

Others of course have been talking about large hot spots but other than vague statements that the Internet should be everywhere, no one has provided a plan, or even a need, that would place Internet availability on all roads in the continental United States (see, e.g., H. Green "No wires, No rules" Business Week online Apr. 26, 2004). What can drive this ubiquitous concept is the safety aspect of automobiles as opposed to the commercial aspects of movie downloads etc. For commercial success, the network need not be available on every back road where as it would be required for safety purposes.

As a vehicle travels, it will pass through different cells in the ubiquitous network and control will have to pass from one cell to another. Fortunately, this is a similar problem that has been solved for cell phones and thus should not be a problem for the network. Additionally, it has already been solved by at least one group as reported in an article in Science Daily Apr. 20, 2004 "Faster Handoff Between Wi-Fi Networks Promises Near-Seamless 802.11 Roaming".

9.3 Electronic Local and Emergency Communication from Infrastructure

There are many instances where it can be desirable for the local infrastructure to communicate with vehicles in the vicinity. In one case, it might be desirable for a local stop light to determine from such communication that there are some vehicles approaching an intersection from the North but none from the East or West. In such a situation, the stoplight can become or remain green for the North-South traffic making it unnecessary for such traffic to stop (see, e.g., P. Ball "Beating the Lights", Nature News, Apr. 12, 2003 where majority rule can control stop lights).

In another situation, a temporary road sign can send an electronic message to vehicles approaching a construction zone to slow down and be prepared to stop. Back to the stoplight, in an Associated Press article "Cameras catch thousands going through red lights", Jul. 22, 2005, it is reported that in two towns in Maine, "Cameras recorded nearly 5,000 motorists running red lights at five intersections in Auburn and Lewiston in a test program on whether cameras are an effective way to curb traffic violations". A communication system from the stoplight to the vehicles can warn the driver if he or she is going too fast and even cause the vehicle to slow and even stop if the warning is ignored. In fact, the stoplight-to-vehicle communication system can even inform the driver as to how much time remains before the light is going to change.

In still another situation, reflectors along the highway or even on other vehicles can be designed to transmit some minimal information through the pattern of light that is reflected.

9.4 Precise Positioning without GPS

Use of MIR or the reflection from fiduciary points along the roadway providing such objects are on the vehicle resident maps is disclosed in the above-referenced patents to ITI and herein. An interesting variation of this concept can be accomplished using some of the ideas disclosed in Fullerton et al. (U.S. Pat. No. 6,774,846). For this implementation, one approach is to have each vehicle transmit a coded signal either using the methods of the '846 patent or a CDMA or other approach that would be consistent with the vehicle-to-vehicle communication approach described above. The vehicle would transmit such a signal which would then cause the infrastructure-resident station to synchronize its clock with the received train of pulses, or other coded signal, and return it to the sending vehicle. That vehicle would then determine the time delay between its repeating sent code and the received code to determine the distance to the infrastructure-resident station. If three such stations respond, then the vehicle can determine its exact location to centimeter accuracy. If two respond and the vehicle has the exact location of the two stations on its map, then through multiple transmissions, the vehicle can also determine its exact location.

This system can also be used to determine the relative location of two vehicles. Furthermore, if one vehicle has recently had its position updated by such a method, it can determine the GPS corrections and transmit them to vehicles in the vicinity as discussed elsewhere herein. This also solves the atomic clock problem that was apparent in the Lemelson '500 patent discussed above. By this method, absolute time is not required. Thus, by using this method, the Lemelson pseudolites become feasible.

9.5 DGPS Corrections from Infrastructure

Discussed above are many methods of obtaining the DGPS corrections from an infrastructure-resident station. These corrections can be passed from vehicle to vehicle or from a local station to one or more vehicles providing a local area differential GPS system alone with the possibility of kinematic GPS. Alternately, when such a local differential station is not available, a wide area differential GPS set of corrections can be obtained from the ubiquitous network. Such corrections can be obtained from looking at the corrections at several stations around the continental United States and creating a map of the atmospheric diffraction caused delays for the entire country. Local area DGPS provides the possibility for accuracies of approximately 2 cm (1 sigma) or less while wide area DGPS is closer to 10 cm.

9.6 Route Guidance

The determination of a route that a vehicle should take to go from its present location to its destination can be accomplished using a vehicle-resident system. A central server can be used to derive the GPS coordinates of the destination if it is not known based on its address, phone number or other identifying information. Once the route has been selected, the network can be checked to see if there is any congestion, tie-ups or other problems along the route and if so, then the driver can be asked as to whether the system should choose an alternate route and the process repeated.

9.7 Display of Pictures

Many times a picture can replace countless words in describing to a driver the destination. Also, pictures can be valuable if the vehicle driver is a tourist and would like to know about points of interest that he or she is passing. Additionally, a picture can be of value for assessing the seriousness of congestion ahead or any other anomaly that might cause the driver to wish to take another route. Such pictures can come from traffic helicopters or other cameras that have a view of the road, satellites or Google Earth or equivalent. These pictures can be displayed on any convenient display including a head-up display and if the vehicle has an occupant position sensor, so that the position of the eyes of the occupant can be found, then the picture can be displayed on the windshield at the proper location in the driver's field of view.

9.8 In-Vehicle Signage

As discussed above, the ability to send text messages to and from a vehicle can be important in making the driver's time more efficient. This is particularly useful for truck drivers, salesmen and others that spend a great deal of time on the road as part of their business. Such messages can inform the driver of a canceled or changed meeting, key news events that can affect the driver etc. Such text messages are less distracting than phone calls since the messages can be transmitted anytime and read when convenient. They can also be used to send emergency messages to all vehicles in the area telling them that the road ahead has turned icy, for example.

A key use for in vehicle signage is to allow the driver to see a sign that he or she may have missed due to a blocking truck, fog or for any other reason. At will, the driver can scroll forward or backward to read signs that are upcoming or that he or she has passed. Signs can also be translated into any language where that might be desirable for travelers in countries where their language skills are poor.

9.9 Network is the Computer

One serious problem with vehicles is that they last a long time, typically 10 or more years before they are retired from use. Computer hardware and software, on the other hand, is continuously changing and this rate of change is thought to be exponential. A vehicle that is 10 years old certainly will not have hardware that is capable of processing recently developed programs. One solution is to adopt the Cisco Corporation approach that "the network is the computer". Although this concept is slow to be adopted by businesses and individual computer users, it does make sense for automobiles and other vehicles providing the network is ubiquitous and reliable. This then is another argument for the ubiquitous broadband network discussed above. Thus, any and every vehicle would have the equivalent of the latest hardware and software for the payment of a subscription, for example. This would provide recurring revenues for businesses that created and maintained such hardware and software. The pull factor that would encourage people to subscribe to the service would be that they would be permitted to travel on safe high speed lanes. Cars that failed to maintain their subscriptions would be forced to use either vehicle resident or early versions of the software and hardware and would not be permitted to travel on safe, high speed roads.

9.10 Summary

Figure 27:
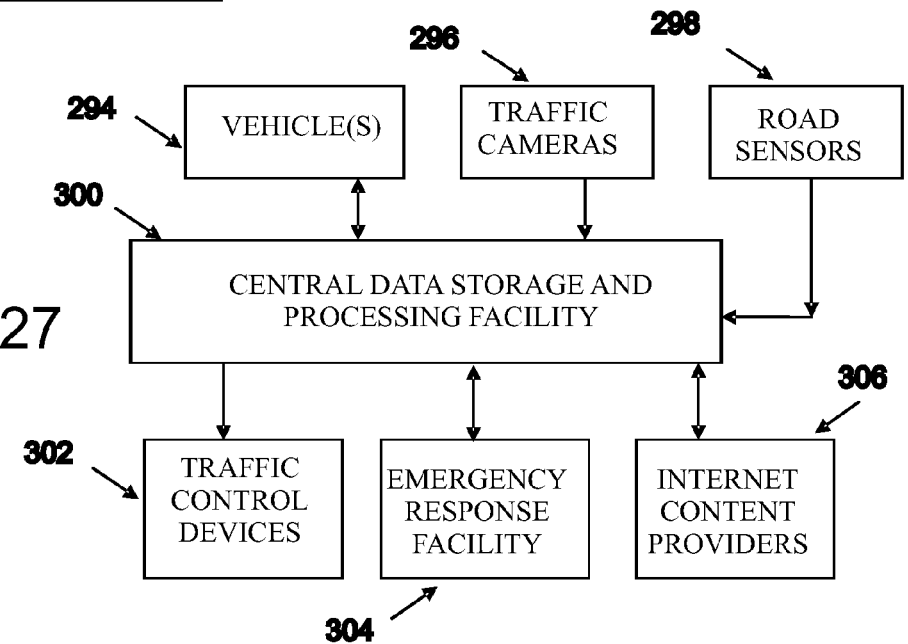
FIG. 27 is a schematic of a ubiquitous communication system in accordance with the invention.

To summarize the foregoing description of a new method for transmitting information to a host vehicle traveling on a road, 9 shows a schematic of the flow of data. Information to be wirelessly transmitted, preferably via a ubiquitous network, to an information receiving system resident on the "host" vehicle 294 during travel of the vehicle 294 is generated by one or more information sources which include "probe" vehicles 294, traffic cameras 296 and road sensors 298. The probe vehicles 294 provide information about one or more roads on which the host vehicle will travel or is expected to travel at some time in the future, the difference being if the road the vehicle expects to travel on is congested, the driver of the host vehicle can take an alternative route. Other sources of information include data channels which weather information, i.e., meteorological reports, and traffic information such as that provided by highway, bridge and tunnel operators and municipalities. It is important to note that the host vehicle can also be a probe vehicle, in that information it obtains can be used for transmission to vehicles behind it on the same path, and that a probe vehicle can be a host vehicle in that information it receives was obtained by vehicle in front of it on the same path. As such, FIG. 27 shows element 294 designated as vehicles.

This information is sent from the various sources, preferably over a ubiquitous network, and is gathered in a central data storage, monitoring and/or processing facility 300, e.g., a network server or mainframe computer, which may entail directing the information sources to respond to inquiries for information from the data facility or programming the information sources to automatically provide the information at set times. The probe vehicles 294 can also continually provide information limited only by the components of the transmission unit thereon. The data facility 300 can also be programmed to automatically access data channels on a regular basis to obtain current information about roads and weather. Although the data facility 300 gathers a large amount of information, not all of the information will be directed to the vehicle 294, i.e., only potential relevant information will be considered for each vehicle 294 in communication with the data facility 300. Thus, different subsets of the total available information will be generated for each host vehicle 294.

The data facility 300 includes software and hardware components which enables it to prioritize the information to distinguish between high priority, time-critical information of immediate relevance to operation of the host vehicle 294 and low priority, non-time-critical information of non-immediate relevance to the operation of the host vehicle 294. It can thus be programmed to control and communicate with the information receiving system to cause it to receive and process high priority information before low priority information, the transmission of both of which are directed by the data facility 300. Prioritization can be established based on the current position of the host vehicle 294.

Data facility 300 can be programmed to maintain a map of roads resident in host vehicles by transmitting map updates necessary for the maps to be current, the map updates being generated based on the gathered information. If a temporary map update is created based on a change in the operability or functionality of a road, e.g., based on a traffic accident, the data facility 300 is programmed to continuously monitor the change to determine when the use of the road reverts to a state preceding the change. When this happens, notification of this reversion is transmitted to the host vehicle, e.g., via another map update.

Data facility 300 communicates with traffic control devices 302 via the ubiquitous network of transceivers. It can thus analyze vehicular traffic and control the traffic control devices based on the vehicular traffic, e.g., regulate the pattern of green lights to optimize traffic, eliminate traffic jams and expedite emergency response vehicles.

Data facility 300 also communicates with an emergency response facility 304 to direct aid to a host vehicle when necessary or to the site of an accident as determined by the information gathered from the sources thereof.

Data facility 300 also communications with Internet content providers 306 to allow the occupants of host vehicles to request Internet content over the ubiquitous network.

It should be understood that the transmission of information between vehicles is one exemplifying use of the invention which also encompasses generating information from other types of mobile units, transmitting the information to a common monitoring station, generating at the monitoring station an update for, e.g., a map, based on the transmitted information, and then transmitting the update to each of the mobile units.

10. The RtZF™ System 10.1 Technical Issues

From the above discussion, two conclusions should be evident. There are significant advantages in accurately knowing where the vehicle, the roadway and other vehicles are and that possession of this information is the key to reducing fatalities to zero. Second, there are many technologies that are already in existence that can provide this information to each vehicle. Once there is a clear recognized direction that this is the solution then many new technologies will emerge. There is nothing inherently expensive about these technologies and once the product life cycle is underway, the added cost to vehicle purchasers will be minimal. Roadway infrastructure costs will be minimal and system maintenance costs almost non-existent.

Most importantly, the system has the capability of reducing fatalities to zero!

The accuracy of DGPS has been demonstrated numerous times in small controlled experiments, most recently by the University of Minnesota and SRI.

The second technical problem is the integrity of the signals being received and the major cause of the lack of integrity is the multi-path effect. Considerable research has gone into solving the multi-path effect and Trimble, for example, claims that this problem is no longer an issue.

The third area is availability of GPS and DGPS signals to the vehicle as it is driving down the road. The system is designed to tolerate temporary losses of signal, up to a few minutes. That is the prime function of the inertial navigation system (INS or IMU). Prolonged absence of the GPS signal will significantly degrade system performance. There are two primary causes of lack of availability, namely, temporary causes and permanent causes. Temporary causes result from a car driving between two trucks for an extended period of time, blocking the GPS signals. The eventual solution to this problem is to change the laws to prevent trucks from traveling on both sides of an automobile. If this remains a problem, a warning will be provided to the driver that he/she is losing system integrity and therefore he/she should speed up or slow down to regain a satellite view. This could also be done automatically. Additionally, the vehicle can obtain its location information through vehicle-to-vehicle communication plus a ranging system so that if the vehicle learns the exact location of the adjacent vehicle and its relative location, then it can determine its absolute location. If the precise positioning system is able to interrogate the environment, then the problem is also solved via the PPS system.

Permanent blockage of the GPS signals, as can come from operating the vehicle in a tunnel or a downtown area of a large city, can be corrected through the use of pseudolites or other guidance systems such as the SnapTrack system or the PPS described here. This is not a serious problem since very few cars run off the road in a tunnel or in downtown areas. Eventually, it is expected that the PPS will become ubiquitous thereby rendering GPS as the backup system. Additional methods for location determine to aid in reacquiring the satellite lock include various methods based on cell phones and other satellite systems such as the Skybitz system that can locate a device with minimal information.

The final technical impediment is the operation of the diagnostic system that verifies that the system is operating properly. This requires an extensive failure mode and effect analysis and the design of a diagnostic system that answers all of the concerns of the FMEA.

10.2 Cost Issues

The primary cost impediment is the cost of the DGPS hardware. A single base station and roving receiver that will give an accuracy of about 2 centimeters (1 σ) currently costs about $25,000. This is a temporary situation brought about by low sales volume. Since there is nothing exotic in the receiving unit, the cost can be expected to follow typical automotive electronic life-cycle costs and therefore the projected high volume production cost of the electronics for the DGPS receivers is below $100 per vehicle. In the initial implementation of the system, an OmniSTAR® DGPS system will be used providing an accuracy of about 6 cm. The U.S. national DGPS system is now coming on line and thus the cost of the DGPS corrections will soon approach zero.

A similar argument can be made for the inertial navigation system. Considerable research and development effort is ongoing to reduce the size, complexity and cost of these systems. Three technologies are vying for this rapidly growing market: laser gyroscopes, fiber-optic lasers, and MEMS systems. The cost of these units today range from a few hundred to ten thousand dollars each, however, once again this is due to the very small quantity being sold. Substantial improvements are being made in the accuracies of the MEMS systems and it now appears that such a system will be accurate enough for RtZF™ purposes. The cost of these systems in high-volume production is expected to be on the order of ten dollars each. This includes at least a yaw rate sensor with three accelerometers and probably three angular rate sensors. The accuracy of these units is currently approximately 0.003 degrees per second. This is a random error which can be corrected somewhat by the use of multiple vibrating elements. A new laser gyroscope has recently been announced by Intellisense Corporation which should provide a dramatic cost reduction and accuracy improvement.

One of the problems keeping the costs high is the need in the case of MEMS sensors to go through an extensive calibration process where the effects of all influences such as temperature, pressure, vibration, and age is determined and a constitute equation is derived for each device. A key factor in the system of the inventions here is that this extensive calibration process is eliminated and the error corrections for the IMU are determined after it is mounted on the vehicle through the use of a Kalman filter, or equivalent, coupled with input from the GPS and DGPS system and the precise positioning system. Other available sensors are also used depending on the system. These include a device for measuring the downward direction of the earth's magnetic field, a flux gage compass, a magnetic compass, a gravity sensor, the vehicle speedometer and odometer, the ABS sensors including wheel speed sensors, and whatever additional appropriate sensors that are available. Over time, the system can learn of the properties of each component that makes up the IMU and derive the constituent equation for that component which, although will have little effect on the instantaneous accuracy of the component, it will affect the long term accuracy and speed up the calculations.

Eventually, when most vehicles on the road have the RtZF™ system, communication between the vehicles can be used to substantially improve the location accuracy of each vehicle as described above.

The cost of mapping the CONUS is largely an unknown at this time. OmniSTAR® has stated that they will map any area with sufficient detail at a cost of $300 per mile. They have also indicated the cost will drop substantially as the number of miles to be mapped increases. This mapping would be done by helicopter using cameras and their laser ranging system. Another method is to outfit a ground vehicle with equipment that will determine the location of the lane and shoulder boundaries of road and other information. Such a system has been used for mapping a Swedish highway. One estimate is that the mapping of a road will be reduced to approximately $50 per mile for major highways and rural roads and a somewhat higher number for urban areas. The goal is to map the country to an accuracy of about 2 to 10 centimeters (1σ).

Related to the costs of mapping is the cost of converting the raw data acquired either by helicopter or by ground vehicle into a usable map database. The cost for manually performing this vectorization process has been estimated at $100 per mile by OmniSTAR®. This process can be substantially simplified through the use of raster-to-vector conversion software. Such software is currently being used for converting hand drawings into CAD systems, for example. The Intergraph Corp. provides hardware and software for simplifying this task. It is therefore expected that the cost for vectorization of the map data will follow proportionately a similar path to the cost of acquiring the data and may eventually reach $10 to $20 per mile for the rural mapping and $25 to a $50 per mile for urban areas. Considering that there are approximately four million miles of roads in the CONUS, and assuming we can achieve an average of $150 for acquiring the data and converting the data to a GIS database can be achieved, the total cost for mapping all of the roads in U.S. will amount to $600 million. This cost would obviously be spread over a number of years and thus the cost per year is manageable and small in comparison to the $215 billion lost every year due to death, injury and lost time from traffic congestion.

Another cost factor is the lack of DGPS base stations. The initial analysis indicated that this would be a serious problem as using the latest DGPS technology requires a base station every 30 miles. Upon further research, however, it has been determined that the OmniSTAR® company has now deployed a nationwide WADGPS system with 6 cm accuracy. The initial goal of the RtZF™ system was to achieve 2 cm accuracy for both mapping and vehicle location. The 2 cm accuracy can be obtained in the map database since temporary differential base stations will be installed for the mapping purposes. By relaxing the 2 cm requirement to 6 cm, the need for base stations every 30 miles disappears and the cost of adding a substantial number of base stations is no longer a factor.

The next impediment is the lack of a system for determining when changes are planned for the mapped roads. This will require communication with all highway and road maintenance organizations in the mapped area.

A similar impediment to the widespread implementation of this RtZF™ system is the lack of a communication system for supplying map changes to the equipped vehicles.

10.3 Educational Issues

A serious impediment to the implementation of this system that is related to the general lack of familiarity with the system, is the belief that significant fatalities and injuries on U.S. highways are a fact of life. This argument is presented in many forms such as "the perfect is the enemy of the good".

This leads to the conclusion that any system that portends to reduce injury should be implemented rather than taking the viewpoint that driving an automobile is a process and as such it can be designed to achieve perfection. As soon as it is admitted that perfection cannot be achieved, then any fatality gets immediately associated with this fact. This of course was the prevailing view among all manufacturing executives until the zero defects paradigm shift took place. The goal of the "Zero Fatalities"™ program is not going to be achieved in a short period of time. Nevertheless, to plan anything short of zero fatalities is to admit defeat and to thereby allow technologies to enter the market that are inconsistent with a zero fatalities goal.

10.4 Potential Benefits when the System is Deployed 10.4.1 Assumptions for the Application Benefits Analysis The high volume incremental cost of an automobile will be $200.

The cost of DGPS correction signals will be a onetime charge of $50 per vehicle.

The benefits to the vehicle owner from up-to-date maps and to the purveyors of services located on these maps. will cover the cost of updating the maps as the roads change.

The cost of mapping substantially all roads in the CONUS will be $600 million.

The effects of phasing in the system will be ignored.

There are 15 million vehicles sold in the U.S. each year.

Of the 40,000 plus people killed on the roadways, at least 10% are due to road departure, yellow line infraction, stop sign infraction, excessive speed and other causes which will be eliminated by the Phase Zero deployment.

$165 billion are lost each year due to highway accidents.

The cost savings due to secondary benefits will be ignored.

10.4.2 Analysis Methods Described.

The analysis method will be quite simple. Assume that 10% of the vehicles on the road will be equipped with RtZF™ systems in the first year and that this will increase by 10 percent each year. Ten percent or 4000 lives will be saved and a comparable percentage of injuries. Thus, in the first year, one percent of $165 billion dollars will be saved or $1.65 billion. In the second year, this saving will be $3.3 billion and the third year $4.95 billion. The first-year cost of implementation of the system will be $600 million for mapping and $3.75 billion for installation onto vehicles. The first year cost therefore will be $4.35 billion and the cost for the second and continuing years will be $3.75 billion. Thus, by the third year, the benefits exceed the costs and by the 10th year, the benefits will reach $16.5 billion compared with costs of $3.75 billion, yielding a benefits to cost ratio of more than 4.

Before the fifth year of deployment, it is expected that other parts of the RtZF™ system will begin to be deployed and that the benefits therefore are substantially understated. It is also believed that the $250 price for the Phase Zero system on a long-term basis is high and it is expected that the price to drop substantially. No attempt has been made to estimate the value of the time saved in congestion or efficient operation of the highway system. Estimates that have been presented by others indicate that as much as a two to three times improvement in traffic through flow is possible. Thus, a substantial portion of the $50 billion per year lost in congestion delays will also be saved when the full RtZF™ system is implemented.

It is also believed that the percentage reduction of fatalities and injuries has been substantially understated. For the first time, there will be some control over the drunk or otherwise incapacitated driver. If the excessive speed feature is implemented, then gradually the cost of enforcing the nation's speed limits will begin to be substantially reduced. Since it is expected that large trucks will be among first vehicles to be totally covered with the system, perhaps on a retrofit basis, it is expected that the benefits to commercial vehicle owners and operators will be substantial. The retrofit market may rapidly develop and the assumptions of vehicles with deployed systems may be low. None of these effects have been taken into account in the above analysis.

The automated highway systems resulting from RtZF™ implementation are expected to double or even triple in effective capacity by increasing speeds and shortening distances between vehicles. Thus, the effect on highway construction cost could be significant.

10.5 Initial System Deployment

The initial implementation of the RtZF™ system would include the following services:

1. A warning is issued to the driver when the driver is about to depart from the road.

2. A warning is issued to the driver when the driver is about to cross a yellow line or other lane boundary.

3. A warning is provided to the driver when the driver is exceeding a safe speed limit for the road geometry.

4. A warning is provided to the driver when the driver is about to go through a stop sign without stopping.

5. A warning is provided to the driver when the driver is about to run the risk of a rollover.

6. A warning will be issued prior to a rear end impact by the equipped vehicle.

7. In-vehicle signage will be provided for highway signs (perhaps with a multiple language option).

8. A recording will be logged whenever a warning is issued.

10.6 Other Uses

The RtZF™ system can replace vehicle crash and rollover sensors for airbag deployment and other sensors now on or being considered for automobile vehicles including pitch, roll and yaw sensors. This information is available from the IMU and is far more accurate than these other sensors. It can also be found by using carrier phase GPS by adding more antennas to the vehicle. Additionally, once the system is in place for land vehicles, there will be many other applications such as surveying, vehicle tracking and aircraft landing which will benefit from the technology and infrastructure improvements. The automobile safety issue and ITS will result in the implementation of a national system which provides any user with low cost equipment the ability to know precisely where he is within centimeters on the face of the earth. Many other applications will undoubtedly follow.

10.7 Road Departure

Figure 4:
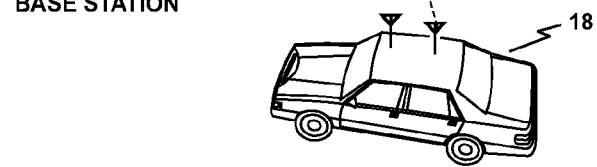
FIG. 4 is a logic diagram showing the combination of the GPS system and an inertial navigation system.
Figure 4:
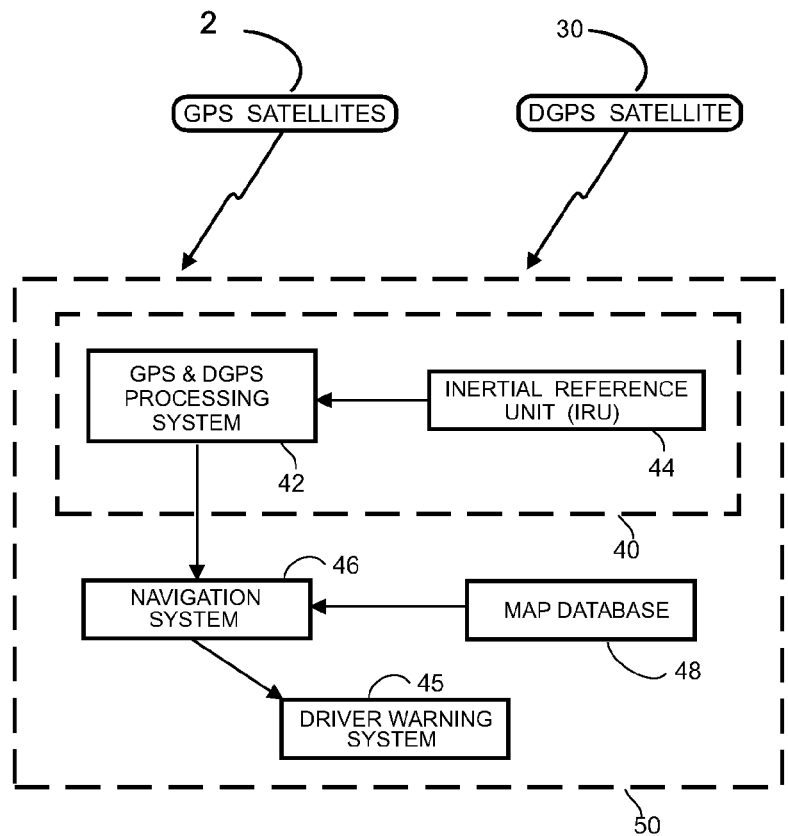

FIG. 4 is a logic diagram of the system 50 in accordance with the invention showing the combination 40 of the GPS and DGPS processing systems 42 and an inertial reference unit (IRU) or inertial navigation system (INS) or Inertial Measurement Unit (IMU) 44. The GPS system includes a unit for processing the received information from the satellites 2 of the GPS satellite system, the information from the satellites 30 of the DGPS system and data from the inertial reference unit 44. The inertial reference unit 44 contains accelerometers and laser or MEMS gyroscopes.

The system shown in FIG. 4 is a minimal RtZF™ system that can be used to prevent road departure, lane crossing and intersection accidents, which together account for more than about 50% of the fatal accidents in the U.S.

Map database 48 works in conjunction with a navigation system 46 to provide a warning to the driver when he or she is about to run off the road, cross a center (yellow) line, run a stop sign, or run a red stoplight. The map database 48 contains a map of the roadway to an accuracy of 2 cm (1 σ), i.e., data on the edges of the lanes of the roadway and the edges of the roadway, and the location of all stop signs and stoplights and other traffic control devices such as other types of road signs. Another sensor, not shown, provides input to the vehicle indicating that an approaching stoplight is red, yellow or green. Navigation system 46 is coupled to the GPS and DGPS processing system 42. For this simple system, the driver is warned if any of the above events is detected by a driver warning system 45 coupled to the navigation system 46. The driver warning system 45 can be an alarm, light, buzzer or other audible noise, or, preferably, a simulated rumble strip for yellow line and "running off of road" situations and a combined light and alarm for the stop sign and stoplight infractions.

10.8 Accident Avoidance

Figure 5:
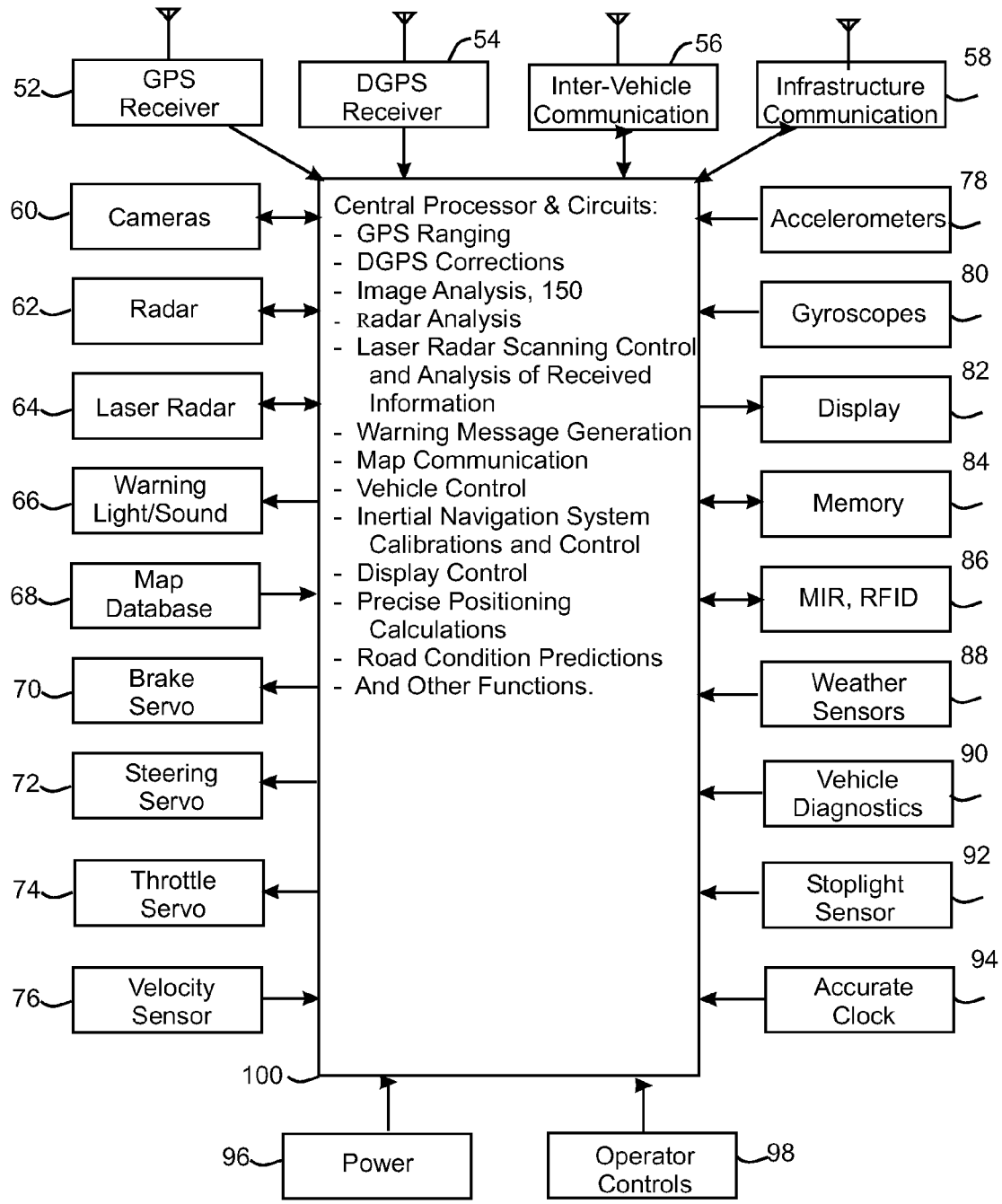
FIG. 5 is a block diagram of the overall vehicle accident avoidance, warning, and control system and method of the present invention illustrating system sensors, radio transceivers, computers, displays, input/output devices and other key elements.

FIG. 5 is a block diagram of the more advanced accident avoidance system of this invention and method of the present invention illustrating system sensors, transceivers, computers, displays, input and output devices and other key elements.

As illustrated in FIG. 5, the vehicle accident avoidance system is implemented using a variety of microprocessors and electronic circuits 100 to interconnect and route various signals between and among the illustrated subsystems. GPS receiver 52 is used to receive GPS radio signals as illustrated in FIG. 1. DGPS receiver 54 receives the differential correction signals from one or more base stations either directly or via a geocentric stationary or LEO satellite, an earth-based station or other means. Inter-vehicle communication subsystem 56 is used to transmit and receive information between various nearby vehicles. This communication will in general take place via broadband or ultra-broadband communication techniques, or on dedicated frequency radio channels, or in a preferred mode, noise communication system as described above. This communication may be implemented using multiple access communication methods including frequency division multiple access (FDMA), timed division multiple access (TDMA), or code division multiple access (CDMA), or noise communication system, in a manner to permit simultaneous communication with and between vehicles. Other forms of communication between vehicles are possible such as through the Internet. This communication may include such information as the precise location of a vehicle, the latest received signals from the GPS satellites in view, other road condition information, emergency signals, hazard warnings, vehicle velocity and intended path, and any other information which is useful to improve the safety of the vehicle road system.

Infrastructure communication system 58 permits bi-directional communication between the host vehicle and the infrastructure and includes such information transfer as updates to the digital maps, weather information, road condition information, hazard information, congestion information, temporary signs and warnings, and any other information which can improve the safety of the vehicle highway system.

Cameras 60 are used generally for interrogating environment nearby the host vehicle for such functions as blind spot monitoring, backup warnings, anticipatory crash sensing, visibility determination, lane following, and any other visual information which is desirable for improving the safety of the vehicle highway system. Generally, the cameras will be sensitive to infrared and/or visible light, however, in some cases a passive infrared camera will the used to detect the presence of animate bodies such as deer or people on the roadway in front of the vehicle. Frequently, infrared or visible illumination will be provided by the host vehicle.

Radar 62 is primarily used to scan an environment close to and further from the vehicle than the range of the cameras and to provide an initial warning of potential obstacles in the path of the vehicle. The radar 62 can also be used when conditions of a reduced visibility are present to provide advance warning to the vehicle of obstacles hidden by rain, fog, snow etc. Pulsed, continuous wave, noise or micropower impulse radar systems can be used as appropriate. Also, Doppler radar principles can be used to determine the object to host vehicle relative velocity.

Laser or terahertz radar 64 is primarily used to illuminate potential hazardous objects in the path of the vehicle. Since the vehicle will be operating on accurate mapped roads, the precise location of objects discovered by the radar or camera systems can be determined using range gating and scanning laser radar as described above or by phase techniques.

The driver warning system 66 provides visual and/or audible warning messages to the driver or others that a hazard exists. In addition to activating a warning system within the vehicle, this system can activate sound and/or light systems to warn other people, animals, or vehicles of a pending hazardous condition. In such cases, the warning system could activate the vehicle headlights, tail lights, horn and/or the vehicle-to-vehicle, Internet or infrastructure communication system to inform other vehicles, a traffic control station or other base station. This system will be important during the early stages of implementation of RtZF™, however as more and more vehicles are equipped with the system, there will be less need to warn the driver or others of potential problems.

Map database subsystem 68, which could reside on an external memory module, will contain all of the map information such as road edges up to 2 cm accuracy, the locations of stop signs, stoplights, lane markers etc. as described in detail above. The fundamental map data can be organized on read-only magnetic or optical memory with a read/write associated memory for storing map update information. Alternatively, the map information can be stored on rewritable media that can be updated with information from the infrastructure communication subsystem 58. This updating can take place while the vehicle is being operated or, alternatively, while the vehicle is parked in a garage or on the street.

Three servos are provided for controlling the vehicle during the later stages of implementation of the RtZF™ product and include a brake servo 70, a steering servo 72, and a throttle servo 74. The vehicle can be controlled using deterministic, fuzzy logic, neural network or, preferably, neural-fuzzy algorithms.

As a check on the inertial system, a velocity sensor 76 based on a wheel speed sensor, or ground speed monitoring system using lasers, radar or ultrasonics, for example, can be provided for the system. A radar velocity meter is a device which transmits a noise modulated radar pulse toward the ground at an angle to the vertical and measures the Doppler velocity of the returned signal to provide an accurate measure of the vehicle velocity relative to the ground. Another radar device can be designed which measures the displacement of the vehicle. Other modulation techniques and other radar systems can be used to achieve similar results. Other systems are preferably used for this purpose such as the GPS/DGPS or precise position systems.

The inertial navigation system (INS), sometimes called the inertial reference unit or IRU, comprises one or more accelerometers 78 and one or more gyroscopes 80. Usually, three accelerometers would be required to provide the vehicle acceleration in the latitude, longitude and vertical directions and three gyroscopes would be required to provide the angular rate about the pitch, yaw and roll axes. In general, a gyroscope would measure the angular rate or angular velocity. Angular acceleration may be obtained by differentiating the angular rate.

A gyroscope 80, as used herein in the IRU, includes all kinds of gyroscopes such as MEMS-based gyroscopes, fiber optic gyroscopes (FOG) and accelerometer-based gyroscopes.

Accelerometer-based gyroscopes encompass a situation where two accelerometers are placed apart and the difference in the acceleration is used to determine angular acceleration and a situation where an accelerometer is placed on a vibrating structure and the Coriolis effect is used to obtain the angular velocity.

The possibility of an accelerometer-based gyroscope 80 in the IRU is made possible by construction of a suitable gyroscope by Interstate Electronics Corporation (IEC). IEC manufactures IMUs in volume based on μSCIRAS (micromachined Silicon Coriolis Inertial Rate and Acceleration Sensor) accelerometers. Detailed information about this device can be found at the IEC website.

There are two ways to measure angular velocity (acceleration) using accelerometers. The first way involves installing the accelerometers at a distance from one another and calculating the angular velocity by the difference of readings of the accelerometers using dependencies between the centrifugal and tangential accelerations and the angular velocity/acceleration. This way requires significant accuracy of the accelerometers.

The second way is based on the measurement of the Coriolis acceleration that arises when the mass of the sensing element moves at a relative linear speed and the whole device performs a transportation rotation about the perpendicular axis. This principle is a basis of all mechanical gyroscopes, including micromachined ones. The difference of this device is that the micromachined devices aggregate the linear oscillation excitation system and the Coriolis acceleration measurement system, while two separate devices are used in the proposed second method. The source of linear oscillations is the mechanical vibration suspension, and the Coriolis acceleration sensors are the micromachined accelerometers. On one hand, the presence of two separate devices makes the instrument bigger, but on the other hand, it enables the use of more accurate sensors to measure the Coriolis acceleration. In particular, compensating accelerometer systems could be used which are more accurate by an order of magnitude than open structures commonly used in micromachined gyroscopes.

Significant issues involved in the construction of an accelerometer-based gyroscope are providing a high sensitivity of the device, a system for measuring the suspension vibration, separating the signals of angular speed and linear acceleration; filtering noise in the output signals of the device at the suspension frequency, providing a correlation between errors in the channels of angular speed and linear acceleration, considering the effect of nonlinearity of the accelerometers and the suspension on the error of the output signals.

A typical MEMS-based gyroscope uses a quartz tuning fork. The vibration of the tuning fork, along with applied angular rotation (yaw rate of the car), creates Coriolis acceleration on the tuning fork. An accelerometer or strain gage attached to the tuning fork measures the minute Coriolis force. Signal output is proportional to the size of the tuning fork. To generate enough output signal, the tuning fork must vibrate forcefully. Often, this can be accomplished with a high Q structure. Manufacturers often place the tuning fork in a vacuum to minimize mechanical damping by air around the tuning fork. High Q structures can be fairly fragile.

The gyroscope often experiences shock and vibration because it must be rigidly connected to the car to accurately measure yaw rate. This mechanical noise can introduce signals to the Coriolis pick-off accelerometer that is several orders of magnitude higher than the tuning-fork-generated Coriolis signal. Separating the signal from the noise is not easy. Often, the shock or vibration saturates the circuitry and makes the gyroscope output unreliable for a short time.

Conventional MEMS-based gyroscopes are usually bulky (100 $cm^3$ or more is not uncommon). This is partly the result of the addition of mechanical antivibration mounts, which are incorporated to minimize sensitivity to external vibration.

New MEMS-based gyroscopes avoid these shortcomings, though. For example, Analog Devices' iMEMS gyro is expected to be 7 by 7 by 3 mm (0.15 $cm^3$). Rather than quartz, it uses a resonating polysilicon beam structure, which creates the velocity element that produces the Coriolis force when angular rate is presented to it. At the outer edges of the polysilicon beam, orthogonal to the resonating motion, a capacitive accelerometer measures the Coriolis force. The gyroscope has two sets of beams in antiphase that are placed next to each other, and their outputs are read differentially, attenuating external vibration sensitivity.

An accelerometer 78, as used herein in the IRU, includes conventional piezoelectric-based accelerometers, MEMS-based accelerometers (such as made by Analog Devices) and the type as described in U.S. Pat. No. 6,182,509 entitled "Accelerometer without proof mass".

Display subsystem 82 includes an appropriate display driver and either a heads-up or other display system for providing system information to the vehicle operator. The information can be in the form of non-critical information such as the location of the vehicle on a map, as selected by the vehicle operator and/or it can include warning or other emergency messages provided by the vehicle subsystems or from communication with other vehicles or the infrastructure. An emergency message that the road has been washed out ahead, for example, would be an example of such a message.

Generally, the display will make use of icons when the position of the host vehicle relative to obstacles or other vehicles is displayed. Occasionally, as the image can be displayed especially when the object cannot be identified.

A general memory unit 84 which can comprise read-only memory or random access memory or any combination thereof, is shown. This memory module, which can be either located at one place or distributed throughout the system, supplies the information storage capability for the system.

For advanced RtZF™ systems containing the precise positioning capability, subsystem 86 provides the capability of sending and receiving information to infrastructure-based precise positioning tags or devices which may be based on noise or micropower impulse radar technology, radar reflector or RFIR technology or equivalent. Once again the PPS system can also be based on a signature analysis using the adaptive associative memory technology or equivalent.

In some locations where weather conditions can deteriorate and degrade road surface conditions, various infrastructure-based sensors can be placed either in or adjacent to the road surface. Subsystem 88 is designed to interrogate and obtained information from such road-based systems. An example of such a system would be an RFID tag containing a temperature sensor. This device may be battery-powered or, preferably, would receive its power from the vehicle-mounted interrogator, or other host vehicle-mounted source, as the vehicle passes nearby the device. In this manner, the vehicle can obtain the temperature of the road surface and receive advanced warning when the temperature is approaching conditions which could cause icing of the roadway, for example. An RFID based on a surface acoustic wave (SAW) device is one preferred example of such a sensor, see U.S. Pat. No.

6,662,642. An infrared sensor on the vehicle can also be used to determine the road temperature and the existence of ice or snow.

In order to completely eliminate automobile accidents, a diagnostic system is required on the vehicle that will provide advanced warning of any potential vehicle component failures. Such a system is described in U.S. Pat. No. 5,809,437 (Breed).

For some implementations of the RtZF™ system, stoplights will be fitted with transmitters which will broadcast a signal when the light is red. Such a system could make use of the vehicle noise communication system as described above. This signal can be then received by a vehicle that is approaching the stoplight provided that vehicle has the proper sensor as shown as 92. Alternatively, a camera can be aimed in the direction of stoplights and, since the existence of the stoplight will be known by the system, as it will have been recorded on the map, the vehicle will know when to look for a stoplight and determine the color of the light.

An alternative idea is for the vehicle to broadcast a signal to the stoplight if, via a camera or other means, it determines that the light is red. If there are no vehicles coming from the other direction, the light can change permitting the vehicle to proceed without stopping. Similarly, if the stoplight has a camera, it can look in all directions and control the light color depending on the number of vehicles approaching from each direction. A system of phasing vehicles can also be devised whereby the speed of approaching vehicles is controlled so that they interleave through the intersection and the stoplight may not be necessary.

Although atomic clocks are probably too expensive to the deployed on automobiles, nevertheless there has been significant advances recently in the accuracy of clocks to the extent that it is now feasible to place a reasonably accurate clock as a subsystem 94 to this system. Since the clock can be recalibrated from each DGPS transmission, the clock drift can be accurately measured and used to predict the precise time even though the clock by itself may be incapable of doing so. To the extent that the vehicle contains an accurate time source, the satellites in view requirement can temporarily drop from 4 to 3. An accurate clock also facilitates the carrier phase DGPS implementations of the system as discussed above. Additionally, as long as a vehicle knows approximately where it is on the roadway, it will know its altitude from the map and thus one less satellite is necessary.

Power is supplied to the system as shown by power subsystem 96. Certain operator controls are also permitted as illustrated in subsystem 98.

The control processor or central processor and circuit board subsystem 100 to which all of the above components 52-98 are coupled, performs such functions as GPS ranging, DGPS corrections, image analysis, radar analysis, laser radar scanning control and analysis of received information, warning message generation, map communication, vehicle control, inertial navigation system calibrations and control, display control, precise positioning calculations, road condition predictions, and all other functions needed for the system to operate according to design.

A display could be provided for generating and displaying warning messages which is visible to the driver and/or passengers of the vehicle. The warning could also be in the form of an audible tone, a simulated rumble strip and light and other similar ways to attract the attention of the driver and/or passengers.

Vehicle control also encompasses control over the vehicle to prevent accidents. By considering information from the map database 48 of the navigation system 46, and the position of the vehicle obtained via GPS systems, a determination can be made whether the vehicle is about to run off the road, cross a yellow line and run a stop sign, as well as the existence or foreseen occurrence of other potential crash situations. The color of an approaching stoplight can also be factored in the vehicle control.

Figure 5A:
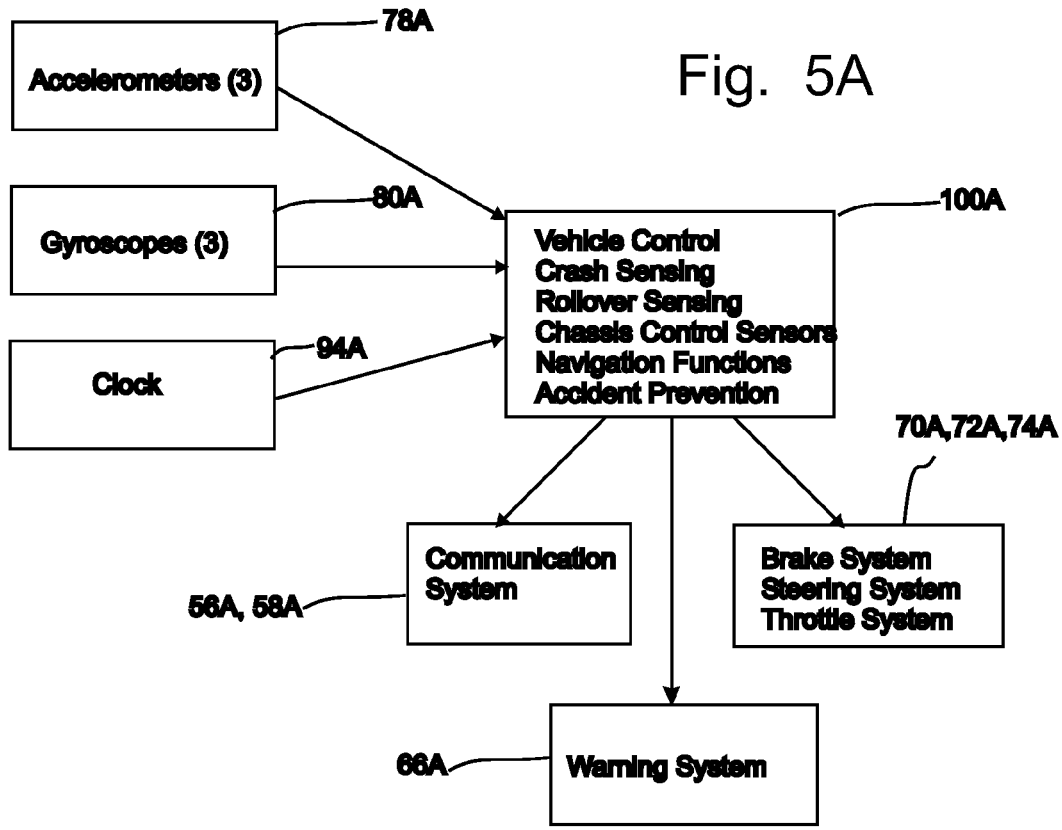
FIG. 5A is a block diagram of a representative accident avoidance, warning and control system.

FIG. 5A shows a selected reduced embodiment of the accident avoidance system shown in FIG. 5. The system includes an inertial reference unit including a plurality of accelerometers and gyroscopes, namely accelerometers 78A, preferably three of any type disclosed above, and gyroscopes 80A, preferably three of any type disclosed above. A clock 94A is provided to obtain a time base or time reference. This system will accurately determine the motion (displacement, acceleration and/or velocity) of the vehicle in 6 degrees of freedom (3 displacements (longitudinal, lateral and vertical)) via the accelerometers 78A and three rotations (pitch, yaw and roll) via the gyroscopes 80A. As such, along with a time base from clock 94A, the processor 100A can determine that there was an accident and precisely what type of accident it was in terms of the motion of the vehicle (frontal, side, rear and rollover). This system is different from a crash sensor in that this system can reside in the passenger compartment of the vehicle where it is protected from actually being in the accident crush and/or crash zones and thus it does not have to forecast the accident severity. It knows the resulting vehicle motion and therefore exactly what the accident was and what the injury potential is. A typical crash sensor can get destroyed or at least rotated during the crash and thus will not determine the real severity of the accident.

Processor 100A is coupled to the inertial reference unit and also is capable of performing the functions of vehicle control, such as via control of the brake system 70A, steering system 72A and velocity sensor 74A, crash sensing, rollover sensing, cassis control sensing, navigation functions and accident prevention as discussed herein.

Preferably, a Kalman filter is used to optimize the data from the inertial reference unit as well as other input sources of data, signals or information. Also, a neural network, fuzzy logic or neural-fuzzy system could be used to reduce the data obtained from the various sensors to a manageable and optimal set. The actual manner in which a Kalman filter can be constructed and used in the invention would be left to one skilled in the art. Note that in the system of the inventions disclosed herein, the extensive calibration process carried on by other suppliers of inertial sensors is not required since the system periodically corrects the errors in the sensors and revises the calibration equation. This in some cases can reduce the manufacturing cost on the IMU by a factor of ten.

Further, the information from the accelerometers 78A and gyroscopes 80A in conjunction with the time base or reference is transmittable via the communication system 56A,58A to other vehicles, possibly for the purpose of enabling other vehicles to avoid accidents with the host vehicle, and/or to infrastructure.

One particularly useful function would be for the processor to send data from, or data derived from, the accelerometers and gyroscopes relating to a crash, i.e., indicative of the severity of the accident with the potential for injury to occupants, to a monitoring location for the dispatch of emergency response personnel, i.e., an EMS facility or fire station. Other telematics functions could also be provided.

10.9 Exterior Surveillance System

Figure 6:
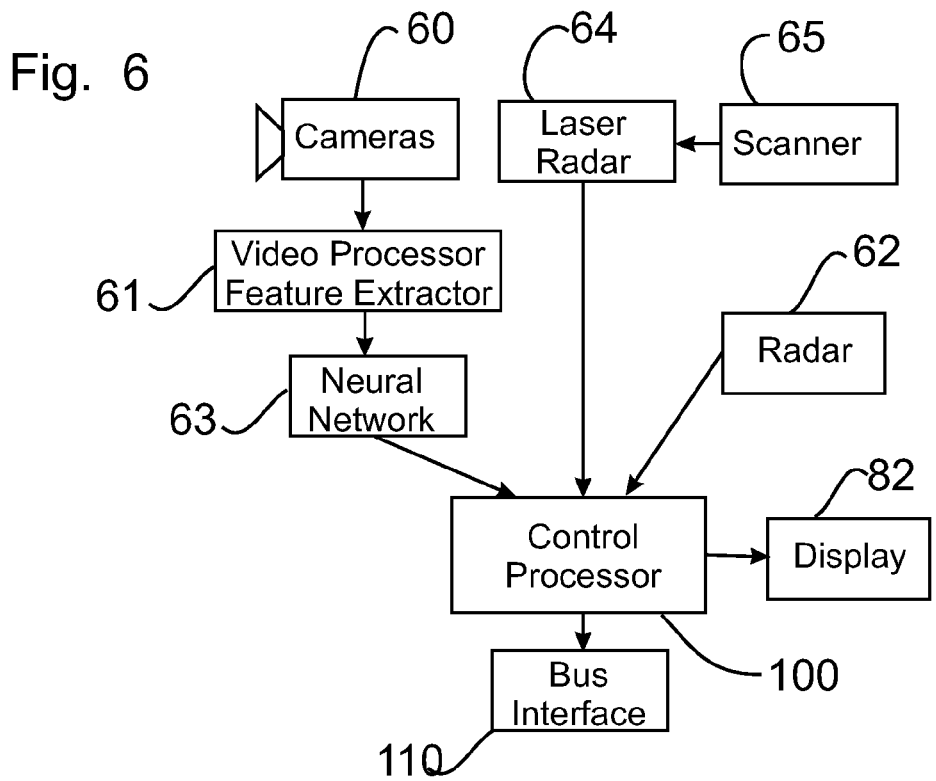
FIG. 6 is a block diagram of an image analysis computer of the type that can be used in the accident avoidance system and method of this invention.

FIG. 6 is a block diagram of the host vehicle exterior surveillance system. Cameras 60 are primarily intended for observing the immediate environment of the vehicle. They are used for recognizing objects that could be most threatening to the vehicle, i.e., closest to the vehicle. These objects include vehicles or other objects that are in the vehicle blind spot, objects or vehicles that are about to impact the host vehicle from any direction, and objects either in front of or behind the host vehicle which the host vehicle is about to impact. These functions are normally called blind spot monitoring and collision anticipatory sensors.

As discussed above, the cameras 60 can use naturally occurring visible or infrared radiation, or other parts of the electromagnetic spectrum including terahertz and x-rays, or they may be supplemented with sources of visible or infrared illumination from the host vehicle. Note that there generally is little naturally occurring terahertz radiation other than the amount that occurs in black body radiation from all sources. The cameras 60 used are preferably high dynamic range cameras that have a dynamic range exceeding 60 db and preferably exceeding 100 db. Such commercially available cameras include those manufactured by the Photobit Corporation in California and the IMS Chips Company in Stuttgart Germany. Alternately, various other means exist for increasing the effective dynamic range through shutter control or illumination control using a Kerr or Pockel cell, modulated illumination, external pixel integration etc.

These cameras are based on CMOS technology and can have the important property that pixels are independently addressable. Thus, the control processor may decide which pixels are to be read at a particular time. This permits the system to concentrate on certain objects of interest and thereby make more effective use of the available bandwidth.

Video processor printed circuit boards or feature extractor 61 can be located adjacent and coupled to the cameras 60 so as to reduce the information transferred to the control processor. The video processor boards or feature extractor 61 can also perform the function of feature extraction so that all values of all pixels do not need to be sent to the neural network for identification processing. The feature extraction includes such tasks as determining the edges of objects in the scene and, in particular, comparing and subtracting one scene from another to eliminate unimportant background images and to concentrate on those objects which had been illuminated with infrared or terahertz radiation, for example, from the host vehicle. By these and other techniques, the amount of information to be transferred to the neural network is substantially reduced.

The neural network 63 receives the feature data extracted from the camera images by the video processor feature extractor 61 and uses this data to determine the identification of the object in the image. The neural network 63 has been previously trained on a library of images that can involve as many as one million such images. Fortunately, the images seen from one vehicle are substantially the same as those seen from another vehicle and thus the neural network 63 in general does not need to be trained for each type of host vehicle.

As the number of image types increases, modular or combination neural networks can be used to simplify the system.

Although the neural network 63 has in particular been described, other pattern recognition techniques are also applicable. One such technique uses the Fourier transform of the image and utilizes either optical correlation techniques or a neural network trained on the Fourier transforms of the images rather than on the image itself. In one case, the optical correlation is accomplished purely optically wherein the Fourier transform of the image is accomplished using diffraction techniques and projected onto a display, such as a garnet crystal display, while a library of the object Fourier transforms is also displayed on the display. By comparing the total light passing through the display, an optical correlation can be obtained very rapidly. Although such a technique has been applied to scene scanning by military helicopters, it has previously not been used in automotive applications.

The laser radar system 64 is typically used in conjunction with a scanner 65. The scanner 65 typically includes two oscillating mirrors, or a MEMS mirror capable of oscillating in two dimensions, which cause the laser light to scan the two dimensional angular field. Alternately, the scanner can be a solid-state device utilizing a crystal having a high index of refraction which is driven by an ultrasonic vibrator as discussed above or rotating mirrors. The ultrasonic vibrator establishes elastic waves in the crystal which diffracts and changes the direction of the laser light.

The laser beam can be frequency, amplitude, time, code or noise modulated so that the distance to the object reflecting the light can be determined. The laser light strikes an object and is reflected back where it is guided onto a pin diode, or other high speed photo detector. Since the direction of laser light is known, the angular location of the reflected object is also known and since the laser light is modulated the distance to the reflected point can be determined. By varying modulation frequency of the laser light, or through noise or code modulation, the distance can be very precisely measured.

Alternatively, the time-of-flight of a short burst of laser light can be measured providing a direct reading of the distance to the object that reflected the light. By either technique, a three-dimensional map can be made of the surface of the reflecting object. Objects within a certain range of the host vehicle can be easily separated out using the range information. This can be done electronically using a technique called range gating, or it can be accomplished mathematically based on the range data. By this technique, an image of an object can be easily separated from other objects based on distance from the host vehicle.

Since the vehicle knows its position accurately and in particular it knows the lane on which it is driving, a determination can be made of the location of any reflective object and in particular whether or not the reflective object is on the same lane as the host vehicle. This fact can be determined since the host vehicle has a map and the reflective object can be virtually placed on that map to determine its location on the roadway, for example.

The laser radar system will generally operate in the near-infrared part of the electromagnetic spectrum. The laser beam will be of relatively high intensity compared to the surrounding radiation and thus even in conditions of fog, snow, and heavy rain, the penetration of the laser beam and its reflection will permit somewhat greater distance observations than the human driver can perceive. Under the RtZF™ plan, it is recommended that the speed of the host vehicle be limited such that vehicle can come to a complete stop in one half or less of the visibility distance. This will permit the laser radar system to observe and identify threatening objects that are beyond the visibility distance, apply the brakes to the vehicle if necessary causing the vehicle to stop prior to an impact, providing an added degree of safety to the host vehicle.

Radar system 62 is mainly provided to supplement laser radar system. It is particularly useful for low visibility situations where the penetration of the laser radar system is limited. The radar system, which is most probably a noise or pseudonoise modulated continuous wave radar, can also be used to provide a crude map of objects surrounding the vehicle. The most common use for automotive radar systems is for adaptive cruise control systems where the radar monitors the distance and, in some cases, the velocity of the vehicle immediately in front of the host vehicle. The radar system 62 is controlled by the control processor 100.

Display system 82 was discussed previously and can be either a heads up or other appropriate display.

Control processor 100 can be attached to a vehicle special or general purpose bus 110 for transferring other information to and from the control processor to other vehicle subsystems.

In interrogating other vehicles on the roadway, a positive identification of the vehicle and thus its expected properties such as its size and mass can sometimes be accomplished by laser vibrometry. By this method, a reflected electromagnetic wave can be modulated based on the vibration that the vehicle is undergoing. Since this vibration is caused at least partially by the engine, and each class of engine has a different vibration signature, this information can be used to identify the engine type and thus the vehicle. This technique is similar to one used to identify enemy military vehicles by the U.S. military. It is also used to identify ships at sea using hydrophones. In the present case, a laser beam is directed at the vehicle of interest and the returned reflected beam is analyzed such as with a Fourier transform to determine the frequency makeup of the beam. This can then be related to a vehicle to identify its type either through the use of a look-up table or neural network or other appropriate method. This information can then be used as information in connection with an anticipatory sensor as it would permit a more accurate estimation of the mass of a potentially impacting vehicle.

Once the vehicle knows where it is located, this information can be displayed on a heads-up display and if an occupant sensor has determined the location of the eyes of the driver, the road edges, for example, and other pertinent information from the map database can be displayed exactly where they would be seen by the driver. For the case of driving in dense fog or on a snow covered road, the driver will be able to see the road edges perhaps exactly or even better than the real view, in some cases. Additionally, other information gleaned by the exterior monitoring system can show the operator the presence of other vehicles and whether they represent a threat to the host vehicle (see for example "Seeing the road ahead", GPS World Nov. 1, 2003, which describes a system incorporating many of the current assignee's ideas described herein).

10.10 Corridors

Figure 7:
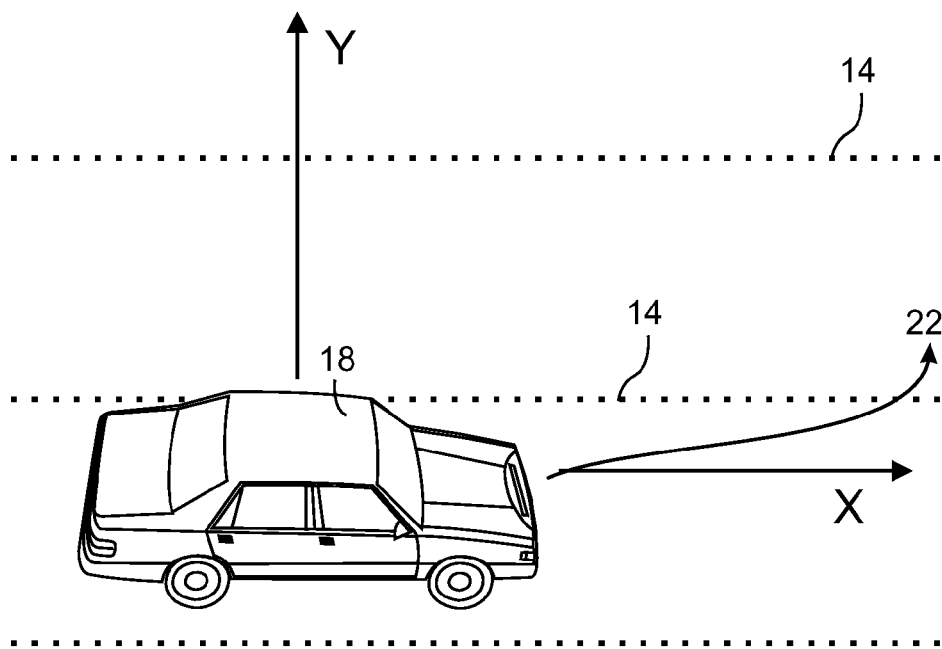
FIG. 7 illustrates a vehicle traveling on a roadway in a defined corridor.

FIG. 7 shows an implementation of the invention in which a vehicle 18 is traveling on a roadway in a defined corridor in the direction X. Each corridor is defined by lines 14. If the vehicle is traveling in one corridor and strays in the direction Y so that it moves along the line 22, e.g., the driver is falling asleep, the system on board the vehicle in accordance with the invention will activate a warning. More specifically, the system continually detects the position of the vehicle, such as by means of the GPS, DGPS and/or PPS, and has the locations of the lines 14 defining the corridor recorded in its map database. Upon an intersection of the position of the vehicle and one of the lines 14 as determined by a processor, the system may be designed to sound an alarm to alert the driver to the deviation or possibly even correct the steering of the vehicle to return the vehicle to within the corridor defined by lines 14.

Figure 8:
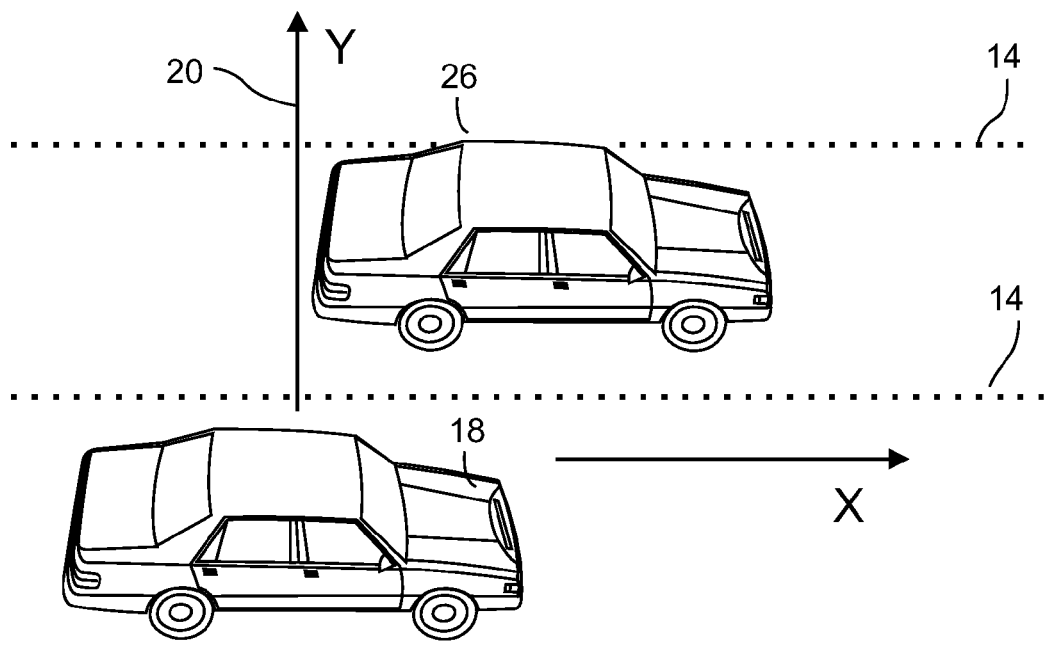
FIG. 8 illustrated two adjacent vehicles traveling on a roadway and communicating with each other.

FIG. 8 shows an implementation of the invention in which a pair of vehicles 18, 26 is traveling on a roadway each in a defined corridor defined by lines 14 and each is equipped with a system in accordance with the invention. The system in each vehicle 18, 26 will receive data informing it of the position of the other vehicle and prevent accidents from occurring, e.g., if vehicle 18 moves in the direction of arrow 20. This can be accomplished via direct wireless broadband communication or any of the other communication methods described above, or through another path such as via the Internet or through a base station, wherein each vehicle transmits its best estimate of its absolute location on the earth along with an estimate of the accuracy of this location. If one vehicle has recently passed a precise positioning station, for example, then it will know its position very accurately to within a few centimeters. Each vehicle can also send the latest satellite messages that it received, permitting each vehicle to precisely determine its relative location to the other since the errors in the signals will be the same for both vehicles. To the extent that both vehicles are near each other, even the carrier phase ambiguity can be determined and each vehicle will know its position relative to the other to within better than a few centimeters. As more and more vehicles become part of the community and communicate their information to each other, each vehicle can even more accurately determine its absolute position and especially if one vehicle knows its position very accurately, if it recently passed a PPS for example, then all vehicles will know their position with approximately the same accuracy and that accuracy will be able to be maintained for as long as a vehicle keeps its lock on the satellites in view. If that lock is lost temporarily, the INS system will fill in the gaps and, depending on the accuracy of that system, the approximate 2 centimeter accuracy can be maintained even if the satellite lock is lost for up to approximately five minutes.

A five minute loss of satellite lock is unlikely except in tunnels or in locations where buildings or geological features interfere with the signals. In the building case, the problem can be eliminated through the placement of PPS stations, or through environmental signature analysis, and the same would be true for the geological obstruction case except in remote areas where ultra precise positioning accuracy is probably not required. In the case of tunnels, for example, the cost of adding PPS stations is insignificant compared with the cost of building and maintaining the tunnel.

10.11 Vehicle Control

Figure 12A:
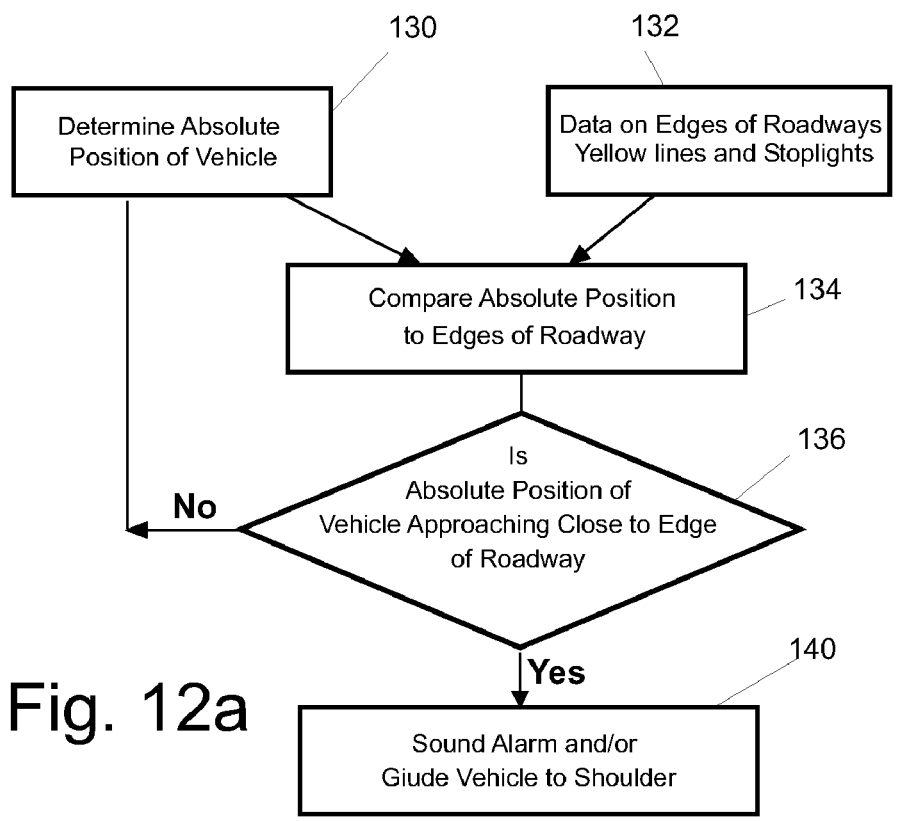
FIG. 12*a* is a flow chart of the method in accordance with the invention for preventing run off the road accidents.

FIG. 12*a* is a flow chart of the method in accordance with the invention. The absolute position of the vehicle is determined at 130, e.g., using a GPS, DGPS PPS system, and compared to the edges of the roadway at 134, which is obtained from a memory unit 132. Based on the comparison at 134, it is determined whether the absolute position of the vehicle is approaching close to or intersects an edge of the roadway at 136. If not, then the position of the vehicle is again obtained, e.g., at a set time interval thereafter, and the process continues. If yes, an alarm and/or warning system will be activated and/or the system will take control of the vehicle (at 140) to guide it to a shoulder of the roadway or other safe location.

Figure 12B:
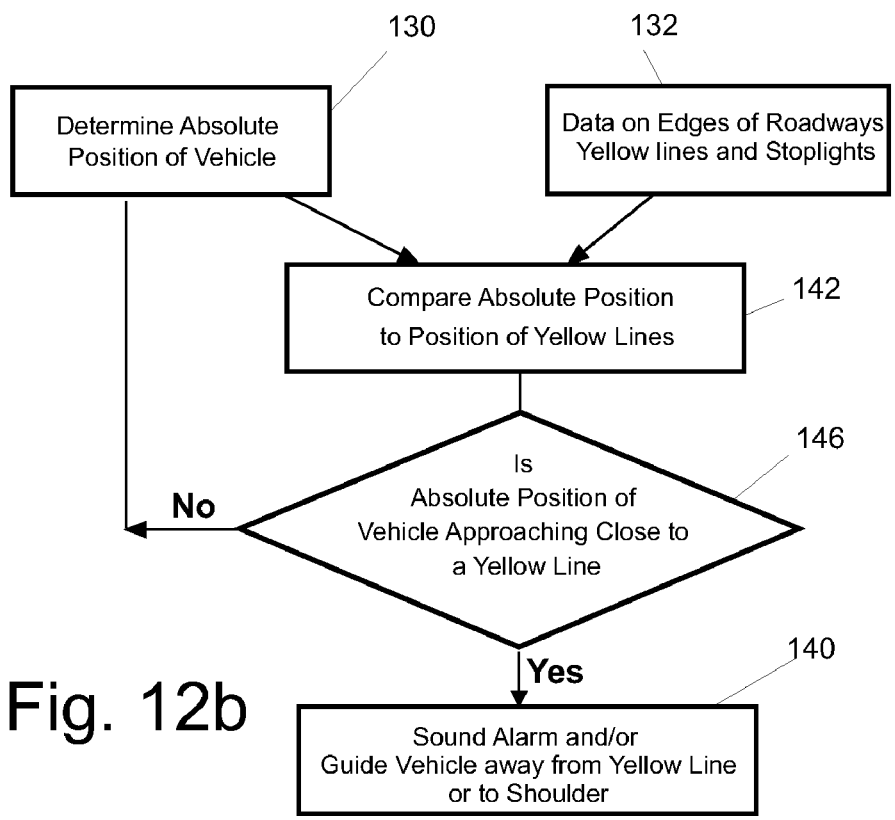
FIG. 12*b* is a flow chart of the method in accordance with the invention for preventing center (yellow) line crossing accidents.

FIG. 12*b* is another flow chart of the method in accordance with the invention similar to FIG. 12*a*. Again the absolute position of the vehicle is determined at 130, e.g., using a GPS, DGPS PPS system, and compared to the location of a roadway yellow line at 142 (or possibly another line which indicates an edge of a lane of a roadway), which is obtained from a memory unit 132. Based on the comparison at 144, it is determined whether the absolute position of the vehicle is approaching close to or intersects the yellow line 144. If not, then the position of the vehicle is again obtained, e.g., at a set time interval thereafter, and the process continues. If yes, an alarm will sound and/or the system will take control of the vehicle (at 146) to control the steering or guide it to a shoulder of the roadway or other safe location.

Figure 12C:
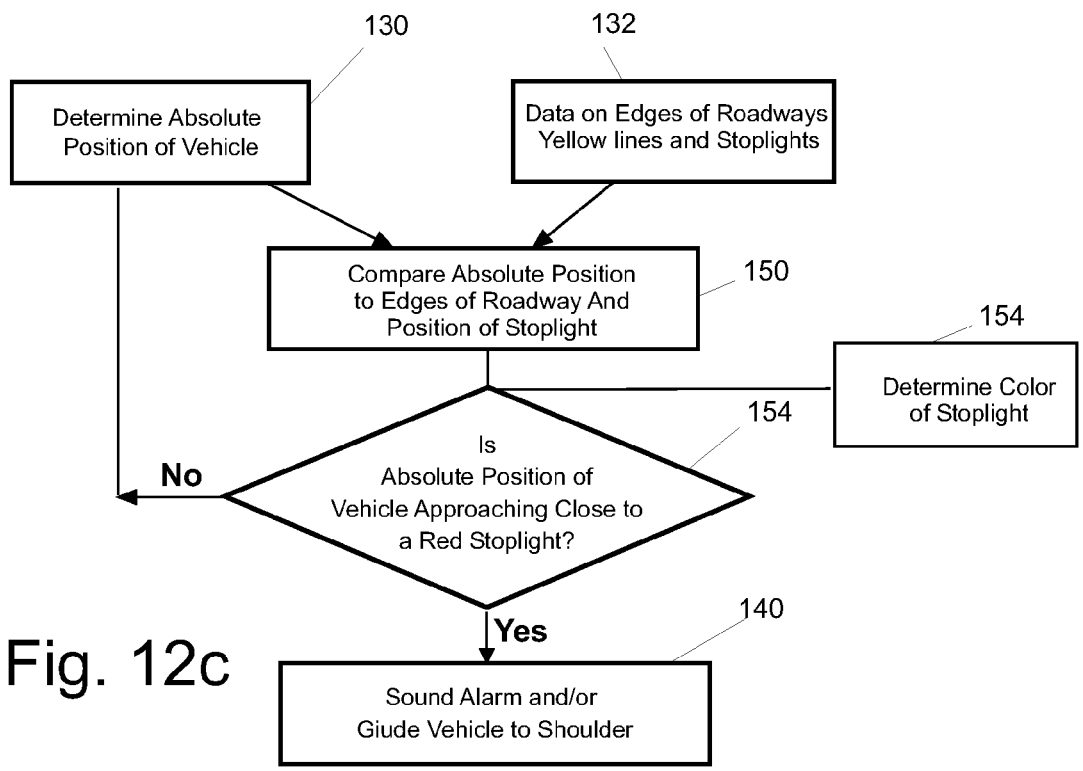
FIG. 12*c* is a flow chart of the method in accordance with the invention for preventing stoplight running accidents.

FIG. 12*c* is another flow chart of the method in accordance with the invention similar to FIG. 12*a*. Again the absolute position of the vehicle is determined at 130, e.g., using a GPS, DGPS PPS system, and compared to the location of a roadway stoplight at 150, which is obtained from a memory unit 132. Based on the comparison at 150, it is determined whether the absolute position of the vehicle is approaching close to a stoplight. If not, then the position of the vehicle is again obtained, e.g., at a set interval thereafter, and the process continues. If yes, a sensor determines whether the stoplight is red (e.g., a camera) and if so, an alarm will sound and/or the system will take control of the vehicle (at 154) to control the brakes or guide it to a shoulder of the roadway or other safe location. A similar flow chart can be now drawn by those skilled in the art for other conditions such as stop signs, vehicle speed control, collision avoidance etc.

10.12 Intersection Collision Avoidance

Figure 13:
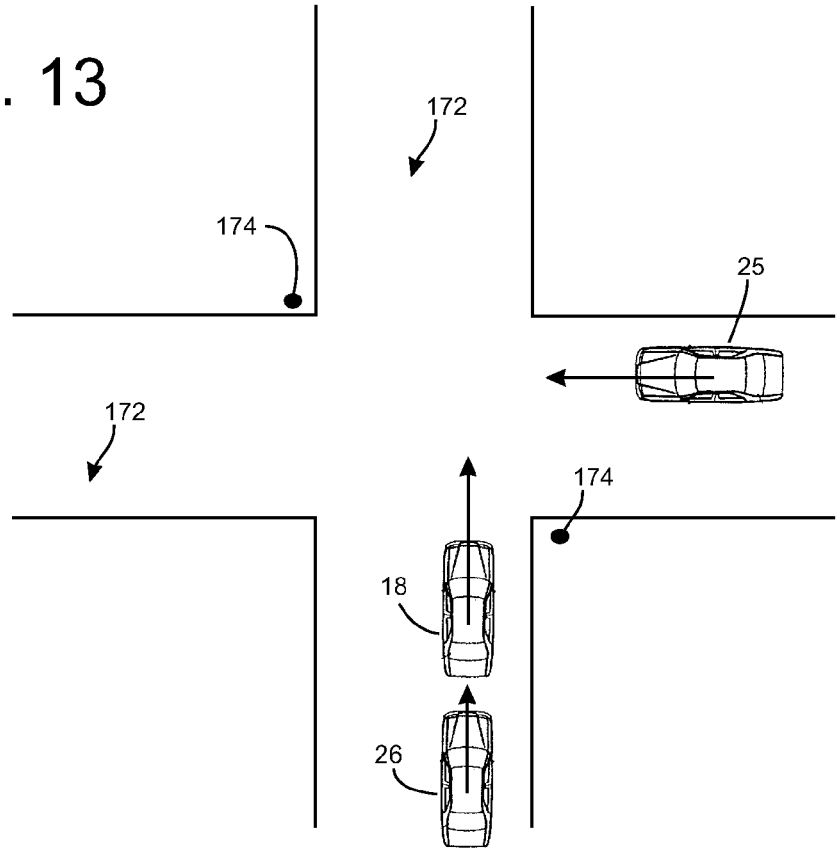
FIG. 13 illustrates an intersection with stop signs on the lesser road where there is a potential for a front to side impact and a rear end impact.

FIG. 13 illustrates an intersection of a major road 170 with a lesser road 172. The road 170 has the right of way and stop signs 174 have been placed to control the traffic on the lesser road 172. Vehicles 18 and 26 are proceeding on road 172 and vehicle 25 is proceeding on road 170. A very common accident is caused when vehicle 18 ignores the stop sign 174 and proceeds into the intersection where it is struck on the side by vehicle 25 or strikes vehicle 25 on the side.

Using the teachings of this invention, vehicle 18 will know of the existence of the stop sign and if the operator attempts to proceed without stopping, the system will sound a warning and if that warning is not heeded, the system will automatically bring the vehicle 18 to a stop, preventing it from intruding into the intersection.

Another common accident is where vehicle 18 does in fact stop but then proceeds forward without noticing vehicle 25 thereby causing an accident. Since in the fully deployed RtZF™ system, vehicle 18 will know through the vehicle-to-vehicle communication the existence and location of vehicle 25 and can calculate its velocity, the system can once again take control of vehicle 18 if a warning is not heeded and prevent vehicle 18 from proceeding into the intersection and thereby prevent the accident.

In the event that the vehicle 25 is not equipped with the RtZF™ system, vehicle 18 will still sense the presence of vehicle 25 through the laser radar, radar and camera systems. Once again, when the position and velocity of vehicle 25 is sensed, appropriate action can be taken by the system in vehicle 18 to eliminate the accident.

In another scenario where vehicle 18 properly stops at the stop sign, but vehicle 26 proceeds without observing the presence of the stopped vehicle 18, the laser radar, radar and camera systems will all operate to warn the driver of vehicle 26 and if that warning is not heeded, the system in vehicle 26 will automatically stop the vehicle 26 prior to its impacting vehicle 18. Thus, in the scenarios described above the "Road to Zero Fatalities"™ system and method of this invention will prevent common intersection accidents from occurring.

Figure 14:
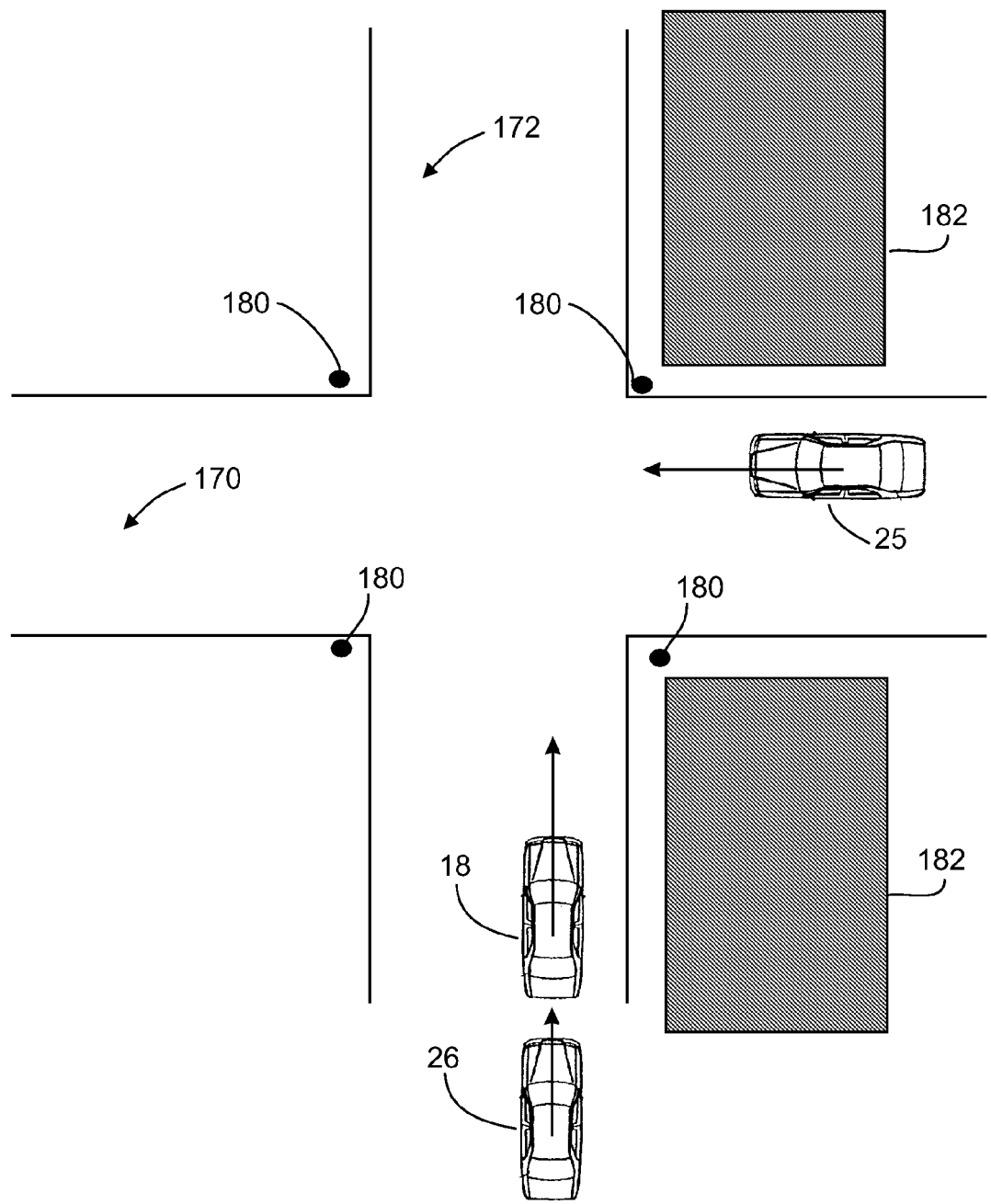
FIG. 14 illustrates a blind intersection with stoplights where there is a potential for a front side to front side impact.

FIG. 14 is a view of an intersection where traffic is controlled by stoplights 180. If the vehicle 18 does not respond in time to a red stoplight, the system as described above will issue a warning and if not heeded, the system will take control of the vehicle 18 to prevent it from entering the intersection and colliding with vehicle 25. In this case, the stoplight 180 will emit a signal indicating its color, such as by way of the communication system, and/or vehicle 18 will have a camera mounted such that it can observe the color of the stoplight 180. There are of course other information transfer methods such as through the Internet. In this case, buildings 182 obstruct the view from vehicle 18 to vehicle 25 thus an accident can still be prevented even when the operators are not able to visually see the threatening vehicle. If both vehicles have the RtZF™ system, they will be communicating and their presence and relative positions will be known to both vehicles.

Figure 15:
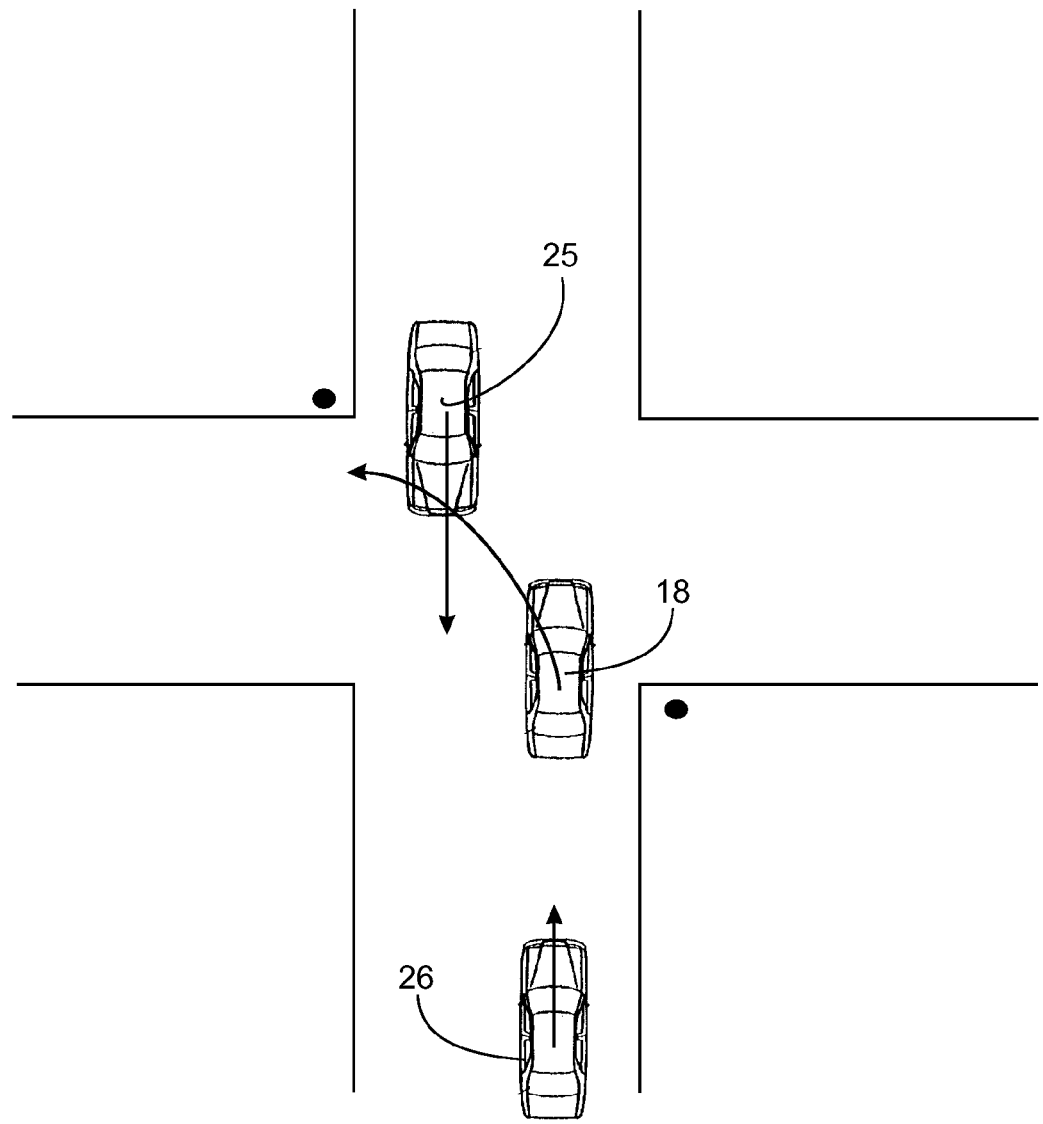
FIG. 15 illustrates an intersection where there is a potential for a front-to-front impact as a vehicle turns into oncoming traffic.
Figure 16B:
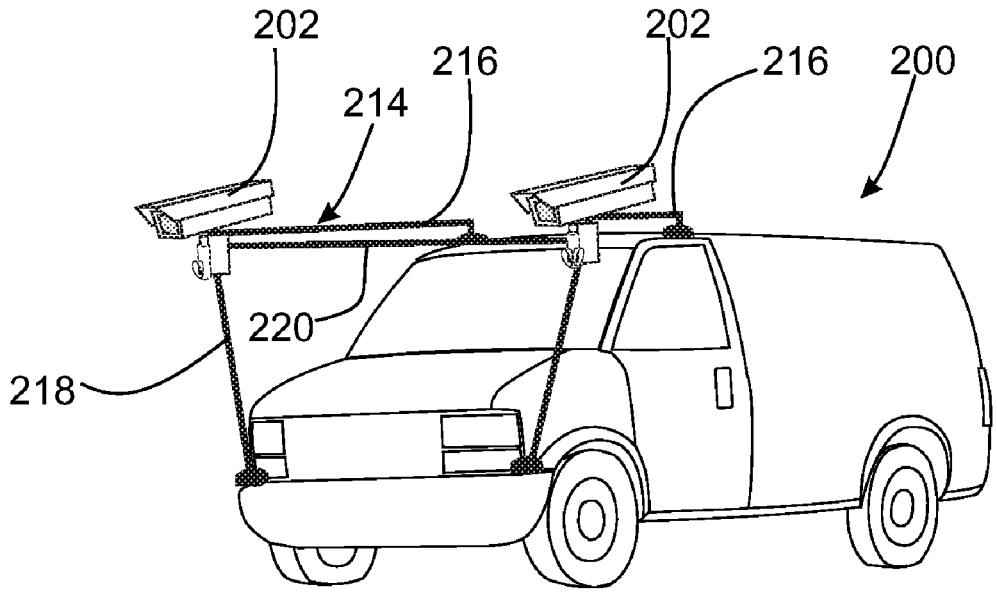
FIG. 16B is a front perspective view of a vehicle equipped with the road-mapping arrangement in accordance with the invention.
Figure 16A:
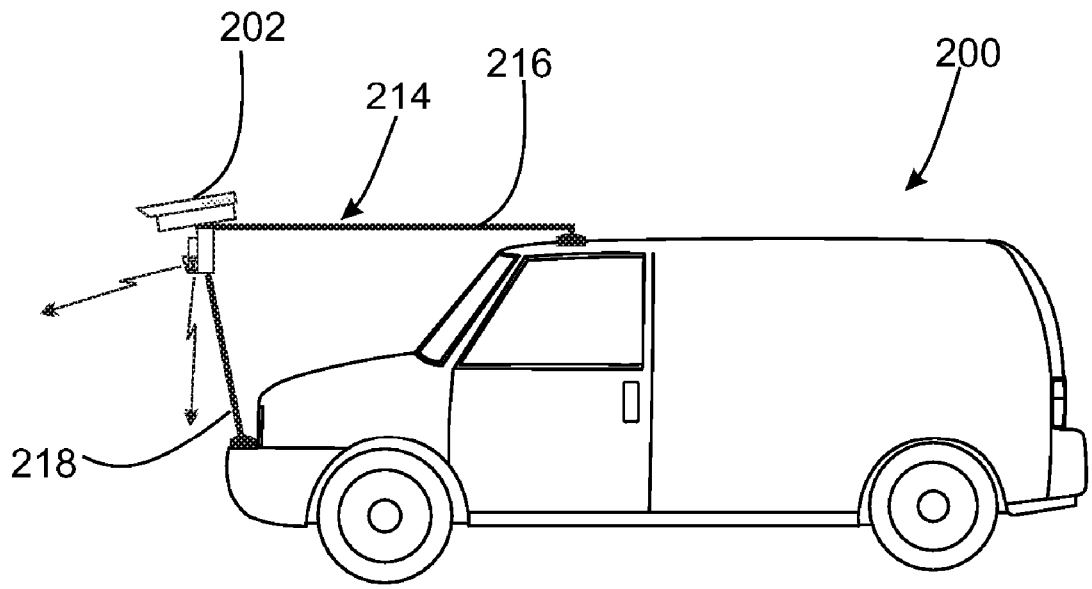
FIG. 16A is a side view of a vehicle equipped with a road-mapping arrangement in accordance with the invention.

FIG. 15 illustrates the case where vehicle 18 is about to execute a left-hand turn into the path of vehicle 25. This accident will be prevented if both cars have the RtZF™ system since the locations and velocities of both vehicles 18, 25 will be known to each other. If vehicle 25 is not equipped and vehicle 18 is, then the camera, radar, and laser radar subsystems will operate to prevent vehicle 18 from turning into the path of vehicle 25. Once again common intersection accidents are prevented by this invention.

The systems described above can be augmented by infrastructure-based sensing and warning systems. Camera, laser or terahertz radar or radar subsystems such as placed on the vehicle can also be placed at intersections to warn the oncoming traffic if a collision is likely to occur. Additionally, simple sensors that sense the signals emitted by oncoming vehicles, including radar, thermal radiation, etc., can be used to operate warning systems that notify oncoming traffic of potentially dangerous situations. Thus, many of the teachings of this invention can be applied to infrastructure-based installations in addition to the vehicle-resident systems.

10.13 Privacy

People do not necessarily want the government to know where they are going and therefore will not want information to be transmitted that can identify the vehicle. The importance of this issue may be overestimated. Most people will not object to this minor infraction if they can get to their destination more efficiently and safely.

On the other hand, it has been estimated that there are 100,000 vehicles on the road, many of them stolen, where the operators do not want the vehicle to be identified. If an identification process that positively identifies the vehicle were made part of this system, it could thus cut down on vehicle theft. Alternately, thieves might attempt to disconnect the system thereby defeating the full implementation of the system and thus increasing the danger on the roadways and defeating the RtZF™ objective. The state of the system would therefore need to be self-diagnosed and system readiness should be a condition for entry onto the restricted lanes.

11. Other Features 11.1 Incapacitated Driver

As discussed herein, the RtZF™ system of this invention also handles the problem of the incapacitated driver thus eliminating the need for sleep sensors that appear in numerous U.S. patents. Such systems have not been implemented because of their poor reliability. The RtZF™ system senses the result of the actions of the operator, which could occur for a variety of reasons including inattentiveness cause by cell phone use, old age, drunkenness, heart attacks, drugs as well as falling asleep.

11.2 Emergencies—Car Jacking, Crime

Another enhancement that is also available is to prevent car jacking in which case the RtZF™ system can function like the Lojack™ system. In the case where a carjacking occurs, the location of the vehicle can be monitored and if an emergency button is pushed, the location of the vehicle with the vehicle ID can be transmitted.

11.3 Headlight Dimmer

The system also solves the automatic headlight dimmer problem. Since the RtZF™ system equipped vehicle knows where all other RtZF™ system equipped vehicles are located in its vicinity, it knows when to dim the headlights. Since it is also interrogating the environment in front of the vehicle, it also knows the existence and approximate location of all non-RtZF™ system equipped vehicles. This is one example of a future improvement to the system. The RtZF™ system is a system which lends itself to continuous improvement without having to change systems on an existing vehicle.

11.4 Rollover

It should be obvious from the above discussion that rollover accidents should be effectively eliminated by the RtZF™ system. In the rare case where one does occur, the RtZF™ system has the capability to sense that event since the location and orientation of the vehicle is known.

For large trucks that have varying inertial properties depending on the load that is being hauled, sensors can be placed on the vehicle that measure angular and linear acceleration of a part of the vehicle. Since the geometry of the road is known, the inertial properties of the vehicle with load can be determined and thus the tendency of the vehicle to roll over can be determined. Since the road geometry is known the speed of the truck can be limited based partially on its measured inertial properties to prevent rollovers. The IMU can play a crucial role here in that the motion of the vehicle is now accurately known to a degree previously not possible before the Kalman filter error correction system was employed. This permits more precise knowledge and thus the ability to predict the motion of the vehicle. The IMU can be input to the chassis control system and, through appropriate algorithms, the throttle, steering and brakes can be appropriately applied to prevent a rollover. When the system described herein is deployed, rollovers should disappear as the causes such as road ice, sharp curves and other vehicles are eliminated.

If a truck or other vehicle is driving on a known roadway where the vertical geometry (height and angle) has been previously determined and measured, then one or more accelerometers and gyroscopes can be placed at appropriate points on the truck and used to measure the response of the vehicle to the disturbance. From the known input and measured response, the inertial properties of the vehicle can readily be determined by one skilled in the art. Similarly, if instead of a knowledge of the road from the map database, the input to the vehicle from the road can be measured by accelerometers and gyroscopes placed on the chassis, for example, and then the forcing function into the truck body is known and by measuring the motion (accelerations and angular accelerations) the inertial properties once again can be determined. Finally, the input from the road can be treated statistically and again the inertial properties of the truck estimated. If a truck tractor is hauling a trailer then the measuring devices can be placed at convenient locations of the trailer such inside the trailer adjacent to the roof at the front and rear of the trailer.

If the map contains the information, then as the vehicle travels the road and determines that there has been a change in the road properties this fact can be communicated via telematics or other methods to the map maintenance personnel, for example. In this manner, the maps are kept current and pothole or other evidence of road deterioration can be sent to appropriate personnel for attention.

Once the system determines that the vehicle is in danger or a rollover situation, the operator can be notified with an audible or visual warning (via a display or light) so that he or she can take corrective action. Additionally or alternately, the system can take control of the situation and prevent the rollover through appropriate application of brakes (either on all wheels or selectively on particular wheels), throttle or steering.

11.5 Vehicle Enhancements

The RtZF™ system can now be used to improve the accuracy of other vehicle-based instruments. The accuracy of the odometer and yaw rate sensors can be improved over time, for example, by regression, or through the use of a Kalman filter, against the DGPS data. The basic RtZF™ system contains an IMU which comprises three accelerometers and three gyroscopes. This system is always being updated by the DGPS system, odometer, vehicle speed sensor, magnetic field and field vector sensors, PPS and other available sensors through a Kalman filter and in some cases a neural network.

11.6 Highway Enhancements

Enhancements to the roadways that result from the use of the RtZF™ system include traffic control. The timing of the stoplights can now be automatically adjusted based on the relative traffic flow. The position of every vehicle within the vicinity of the light can be known from the communication system discussed above. When all vehicles have the RtZF™ system, many stoplights will no longer be necessary since the flow of traffic through an intersection can be accurately controlled to avoid collisions.

Since the road conditions will now be known to the system, an enhanced RtZF™ system will be able to advise an operator not to travel or, alternately, it can pick an alternate route if certain roads have accidents or have iced over, for example. Some people may decide not drive if there is bad weather or congestion. The important point here is that sensors will be available to sense the road condition as to both traffic and weather, this information will be available automatically and not require reporting from weather stations which usually have only late and inaccurate information. Additionally, pricing for the use of certain roads can be based on weather, congestion, time of day, etc. That is, pricing can by dynamically controlled.

The system lends itself to time and congestion-based allocation of highway facilities. A variable toll can automatically be charged to vehicles based on such considerations since the vehicle can be identified. In fact, automatic toll systems now being implemented will likely become obsolete as will all toll booths.

Finally, it is important to recognize that the RtZF™ system is not a "sensor fusion" system. Sensor fusion is based on the theory that you can take inputs from different sensors and combine them in such a way as to achieve more information from the combined sensors than from treating the sensor outputs independently in a deterministic manner. The ultimate sensor fusion system is based on artificial neural networks, sometimes combined with fuzzy logic to form a neural fuzzy system. Such systems are probabilistic. Thus there will always be some percentage of cases where the decision reached by the network will be wrong. The use of such sensor fusion, therefore, is inappropriate for the "Zero Fatalities" goal of the invention, although several of the sub-parts of the system may make use of neural networks.

11.7 Speed Control

Frequently a driver is proceeding down a road without knowing the allowed speed limit. This can happen if he or she recently entered a road and a sign has not been observed or perhaps the driver just was not paying attention or the sign was hidden from view by another vehicle. If the allowed speed was represented in the map database then it could be displayed on an in vehicle display since the vehicle would know its location.

12. Summary

Disclosed above are methods and apparatus for preventing vehicle accidents. To this end, a vehicle is equipped with a differential GPS (DGPS) navigational system as well as an inertial navigation subsystem. Part of the system can be an array of infrastructure stations that permit the vehicle to exactly determine its position at various points along its path. Such stations would typically be located at intervals such as every 50 miles along the roadway, or more or less frequently depending on requirements as described below. These stations permit the vehicle to become its own DGPS station and thus to correct for the GPS errors and to set the position of the vehicle-based initial guidance system. It also provides sufficient information for the vehicle to use the carrier frequency to determine its absolute position to within a few centimeters or better for as long as satellite locks are maintained. Data is also available to the vehicle that provides information as to the edges of the roadway, and edges of the lanes of the roadway, at the location of the vehicle so that the vehicle control system can continuously determine its location relative to the roadway edges and/or lane edges. In the initial implementation, the operator operates his or her vehicle and is unaware of the presence of the accident avoidance system. If, however, the operator falls asleep or for some other reason attempts to drive off the roadway at high speed, the system will detect that the vehicle is approaching an edge of the roadway and will either sound an alarm or prevent the vehicle from leaving the roadway when doing so would lead to an accident. In some cases, the system will automatically reduce the speed of the vehicle and stop it on the shoulder of the roadway.

It is important to note that the invention as described in the above paragraph is in itself a significant improvement to automotive safety. Approximately half of all fatal accidents involve only a single vehicle that typically leaves the roadway and impacts with a roadside obstacle, cross a yellow line or run a red light or stop sign. This typically happens when the driver in under the influence of alcohol or drugs, has a medical emergency or simply falls asleep. If this cause of accidents could be eliminated, the potential exists for saving many thousands of deaths per year when all vehicles are equipped with the system of this invention. This would make this the single greatest advance in automotive safety surpassing both seatbelts and airbags in lifesaving potential.

A first improvement to this embodiment of the invention is to provide the vehicle with a means using radar, laser radar, optical or infrared imaging, or a similar technology, to determine the presence, location and velocity of other vehicles on the roadway that are not equipped with the accident avoidance system. The accident avoidance system (RtZF™) of this invention will not be able to avoid all accidents with such vehicles for the reasons discussed above, but will be able to provide a level of protection which is believed to surpass all known prior art systems. Some improvement over prior art systems will result from the fact that the equipped vehicle knows the location of the roadway edges, as well as the lane boundaries, not only at the location of the equipped vehicle but also at the location of the other nearby vehicles. Thus, the equipped vehicle will be able to determine that an adjacent vehicle has already left its corridor and warn the driver or initiate evasive action. In prior art systems, the location of the roadway is not known leading to significantly less discrimination ability.

A second improvement is to provide communication ability to other nearby similarly equipped vehicles permitting the continuous transmission and reception of the locations of all equipped vehicles in the vicinity. With each vehicle knowing the location, and thus the velocity, of all potential impacting vehicles which are equipped with the RtZF™, collisions between vehicles can be reduced and eventually nearly eliminated when all vehicles are equipped with the RtZF™. One such communication system involves the use of spread spectrum carrier less communication channels that make efficient use of the available bandwidth and permit the simultaneous communication of many vehicles.

A third improvement comprises the addition of software to the system that permits vehicles on specially designated vehicle corridors for the operator to relinquish control of the vehicle to the vehicle-based system, and perhaps to a roadway computer system. This then permits vehicles to travel at high speeds in a close packed formation thereby substantially increasing the flow rate of vehicles on a given roadway. In order to enter the designated corridors, a vehicle would be required to be equipped with the RtZF™ system. Similarly, this then provides an incentive to vehicle owners to have their vehicles so equipped so that they can enter the controlled corridors and thereby shorten their travel time. Close packed or platooning travel is facilitated in the invention and thus supportive of the drag reduction advantages of such travel. But, such travel, although it can be automatically achieved through implementation of the proper algorithms in a very simple manner, is not required.

Prior art systems require expensive modifications to highways to permit such controlled high speed close packed travel. Such modifications also require a substantial infrastructure to support the system. The RtZF™ of the present invention, in its simplest form, does not require any modification to the roadway but rather relies primarily on the GPS or similar satellite system or other precise locating system. The edge and lane boundary information is either present within the vehicle RtZF™ memory or transmitted to the vehicle as it travels along the road. The permitted speed of travel is also communicated to the vehicles on the restricted corridor and thus each vehicle travels at the appointed speed. Since each vehicle knows the location of all other vehicles in the vicinity, should one vehicle slow down, due to an engine malfunction, for example, appropriate action can be taken to avoid an accident. Vehicles do not need to travel in groups as suggested and required by some prior art systems. Rather, each vehicle may independently enter the corridor and travel at the system defined speed until it leaves, which may entail notifying the system of a destination.

Another improvement involves the transmission of additional data concerning weather conditions, road conditions traffic accidents etc. to the equipped vehicle so that the speed of that vehicle can be limited to a safe speed depending on road conditions, for example. If moisture is present on the roadway and the temperature is dropping to the point that ice might be building up on the road surface, the vehicle can be notified by the roadway information system and prevented from traveling at an unsafe speed.

In contrast to some prior art systems, with the RtZF™ system in accordance with the invention, especially when all vehicles are appropriately equipped, automatic braking of the vehicle should rarely be necessary and steering and throttle control should in most cases be sufficient to prevent accidents. In most cases, braking means the accident wasn't anticipated.

It is important to understand that this is a process control problem. The process is designed so that it should not fail and thus all accidents should be eliminated. Events that are troublesome to the system include a deer running in front of the vehicle, a box falling off of a truck, a rock rolling onto the roadway and a catastrophic failure of a vehicle. Continuous improvement to the process is thus required before these events are substantially eliminated. Each vehicle, individual driver and vehicle control system is part of the system and upon observing that such an event has occurred, he or she should have the option of stopping the process to prevent or mitigate an emergency. All equipped vehicles therefore have the capability of communicating that the process is stopped and therefore that the vehicle speed, for example, should be substantially reduced until the vehicle has passed the troubled spot or until the problem ceases to exist. In other words, each vehicle and each driver is part of the process. In one manner, each vehicle is a probe vehicle.

The RtZF™ system in accordance with the invention will thus start simple by reducing single vehicle accidents and evolve. The system has the capability to solve the entire problem by eliminating automobile accidents.

Furthermore, disclosed above are methods and apparatus for eliminating accidents by accurately determining the position of a vehicle, accurately knowing the position of the road and communicating between vehicles and between the vehicle and the infrastructure supporting travel. People get into accidents when they go too fast for the conditions and when they get out of their corridor. This embodiment eliminates these and other causes of accidents. In multilane highways, this system prevents people from shifting lanes if there are other vehicles in the blind spot, thus, solving the blind spot problem. The vehicle would always be traveling down a corridor where the width of the corridor may be a lane or the entire road width or something in between depending on road conditions and the presence of other vehicles. This embodiment is implemented through the use of both an inertial navigation system (INS) and a DGPS, in some cases with carrier frequency enhancement. Due to the fact that the signals from at least four GPS or GLONASS satellites are not always available and to errors caused by multiple path reception from a given satellite, the DGPS systems cannot be totally relied upon. Therefore the INS is a critical part of the system. This will improve as more satellites are launched and additional ground stations are added. It will also significantly improve when the WAAS and LAAS systems are implemented and refined to work with land vehicles as well as airplanes. It will also be improved with the implementation of PPS.

Also disclosed above is an arrangement for transferring information between a vehicle and one or more transmitters separate from the vehicle which generally comprises an antenna mounted on the vehicle and capable of receiving radio frequency waves emitted by the transmitter and containing information, a position determining device for determining the position of the vehicle, and a processor coupled to the antenna and the position determining device and arranged to analyze the waves received by the antenna, determine whether any received waves contain information of interest for operation of the vehicle based on the vehicle's position as determined by the position determining device, and extract the information of interest only from the received waves determined to contain information of interest. The information of interest may be information about the transmitter such as its location, speed, velocity, etc., or information relating to road conditions, weather and the like.

Each transmitter can transmit radio frequency waves containing positional information about the transmitter, information necessitated by the information transferring arrangement and additional information of potential interest for operation of the vehicle. In this case, the processor is arranged to extract only the positional information and the information necessitated by the information transferring arrangement from all received waves and additional information only from received waves determined to contain information of interest for operation of the vehicle. The information of interest may be a distance between the transmitter and the vehicle, an angle between the transmitter and the vehicle, a direction between the transmitter and the vehicle, a place of the transmitter and a geographic position of the transmitter and combinations thereof. The processor can analyze the positional information extracted from all of the received waves to determine whether any received waves originate from a transmitter within a pre-determined area relative to the vehicle whereby received waves from any transmitter determined to be within the pre-determined area relative to the vehicle are considered to contain information of interest for operation of the vehicle.

In some embodiments, the processor directs the transmission of encoded signals from the antenna including information about the position of the vehicle. The processor may derive the encoded signals using a code based on the position of the vehicle.

The processor can direct the transmission of encoded signals from the antenna including information about the position of the vehicle and identification of the vehicle. Also, the processor can direct the transmission of a unique pseudorandom noise signal from the antenna composed of frequencies within a pre-selected band.

Optionally, a speed determining device is arranged in the vehicle for determining the speed of the vehicle in which case, the processor is coupled to the speed determining device and encodes signals including information about the speed of the vehicle. In a similar manner, a motion determining device may be arranged in the vehicle for determining the direction of motion of the vehicle, in which case, the processor is coupled to the motion determining device and encodes signals including information about the direction of motion of the vehicle.

In a non-limiting embodiment, the processor derives encoded signals by phase modulation of distance or time between code transmissions, phase or amplitude modulation of the code sequences, changes of the polarity of the entire code sequence or the individual code segments, or bandwidth modulation of the code sequence. The encoded signals can be derived using a code based on the position of the vehicle.

The processor can direct the transmission of a unique pseudorandom noise signal from the antenna in a carrier-less fashion composed of frequencies within a pre-selected band.

In a method for transferring information between a vehicle and one or more transmitters separate from the vehicle in accordance with the invention, each transmitter transmits radio frequency waves containing positional information about the transmitter, information necessitated by the information transferring method and additional information of potential interest for operation of the vehicle. An antenna is arranged on the vehicle capable of receiving the radio frequency waves emitted by the transmitter. The position of the vehicle is determined. Waves transmitted by each transmitter are received via the antenna. The waves received by the antenna are analyzed to extract the positional information about the transmitter and information necessitated by the information transferring method from each wave. From the extracted positional information, a determination is made as to whether any transmitted waves contain additional information of actual interest for operation of the vehicle. If so, the additional information is extracted only from those transmitted signals determined to contain information of actual interest for operation of the vehicle.

The additional information contained in each transmitted wave may be a distance between the transmitter and the vehicle, an angle between the transmitter and the vehicle, a direction between the transmitter and the vehicle, a place of the transmitter and a geographic position of the transmitter and combinations thereof.

The wave analysis step may entail analyzing the received waves to determine whether any received waves originate from a transmitter within a pre-determined area relative to the vehicle, the information extracting step comprising extracting additional information only from the waves received from any transmitter determined to be within the pre-determined area relative to the vehicle. Optionally, a direction between each transmitter within the pre-determined area relative to the vehicle and the vehicle is determined and the extraction of additional information from waves received from the transmitters within the pre-determined area relative to the vehicle limited to only those whose direction to the vehicle affects the traveling of the vehicle. In addition to or instead of the foregoing, the direction of travel of each transmitter (vehicle when vehicle-mounted) within the pre-determined area relative to the vehicle and the vehicle is determined and the extraction of additional information from waves received from the transmitters within the pre-determined area relative to the vehicle limited to only those whose direction of travel affects the traveling of the vehicle.

Another wave analysis may involve determining whether any received waves originate from a transmitter traveling in a direction toward the vehicle's current position and/or the vehicle's projected position based on the vehicle's current position and direction of travel, in which case, additional information may be extracted only from the waves received from any transmitter traveling toward the vehicle's current and/or projected position.

Another alternative or additional form of wave analysis may involve determining whether any of the signals originate from transmitters dedicated to the transmission of road conditions or traffic data whereby the signals containing information of interest originate from the transmitters dedicated to the transmission of road conditions or traffic data.

Encoded signals may be transmitted from the antenna including information about the position of the vehicle. A code to use for encoding the signal may be determined based on the position of the vehicle.

A method for transferring information from transmitters to a moving vehicle in accordance with the invention includes determining the position of the vehicle, transmitting a signal from each transmitter containing its position, information necessitated by the information transferring method and additional information, arranging an antenna on the vehicle, receiving the signals from the transmitters via the antenna, analyzing the signals received by the antenna to extract the positional information about the transmitters and information necessitated by the information transferring method from each signal, determining whether any transmitters are situated within a pre-determined area relative to the vehicle, and extracting the additional information only from signals received from transmitters within the pre-determined area relative to the vehicle.

The location of the transmitters may be on other vehicles, but may also be on other stationary or moving objects. The position of each transmitter can be determined using a GPS-based system.

The pre-determined area relative to the vehicle to may be defined to include a distance between the transmitter and the vehicle, an angle between the transmitter and the vehicle, a direction between the transmitter and the vehicle, a place of the transmitter and a geographic position of the transmitter and combinations thereof.

Optionally, a direction between each transmitter within the pre-determined area relative to the vehicle and the vehicle may be determined and the extraction of additional information from waves received from the transmitters within the pre-determined area relative to the vehicle limited to only those whose direction to the vehicle affects the traveling of the vehicle. In addition to or instead of the foregoing, the direction of travel of each transmitter (vehicle when vehicle-mounted) within the pre-determined area relative to the vehicle and the vehicle is determined and the extraction of additional information from waves received from the transmitters within the pre-determined area relative to the vehicle limited to only those whose direction of travel affects the traveling of the vehicle.

Another wave analysis may involve determining whether any received waves originate from a transmitter traveling in a direction toward the vehicle's current position and/or the vehicle's projected position based on the vehicle's current position and direction of travel, in which case, additional information may be extracted only from the waves received from any transmitter traveling toward the vehicle's current and/or projected position. Encoded signals may be transmitted from the antenna including information about the position of the vehicle. A code to use for encoding the signal may be determined based on the position of the vehicle.

A method for avoiding collisions between moving vehicles in accordance with the invention comprises determining the position of each vehicle, equipping each vehicle with a transmitter/receiver, transmitting a signal from each transmitter/receiver containing its position and additional information, receiving the signals at each transmitter/receiver from the other transmitter/receivers, and analyzing the signals at each transmitter/receiver to extract the positional information about the vehicles equipped with the other transmitter/receivers from each signal in order to determine whether any vehicles are situated within a pre-determined area relative to that transmitter/receiver. If so, the additional information is extracted only from signals received from other transmitter/receivers in the vehicles within the pre-determined area relative to that transmitter/receiver and the additional information is analyzed to ascertain whether a collision with the vehicles equipped with the other transmitter/receivers is likely to occur in order to enable evasive action to be taken to prevent the collision.

Optionally, a direction between each of the vehicle equipped with the other transmitter/receivers within the pre-determined distance from that transmitter/receiver is determined and the extraction of the additional information limited only those whose direction affects the traveling of the vehicle. The signals transmitted by each transmitter/receivers can be encoded by means of a code selected based on the position of each transmitter/receiver, which may be determined using a GPS-based system.

A method for transferring information between a vehicle and one or more transmitters separate from the vehicle in accordance with the invention comprises mounting an antenna on the vehicle which is capable of receiving radio frequency waves emitted by the transmitter containing information, determining the position of the vehicle, analyzing the waves received by the antenna, determining whether any received waves contain information of interest for operation of the vehicle based on the vehicle's position and extracting the information of interest only from the received waves determined to contain information of interest.

A method for avoiding collisions between a vehicle and another object includes mounting a laser beam projector on the vehicle, directing a laser beam from the projector outward from the vehicle, determining whether an object is present in the path of the laser beam based on reception of reflections of the laser beam caused by the presence of the object in the path of the laser beam, and when an object is determined to be present, setting a distance range including a distance between the vehicle and the object, processing only received reflections of the laser beam emanating from objects in the set distance range to determine whether each object may impact the vehicle, and if a determination is made that the object may impact the vehicle, effecting a countermeasure with a view toward preventing the collision. The same enhancements to the method described above can be applied here as well, e.g., the use of a digital map to limit the number of objects considered as potentially dangerous and the countermeasures effected to avoid collisions.

A system for avoiding collisions between a vehicle and another object includes a laser beam projector arranged on the vehicle to directing a laser beam outward from the vehicle, a receiving unit for receiving reflections of the laser beam which reflect off of objects in the path of the laser beam, and a control unit, module or processor arranged to process any received reflections to determine whether an object is present in the path of the laser beam. When an object is determined to be present, the processor sets a distance range including a distance between the vehicle and the object, processes only received reflections of the laser beam emanating from objects in the set distance range to determine whether each object may impact the vehicle, and if a determination is made that the object may impact the vehicle, causes a countermeasure to be effected with a view toward preventing the collision. Optionally, the processor includes a pattern recognition algorithm which ascertains the identity of or identifies each object in the set distance range and assesses the potential for and consequences of a collision between the vehicle and the object based on the identity or identification of the object. The countermeasures can be activation of a driver notification system to alert the driver of the impending collision or activation of a vehicle control system to vary the travel of the vehicle to avoid the impending collision.

While the invention has been illustrated and described in detail in the drawings and the foregoing description, the same is to be considered as illustrative and not restrictive in character, it being understood that only preferred embodiments have been shown and described and that all changes and modifications that come within the spirit of the invention are desired to be protected.

This application is one in a series of applications covering safety and other systems for vehicles and other uses. The disclosure herein goes beyond that needed to support the claims of the particular invention that is claimed herein. This is not to be construed that the inventors are thereby releasing the unclaimed disclosure and subject matter into the public domain. Rather, it is intended that patent applications have been or will be filed to cover all of the subject matter disclosed above.

The invention claimed is:

1. An accident avoidance system for a host vehicle, comprising:
    a global positioning system residing on the host vehicle for determining the host vehicle's location as the host vehicle travels based on signals received from one or more satellites;
    a map database comprising digital maps corresponding to an area comprising the location of the host vehicle as determined by the global positioning system;
    a vehicle-to-vehicle communication system residing on the host vehicle operative for receiving signals comprising location information acquired by global positioning systems residing on other vehicles directly from the other vehicles indicating the locations of the other vehicles;
    a navigation system comprising a display residing on the host vehicle for displaying images to an occupant of the host vehicle showing the digital maps and indications of the locations of the host vehicle and the other vehicles on the digital maps, and for updating the images shown on the navigation system display to reflect changes in the locations of the host vehicle and the other vehicles;
    a processor coupled to the global positioning system residing on the host vehicle, the map database and the vehicle-to-vehicle communication system and being operative to determine that a potential collision is likely to occur between the host vehicle and one of the other vehicles based on the location of the host vehicle provided by the global positioning system, the digital maps of the map database and the locations of the other vehicles provided by the vehicle-to-vehicle communication system; and
    a warning system operative for alerting an operator of the host vehicle of the potential collision.

2. The accident avoidance system of claim 1, wherein the signals received by the vehicle-to-vehicle communication system further comprise indications of the velocities and directions of travel of the other vehicles.

3. The accident avoidance system of claim 1, wherein the global positioning system further comprises a differential correction signal receiver operable for receiving global positioning differential correction signals from a global positioning augmentation system, and wherein the global positioning system is operative for using the global positioning differential correction signals in the determination of the location of the host vehicle.

4. The accident avoidance system of claim 1, wherein the processor is arranged to receive traffic control information and determine that a potential collision is likely to occur between the host vehicle and one of the other vehicles based on the location of the host vehicle provided by the global positioning system, the digital maps of the map database, the locations of the other vehicles provided by the vehicle-to-vehicle communication system and the traffic control information.

5. The accident avoidance system of claim 4, wherein the processor is arranged to receive the traffic control information from a non-vehicular source.

6. The accident avoidance system of claim 1, wherein the host vehicle has an assigned corridor of travel, the processor includes data about an assigned corridor of travel of the host vehicle and is operative for determining that the host vehicle will potentially exit its assigned corridor of travel based on the location of the host vehicle provided by the global positioning system and the digital maps of the map database; and the warning system being operative for alerting an operator of the host vehicle of the potential exit from the assigned corridor of travel.

7. The accident avoidance system of claim 1, wherein the warning system is arranged to generate an audible warning.

8. The accident avoidance system of claim 1, wherein the warning system is arranged to cause the navigation system display to indicate an alarm.

9. The accident avoidance system of claim 1, wherein the map database comprises at least one digital map indicating at least one edge or surface shape of a roadway on which the host vehicle is traveling.

10. The accident avoidance system of claim 1, wherein the map database comprises at least one digital map indicating an elevation of a roadway on which the host vehicle is traveling.

11. The accident avoidance system of claim 1, wherein the map database comprises at least one digital map indicating an edge of a roadway on which the host vehicle is traveling and a character of land beyond the edge of the roadway.

12. The accident avoidance system of claim 1, wherein the host vehicle further comprises a radar or laser radar system, and while the host vehicle is traveling:

the radar system is operable for acquiring a location of an object in the area comprising the location of the host vehicle; and the navigation system is operative for indicating the location of the object on a map shown on the navigation system display.

13. The accident avoidance system of claim 1, wherein the host vehicle further comprises a data acquisition system, and while the host vehicle is traveling:

the data acquisition system is operative for receiving a digital map transmitted from a site remote from the host vehicle; and the navigation system is operative for displaying the received digital map on the navigation system display.

14. The accident avoidance system of claim 1, wherein the host vehicle further comprises a data acquisition system, and while the host vehicle is traveling:

the data acquisition system is operative for receiving weather condition information pertaining to the area where the host vehicle is located transmitted from a site remote from the host vehicle; and the navigation system is operative for indicating the weather condition information on the navigation system display.

15. The accident avoidance system of claim 1, wherein the host vehicle comprises an aircraft.

16. The accident avoidance system of claim 15, wherein the area comprising the location of the host vehicle includes a roadway comprising an aircraft runway.

17. The accident avoidance system of claim 16, wherein at least one of the vehicles comprises an aircraft landing in the area comprising the location of the host vehicle.

18. The accident avoidance system of claim 17, wherein the global positioning system comprises a differential correction signal receiver operable for receiving global positioning differential correction signals from a global positioning augmentation system, and wherein the global positioning system residing on the vehicle is operative for using the global positioning differential correction signals in the determination of the location of the vehicle.

19. The accident avoidance system of claim 18, wherein the differential correction signal receiver is operative for receiving the global positioning differential correction signals from a local area augmentation system.

20. The accident avoidance system of claim 18, wherein the differential correction signal receiver is operative for receiving the global positioning differential correction signals from a wide area augmentation system.

21. The accident avoidance system of claim 1, wherein the host vehicle comprises an automobile operating on a travel lane, and the area comprising the location of the host vehicle comprises the travel lane.

22. The accident avoidance system of claim 1, wherein the host vehicle comprises an aircraft operating on a roadway comprising an aircraft runway, and the area comprising the location of the host vehicle comprises the aircraft runway.

23. The accident avoidance system of claim 1, wherein the vehicle-to-vehicle communication system is arranged to transmit location, velocity and direction of travel information of the host vehicle to the other vehicles.

24. The accident avoidance system of claim 1, wherein the host vehicle further comprises a data acquisition system, and while the host vehicle is traveling, the data acquisition system is operative for receiving a digital map transmitted from a site remote from the host vehicle to be included in the map database.

25. A method for avoiding accidents involving a host vehicle and another vehicle, comprising:

providing a global positioning system onboard the host vehicle and using the global positioning system to determine the host vehicle's location as the host vehicle travels based on signals received from one or more satellites;

providing a map database onboard the host vehicle comprising digital maps corresponding to an area comprising the location of the host vehicle as determined by the global positioning system;

providing a vehicle-to-vehicle communication system onboard the host vehicle and using the vehicle-to-vehicle communication system to receive signals comprising location information acquired by global positioning systems residing on the other vehicle directly from the other vehicle indicating a location of the other vehicle;

providing a navigation system comprising a display onboard the host vehicle and displaying images on the navigation system display comprising the digital maps and indications of the locations of the host vehicle and the other vehicle on the digital maps;

updating the images shown on the navigation system display to reflect changes in the locations of the host vehicle and the other vehicle;

determining that a potential collision is likely to occur between the host vehicle and one of the other vehicles based on the location of the host vehicle determined by the global positioning system, the digital maps of the map database and the locations of the other vehicles provided by the vehicle-to-vehicle communication system; and activating a warning to alert an operator of the host vehicle when a potential collision is determined to be likely to occur.

26. The method of claim 25, further comprising receiving signals from the other vehicle indicating the velocity and direction of travel of the other vehicle.

27. The method of claim 25, further comprising:

providing traffic control information to the host vehicle; and determining that a potential collision is likely to occur between the host vehicle and one of the other vehicles based on the location of the host vehicle determined by the global positioning system, the digital maps of the map database, the locations of the other vehicles provided by the vehicle-to-vehicle communication system and the traffic control information.

28. The method of claim 27, wherein the traffic control information is provided from a non-vehicular source.

29. The method of claim 25, wherein the warning comprises an audible warning.

30. The method of claim 25, wherein the warning comprises an alarm indicated on the display.

31. The method of claim 25, wherein the step of determining the host vehicle's location comprises receiving and using global positioning differential correction signals from a global positioning augmentation system to determine the host vehicle's location.

32. The method of claim 25, further comprising displaying a digital map on the navigation system display indicating at least one edge or surface shape of a roadway on which the host vehicle is traveling.

33. The method of claim 25, further comprising displaying an elevation of a roadway on which the host vehicle is traveling on the navigation system display.

34. The method of claim 25, further comprising displaying a digital map on the navigation system display indicating an edge of a roadway on which the host vehicle is traveling and a character of land beyond the edge of the roadway.

35. The method of claim 25, further comprising:
   providing a radar system or laser radar onboard the host vehicle;
   using the radar to acquire a location of an object in the area comprising the location of the host vehicle; and
   indicating the acquired location of the object on a digital map shown on the navigation system display.

36. The method of claim 25, further comprising, while the host vehicle is traveling:
   receiving a digital map transmitted from a site remote from the host vehicle; and
   displaying the received digital map on the navigation system display.

37. The method of claim 25, further comprising, while the host vehicle is traveling:
   receiving weather condition information pertaining to the area comprising the location of the host vehicle transmitted from a site remote from the host vehicle; and
   indicating the weather condition information on the navigation system display.

38. The method of claim 25, further comprising transmitting location, velocity, and direction of travel information from the host vehicle directly to the other vehicle.

39. The method of claim 25, further comprising, while the host vehicle is traveling:
   receiving a digital map transmitted from a site remote from the host vehicle to be included in the map database.

40. An accident avoidance system for preventing accidents between first and second vehicles, comprising:
   a first global positioning system residing on the first vehicle for determining the first vehicle's location as the first vehicle travels based on signals received from one or more satellites;
   a first map database comprising digital maps corresponding to an area comprising the location of the first vehicle as determined by the first global positioning system;
   a first vehicle-to-vehicle communication system residing on the first vehicle and operative for transmitting signals directly to the second vehicle indicating the location of the first vehicle as determined by the first global positioning system, and for receiving signals directly from the second vehicle indicating the location of the second vehicle;
   a first navigation system comprising a first navigation system display residing on the first vehicle for displaying images to an occupant of the first vehicle which comprise the digital maps and indications of the locations of the first and second vehicles on the digital maps, and for updating the images shown on the first navigation system display to reflect changes in the locations of the first and second vehicles;
   a first processor coupled to the first global positioning system, the first map database and the first vehicle-to-vehicle communication system and being operative to determine that a potential collision is likely to occur between the first vehicle and the second vehicle based on the location of the first vehicle determined by the first global positioning system, the digital maps of the first map database and the location of the second vehicle received by the first vehicle-to-vehicle communication system;
   a first warning system operative for alerting an operator of the first vehicle of the potential collision;
   a second global positioning system residing on the second vehicle for determining the second vehicle's location as the second vehicle travels based on signals received from the one or more satellites;
   a second map database comprising digital maps corresponding to an area comprising the location of the second vehicle as determined by the second global positioning system;
   a second vehicle-to-vehicle communication system residing on the second vehicle and operative for transmitting signals directly to the first vehicle indicating the location of the second vehicle as determined by the second global positioning system, and for receiving signals directly from the first vehicle indicating the location of the first vehicle;
   a second navigation system comprising a second navigation system display residing on the second vehicle for displaying images to an occupant of the second vehicle which comprise the digital maps and indications of the locations of the first and second vehicles on the digital maps, and for updating the images shown on the second navigation system display to reflect changes in the locations of the first and second vehicles;
   a second processor coupled to the second global positioning system, the second map database and the second vehicle-to-vehicle communication system and being operative to determine that a potential collision is likely to occur between the first vehicle and the second vehicle based on the location of the second vehicle determined by the second global positioning system, the digital maps of the second map database and the location of the first vehicle received by the second vehicle-to-vehicle communication system; and
   a second warning system operative for alerting an operator of the second vehicle of the potential collision.

41. The accident avoidance system of claim 40, wherein the signals received by each vehicle-to-vehicle communication system further comprise indications of the velocity and direction of travel of the other vehicle.

42. The accident avoidance system of claim 40, wherein the global positioning system residing on each vehicle further comprises a differential correction signal receiver operable for receiving global positioning differential correction signals from a global positioning augmentation system, and wherein the global positioning system is operative for using the global positioning differential correction signals in the determination of the location of the host vehicle.

43. The accident avoidance system of claim 40, wherein the first processor is arranged to receive traffic control information and determine that a potential collision is likely to occur between the first vehicle and the second vehicle based on the location of the first vehicle determined by the first global positioning system, the digital maps of the first map database, the location of the second vehicle received by the first vehicle-to-vehicle communication system and the traffic control information.

44. The accident avoidance system of claim 43, wherein the first and second processors are arranged to receive the traffic control information from a non-vehicular source.

45. The accident avoidance system of claim 40, wherein the first vehicle further comprises a radar system or laser radar, and while the first vehicle is traveling:
   the radar system is operable for acquiring a location of an object in the area comprising the location of the host vehicle; and the first navigation system is operative for indicating the location of the object on a map shown on its navigation system display.

46. The accident avoidance system of claim 40, wherein the first vehicle further comprises a data acquisition system, and while the first vehicle is traveling:
the data acquisition system is operative for receiving a digital map transmitted from a site remote from the first vehicle; and
the first navigation system is operative for displaying the received digital map on its navigation system display.

47. The accident avoidance system of claim 40, wherein the first vehicle further comprises a data acquisition system, and while the first vehicle is traveling:
the data acquisition system is operative for receiving weather condition information pertaining to the area where the first vehicle is located transmitted from a site remote from the first vehicle; and
the first navigation system is operative for indicating the weather condition information on its navigation system display.

48. The accident avoidance system of claim 40, wherein the first or second vehicles comprises an aircraft.

49. The accident avoidance system of claim 48, wherein the area comprising the location of the first vehicle includes a roadway comprising an aircraft runway.

50. The accident avoidance system of claim 49, wherein the first vehicle comprises an aircraft landing in the area comprising the location of the second vehicle.

51. The accident avoidance system of claim 40, wherein the first vehicle comprises an aircraft operating on a roadway comprising an aircraft runway.

52. The accident avoidance system of claim 40, wherein the first vehicle further comprises a data acquisition system, and while the first vehicle is traveling, the data acquisition system is operative for receiving a digital map transmitted from a site remote from the first vehicle to be included in the first map database.

53. An accident avoidance system for a host vehicle, comprising:
a global positioning system residing on the host vehicle for determining the host vehicle's location as the host vehicle travels based on signals received from one or more satellites;
a map database comprising digital maps corresponding to an area comprising the location of the host vehicle as determined by the global positioning system;
a vehicle-to-vehicle communication system residing on the host vehicle operative for receiving signals comprising location information acquired by global positioning systems residing on other vehicles directly from the other vehicles indicating the locations of the other vehicles;
a navigation system comprising a display residing on the host vehicle for displaying images to an occupant of the host vehicle showing the digital maps and indications of the locations of the host vehicle and the other vehicles on the digital maps, and for updating the images shown on the navigation system display to reflect changes in the locations of the host vehicle and the other vehicles;
a processor coupled to the global positioning system residing on the host vehicle and the communication system and being operative to receive traffic control information and determine that a potential collision is likely to occur between the host vehicle and one of the other vehicles based on the location of the host vehicle provided by the global positioning system, the locations of the other vehicles provided by the communication system and the traffic control information; and
a warning system operative for alerting an operator of the host vehicle of the potential collision.

54. A method for avoiding accidents involving a host vehicle and another vehicle, comprising:
providing a global positioning system onboard the host vehicle and using the global positioning system to determine the host vehicle's location as the host vehicle travels based on signals received from one or more satellites;
providing a map database onboard the host vehicle comprising digital maps corresponding to an area comprising the location of the host vehicle as determined by the global positioning system;
providing a vehicle-to-vehicle communication system onboard the host vehicle and using the vehicle-to-vehicle communication system to receive signals comprising location information acquired by global positioning systems residing on the other vehicle directly from the other vehicle indicating a location of the other vehicle;
providing a navigation system comprising a display onboard the host vehicle and displaying images on the navigation system display comprising the digital maps and indications of the locations of the host vehicle and the other vehicle on the digital maps;
updating the images shown on the navigation system display to reflect changes in the locations of the host vehicle and the other vehicle;
providing traffic control information to the host vehicle;
determining that a potential collision is likely to occur between the host vehicle and one of the other vehicles based on the location of the host vehicle determined by the global positioning system, the locations of the other vehicles provided by the vehicle-to-vehicle communication system and the traffic control information; and
activating a warning to alert an operator of the host vehicle when a potential collision is determined to be likely to occur.

55. An accident avoidance system for preventing accidents between first and second vehicles, comprising:
a first global positioning system residing on the first vehicle for determining the first vehicle's location as the first vehicle travels based on signals received from one or more satellites;
a first map database comprising digital maps corresponding to an area comprising the location of the first vehicle as determined by the first global positioning system;
a first vehicle-to-vehicle communication system residing on the first vehicle and operative for transmitting signals directly to the second vehicle indicating the location of the first vehicle as determined by the first global positioning system, and for receiving signals directly from the second vehicle indicating the location of the second vehicle;
a first navigation system comprising a first navigation system display residing on the first vehicle for displaying images to an occupant of the first vehicle which comprise the digital maps and indications of the locations of the first and second vehicles on the digital maps, and for updating the images shown on the first navigation system display to reflect changes in the locations of the first and second vehicles;
a first processor coupled to the first global positioning system and the first vehicle-to-vehicle communication system and being operative to receive traffic control information and determine that a potential collision is likely to occur between the first vehicle and the second vehicle based on the location of the first vehicle determined by the first global positioning system, the location of the second vehicle received by the first vehicle-to-vehicle communication system and the traffic control information;

a first warning system operative for alerting an operator of the first vehicle of the potential collision;

a second global positioning system residing on the second vehicle for determining the second vehicle's location as the second vehicle travels based on signals received from the one or more satellites;

a second map database comprising digital maps corresponding to an area comprising the location of the second vehicle as determined by the second global positioning system;

a second vehicle-to-vehicle communication system residing on the second vehicle and operative for transmitting signals directly to the first vehicle indicating the location of the second vehicle as determined by the second global positioning system, and for receiving signals directly from the first vehicle indicating the location of the first vehicle;

a second navigation system comprising a second navigation system display residing on the second vehicle for displaying images to an occupant of the second vehicle which comprise the digital maps and indications of the locations of the first and second vehicles on the digital maps, and for updating the images shown on the second navigation system display to reflect changes in the locations of the first and second vehicles;

a second processor coupled to the second global positioning system and the second vehicle-to-vehicle communication system and being operative to receive traffic control information and determine that a potential collision is likely to occur between the first vehicle and the second vehicle based on the location of the second vehicle determined by the second global positioning system, the location of the first vehicle received by the second vehicle-to-vehicle communication system and the traffic control information; and a second warning system operative for alerting an operator of the second vehicle of the potential collision.

56. An accident avoidance system for a host vehicle, comprising:

a global positioning system residing on the host vehicle for determining the host vehicle's location as the host vehicle travels based on signals received from one or more satellites;

a map database comprising digital maps corresponding to an area comprising the location of the host vehicle;

a communication system residing on the host vehicle operative for receiving signals comprising location information acquired by global positioning systems residing on other vehicles directly from the other vehicles indicating the locations of the other vehicles;

the communication system being further operative for receiving traffic information from an infrastructure-based station; and a navigation system residing on the host vehicle coupled to the global positioning system and the communication system;

the navigation system operative for displaying images to an occupant of the host vehicle showing the digital maps from the map database, an indication of the location of the host vehicle provided by the global positioning system, indications of the locations of the other vehicles received by the communication system and the traffic information received by the communication system; and wherein the navigation system is further operative for updating the images shown on the navigation system display to reflect changes in the location of the host vehicle, the locations of the other vehicles and the traffic information.

57. The accident avoidance system of claim 56, wherein the traffic information comprises location information for vehicles in the area comprising the location of the host vehicle.

58. The accident avoidance system of claim 56, wherein the traffic information comprises location information for vehicles in the area comprising the location of the host vehicle sensed by radar.

59. The accident avoidance system of claim 56, wherein the host vehicle is further configured to receive a warning from the infrastructure-based station that a collision is likely to occur between the host vehicle and one of the other vehicles.

60. The accident avoidance system of claim 56, wherein:

the host vehicle is configured to determine that a potential collision is likely to occur between the host vehicle and one of the other vehicles; and the navigation system is configured to activate a collision alert when it is determined that a potential collision is likely to occur between the host vehicle and one of the other vehicles.

61. The accident avoidance system of claim 56, wherein the navigation system is configured to determine that a potential collision is likely to occur between the host vehicle and one of the other vehicles, determine a planned evasive action to avoid the collision, and transmit the planned evasive action to the other vehicle.

62. The accident avoidance system of claim 56, wherein the host vehicle is further configured to receive weather information from the infrastructure-based station.

63. The accident avoidance system of claim 62, wherein the navigation system is configured to display the received weather information.

64. The accident avoidance system of claim 63, wherein the host vehicle is configured to request the weather information from the infrastructure-based station and receive weather information from the infrastructure-based station in response to the request.

65. The accident avoidance system of claim 56, wherein the host vehicle is further configured to receive traffic control information from the infrastructure-based station.

66. The accident avoidance system of claim 65, wherein the navigation system is configured to display the received traffic control information.

67. The accident avoidance system of claim 56, wherein the navigation system is configured to receive map update information from the infrastructure-based station.

68. The accident avoidance system of claim 56, wherein the maps displayed by the navigation system include maps show the location of the edge of a roadway, the surface shape of the roadway, and the character of the land beyond the roadway.

69. The accident avoidance system of claim 56, wherein the host vehicle comprises an aircraft and the area comprising the location of the host vehicle comprises a runway on which the aircraft is taxiing.

70. A method for avoiding accidents involving a host vehicle, comprising:
- providing a global positioning system residing on the host vehicle for determining the host vehicle's location as the host vehicle travels based on signals received from one or more satellites;
- providing a map database residing on the host vehicle comprising digital maps corresponding to an area comprising the location of the host vehicle;
- providing a communication system residing on the host vehicle operative for receiving signals comprising location information acquired by global positioning systems residing on other vehicles directly from the other vehicles indicating the locations of the other vehicles;
- configuring the communication system to be further operative for receiving traffic information from an infrastructure-based station;
- providing a navigation system residing on the host vehicle coupled to the global positioning system and the communication system;
- configuring the navigation system to be operative for displaying images to an occupant of the host vehicle showing the digital maps from the map database, an indication of the location of the host vehicle provided by the global positioning system, indications of the locations of the other vehicles received by the communication system, and the traffic information received by the communication system; and
- configuring the navigation system to be further operative for updating the images shown on the navigation system display to reflect changes in the location of the host vehicle, the locations of the other vehicles, and the traffic information.

71. The method of claim 70, wherein the traffic information comprises location information for vehicles in the area comprising the location of the host vehicle.

72. The method of claim 70, wherein the traffic information comprises location information for vehicles in the area comprising the location of the host vehicle sensed by radar.

73. The method of claim 70, further comprising configuring the host vehicle to receive a warning from the infrastructure-based station that a collision is likely to occur between the host vehicle and one of the other vehicles.

74. The method of claim 70, further comprising:
- configuring the host vehicle to determine that a potential collision is likely to occur between the host vehicle and one of the other vehicles; and
- configuring the navigation system to activate a collision alert when it is determined that a potential collision is likely to occur between the host vehicle and one of the other vehicles.

75. The method of claim 70, further comprising configuring the navigation system to determine that a potential collision is likely to occur between the host vehicle and one of the other vehicles, determine a planned evasive action to avoid the collision, and transmit the planned evasive action to the other vehicle.

76. The method of claim 70, further comprising configuring the host vehicle to receive weather information from the infrastructure-based station.

77. The method of claim 76, further comprising configuring the navigation system to display the received weather information.

78. The method of claim 77, further comprising configuring the host vehicle to request the weather information from the infrastructure-based station and receive weather information from the infrastructure-based station in response to the request.

79. The method of claim 70, further comprising configuring the host vehicle to receive traffic control information from the infrastructure-based station.

80. The method of claim 79, further comprising configuring the navigation system to display the received traffic control information.

81. The method of claim 70, further comprising configuring the navigation system to receive map update information from the infrastructure-based station.

82. The method of claim 70, further comprising configuring the navigation system to display maps showing the location of the edge of a roadway, the surface shape of the roadway, and the character of the land beyond the roadway.

83. The method of claim 70, wherein the host vehicle comprises an aircraft and the area comprising the location of the host vehicle comprises a runway on which the aircraft is taxiing.

* * * * *